July 6, 1965    K. A. RIEDEL ETAL    3,192,787
MACHINE TOOL DRIVE MECHANISM
Filed Sept. 1, 1960    21 Sheets-Sheet 15
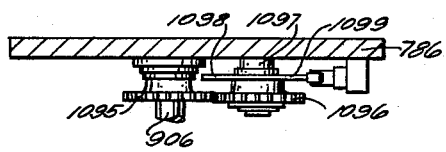
FIG. 26
FIG. 27
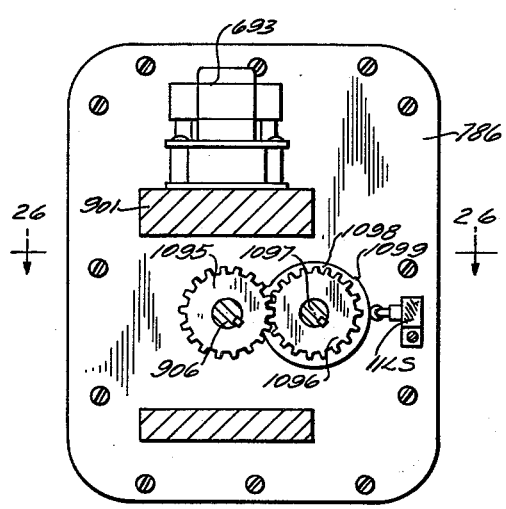
FIG. 28    FIG. 28 B
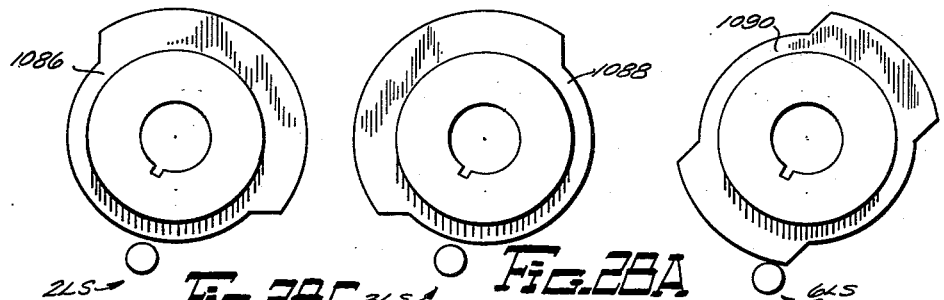
FIG. 28C    FIG. 28A
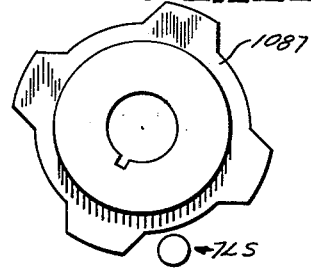 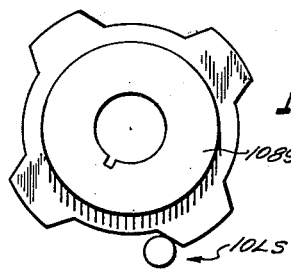
FIG. 28 D
INVENTORS
Kurt A. Riedel
BY Carl M. Karcher
Cyril M. Hajewski
Attorney

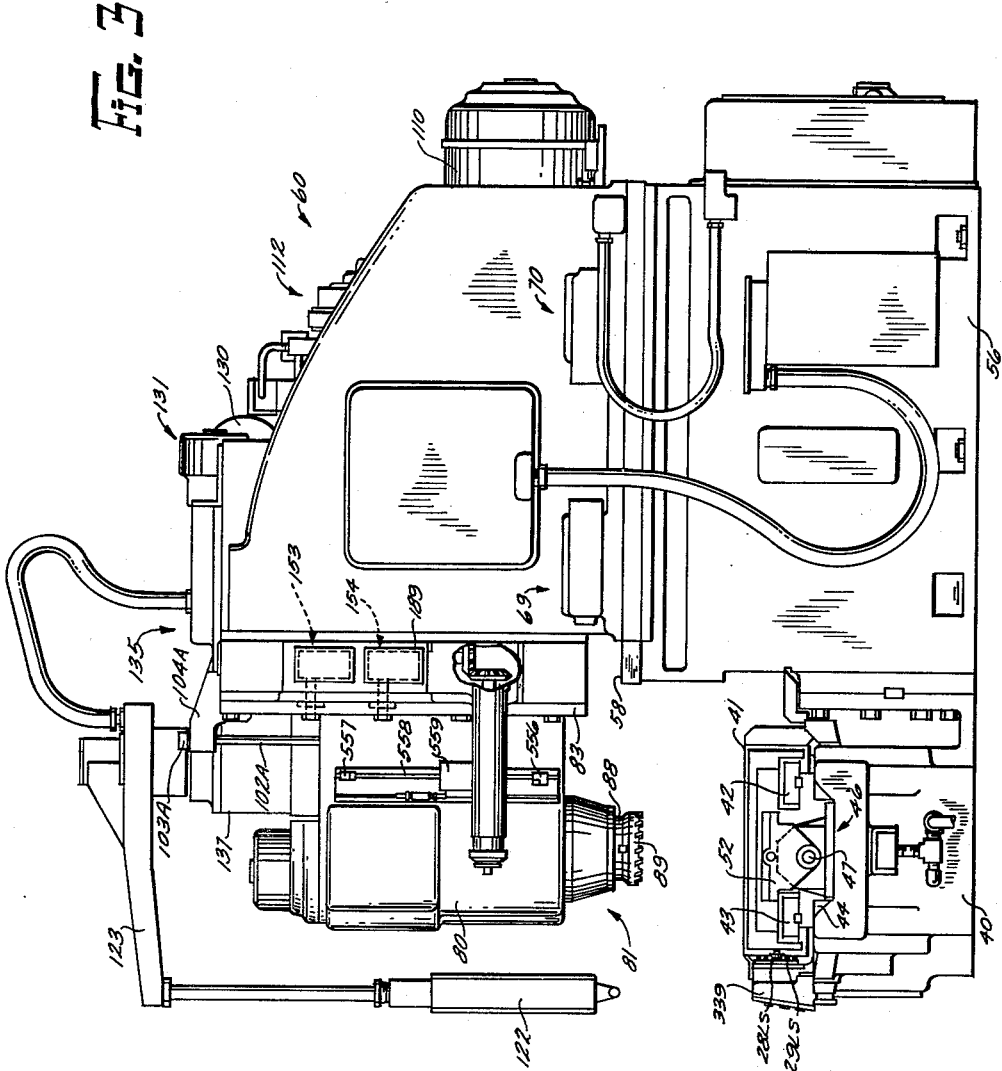

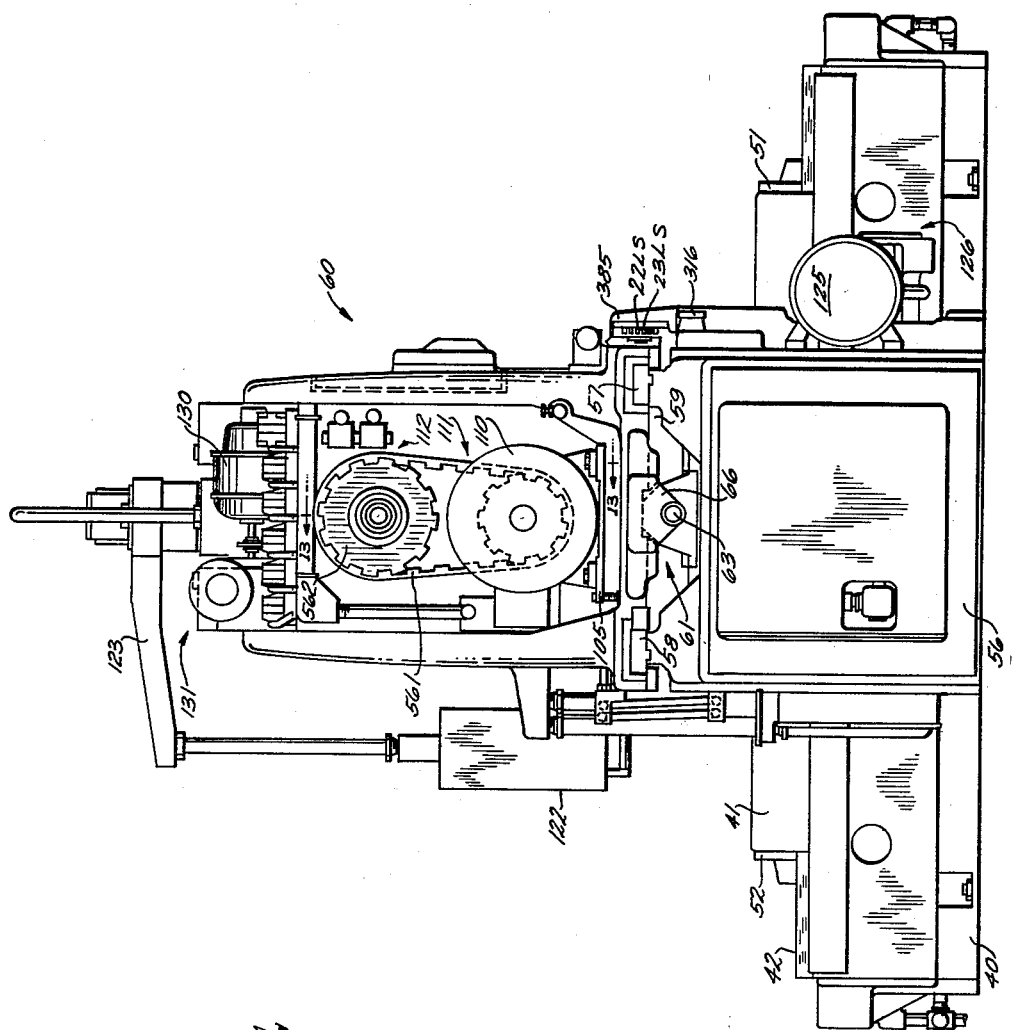

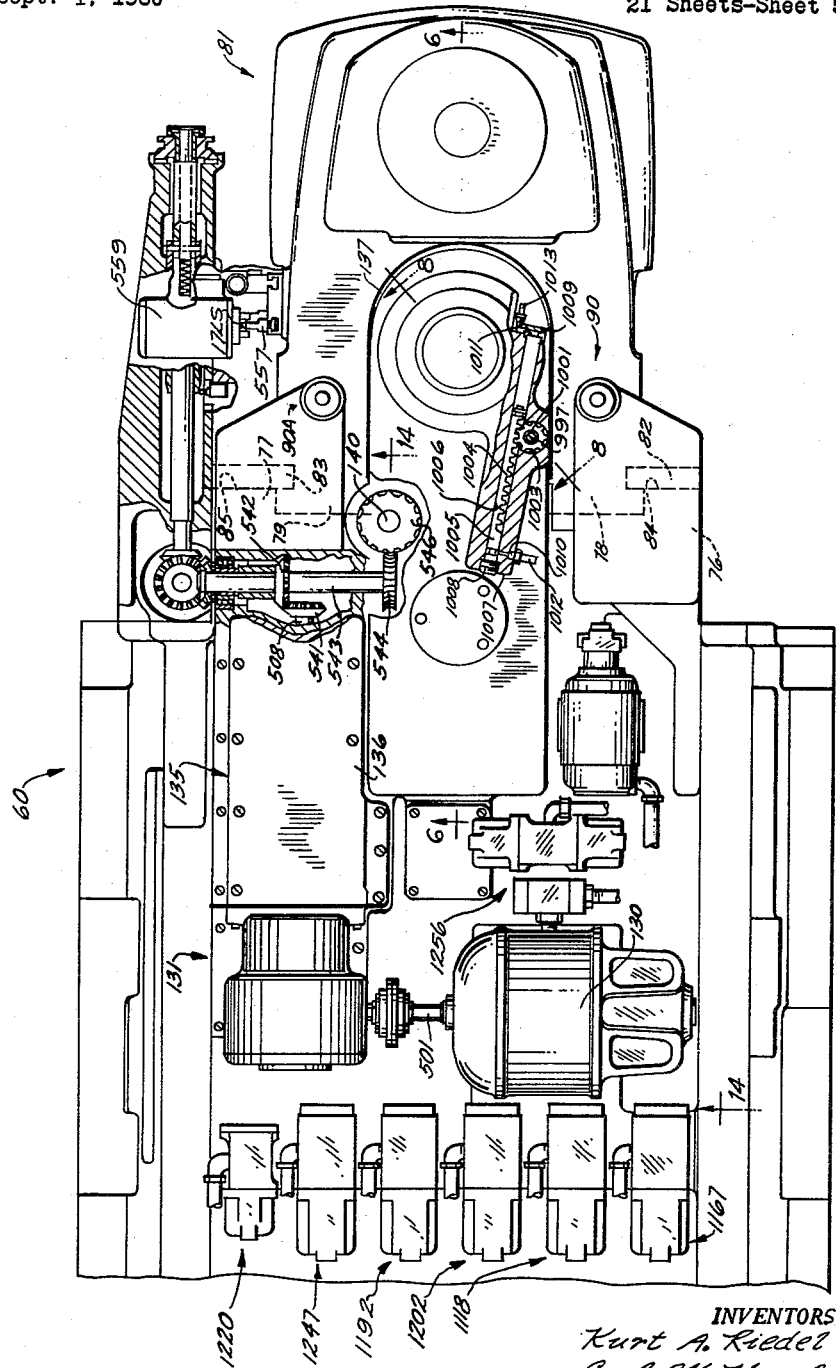

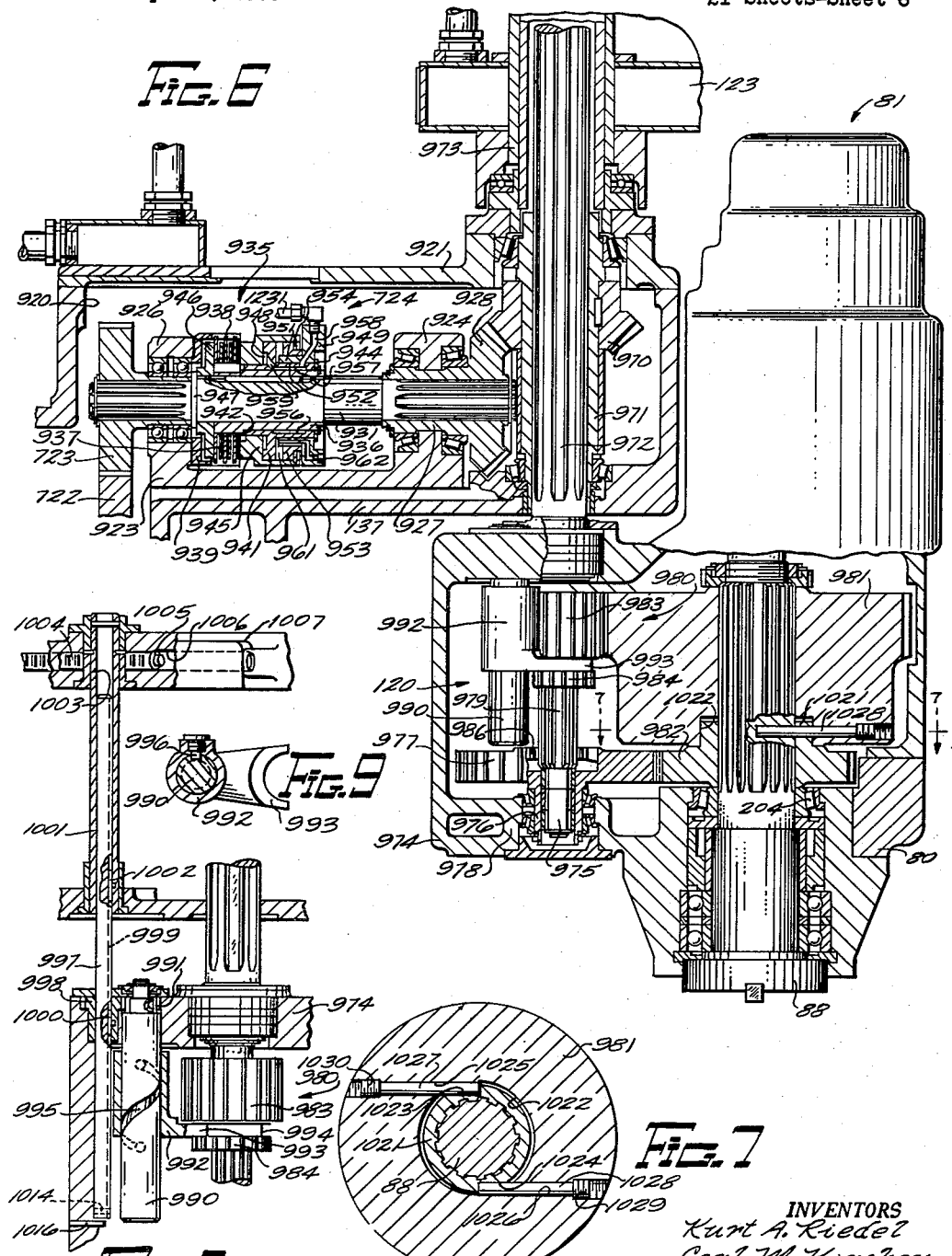

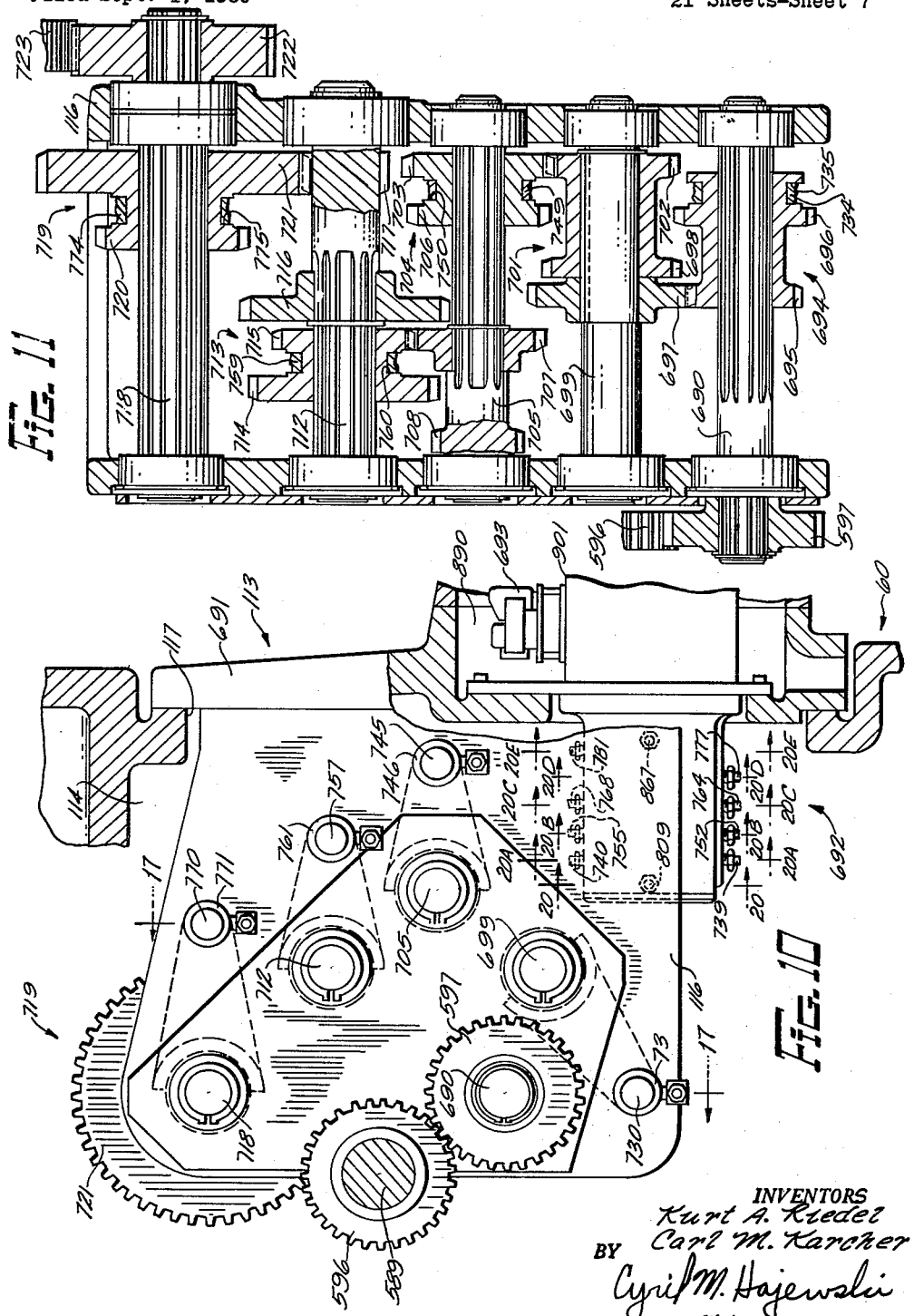

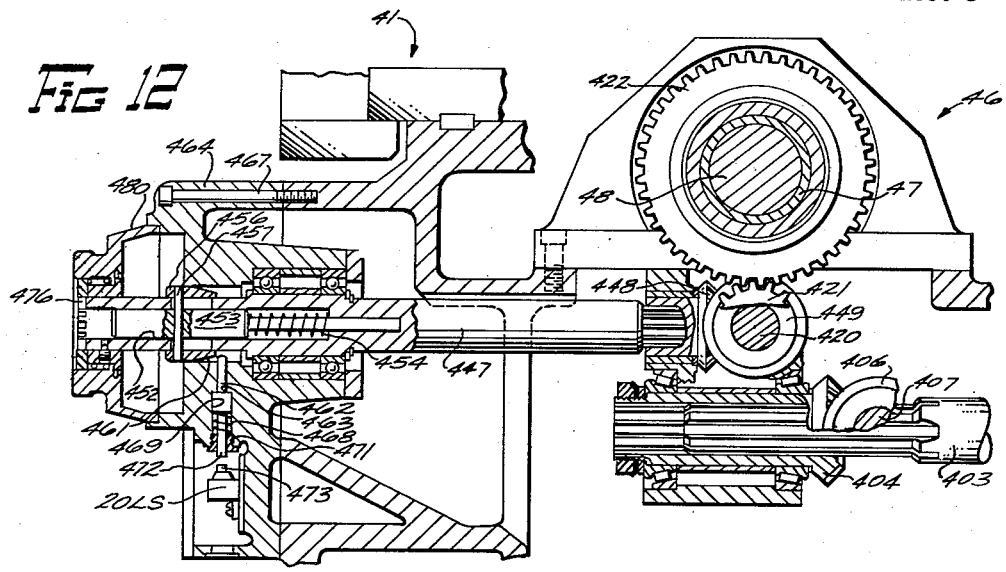
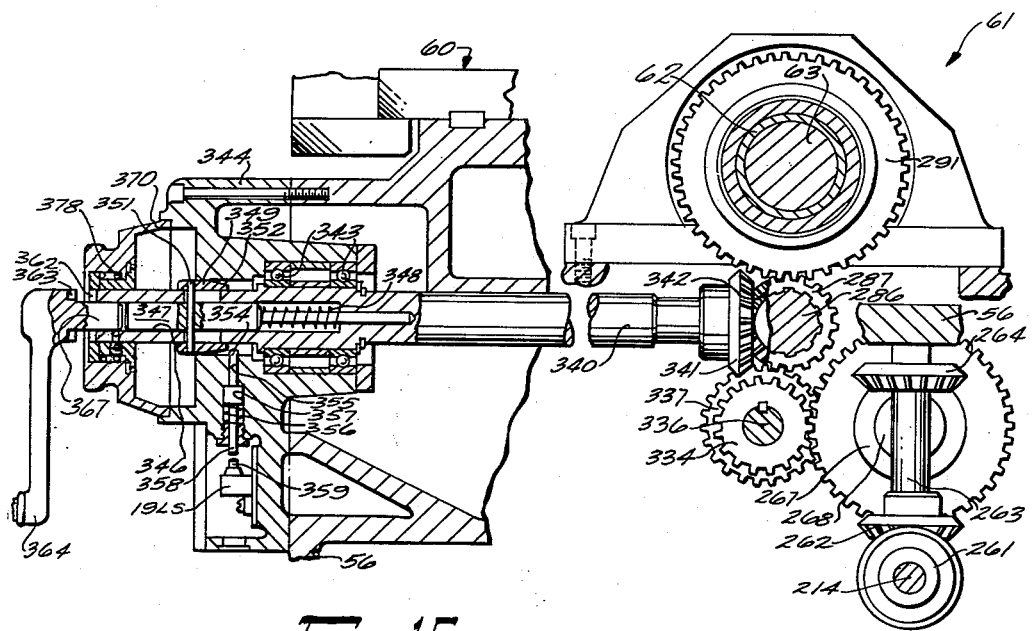

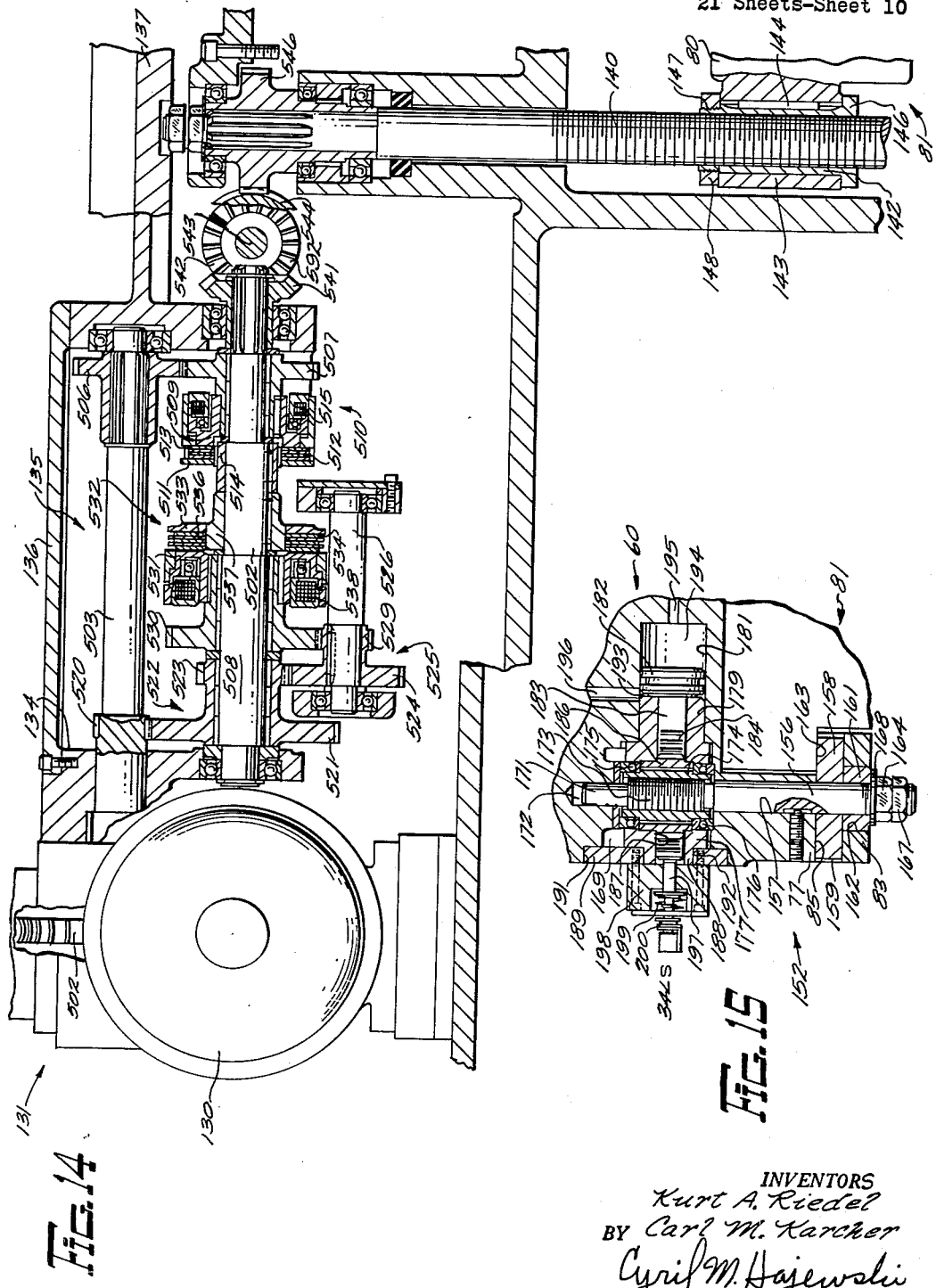

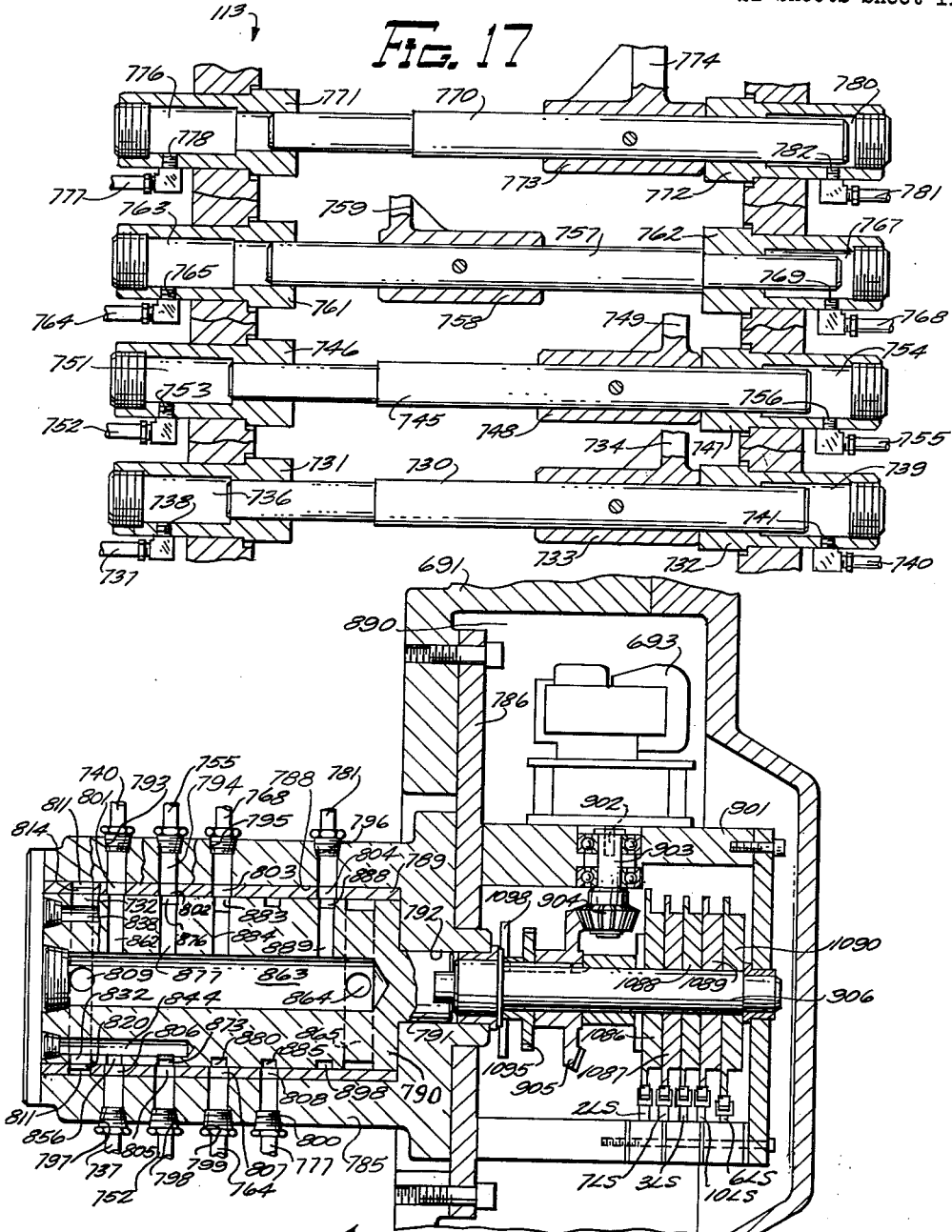

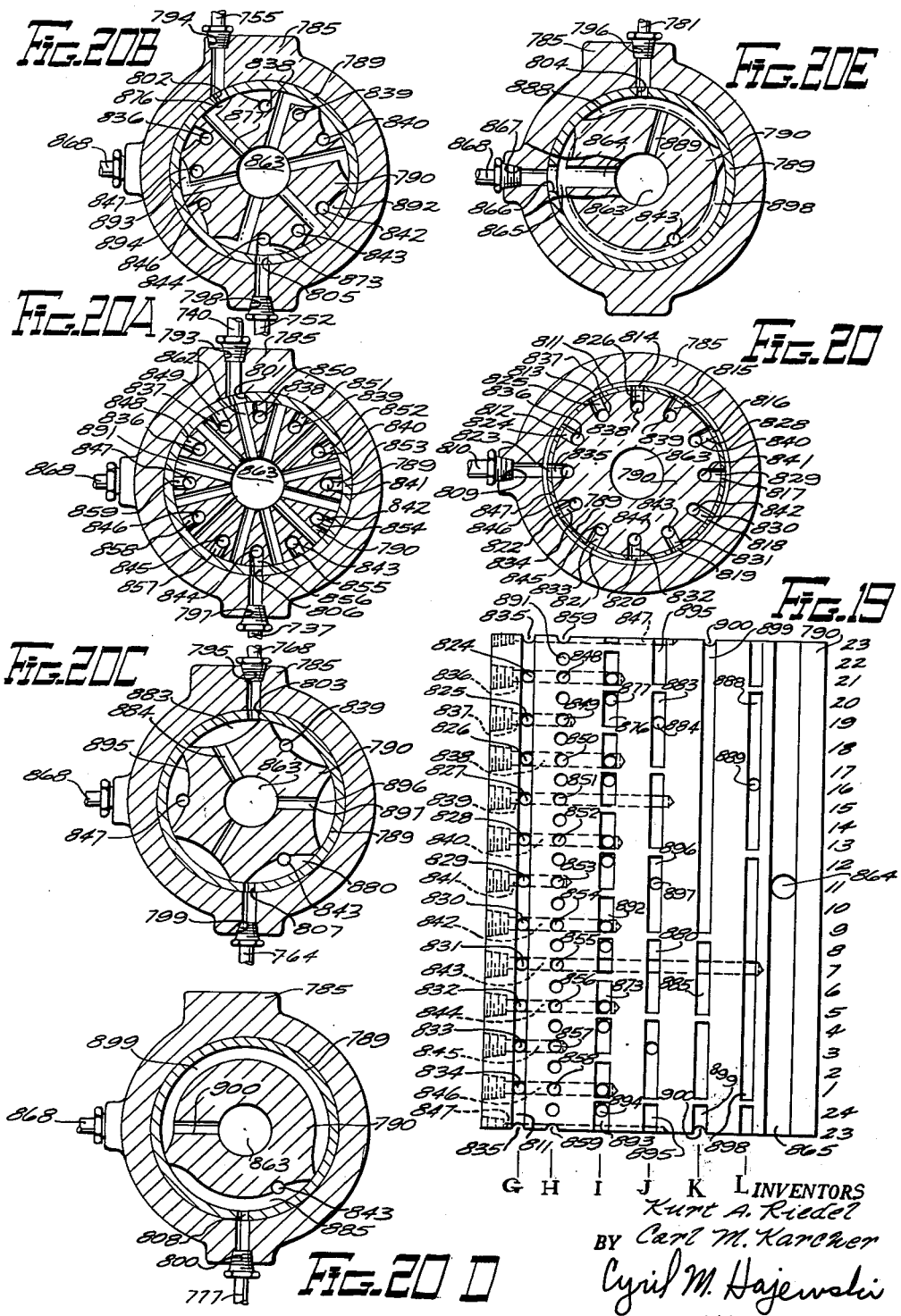

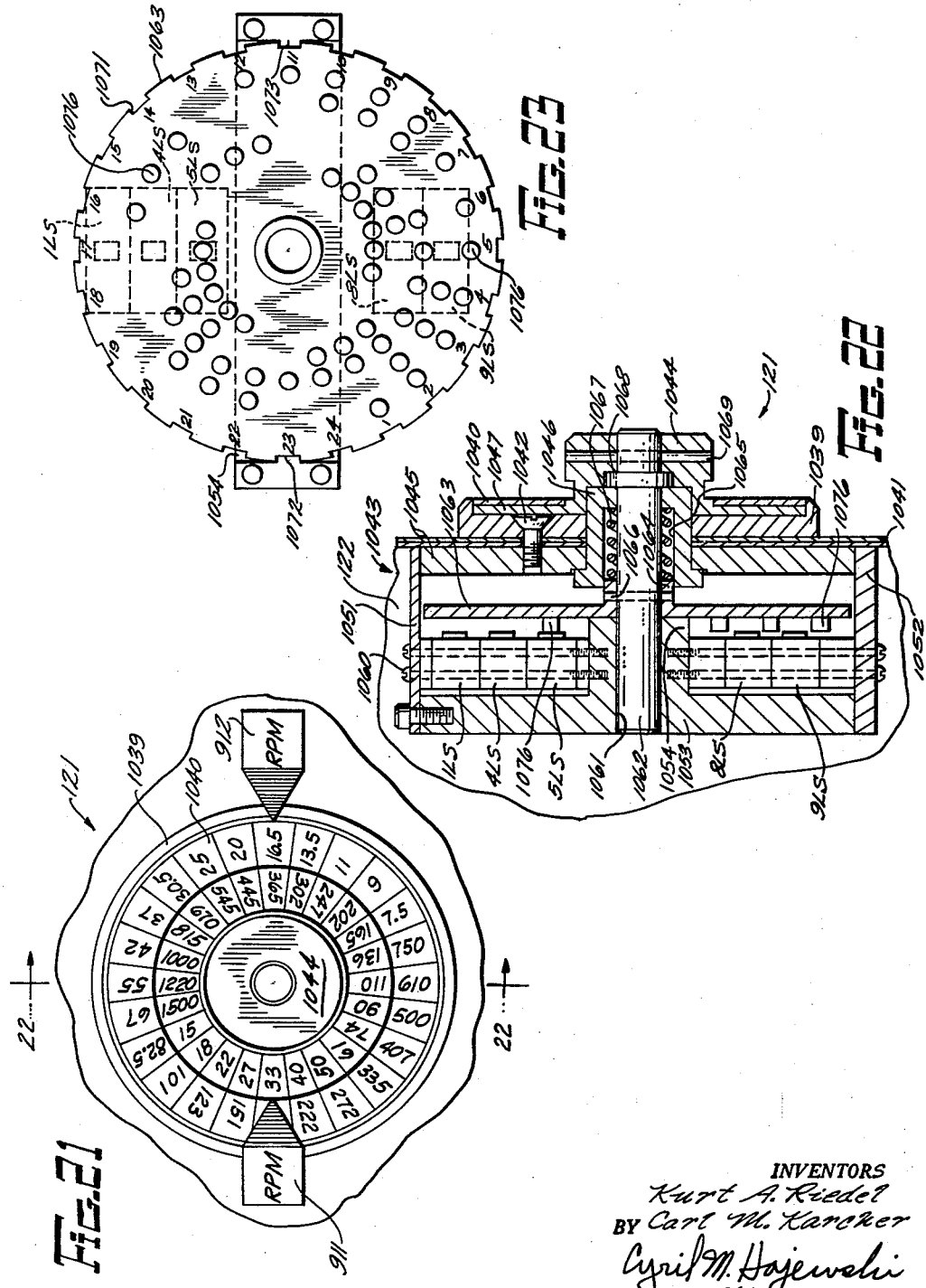

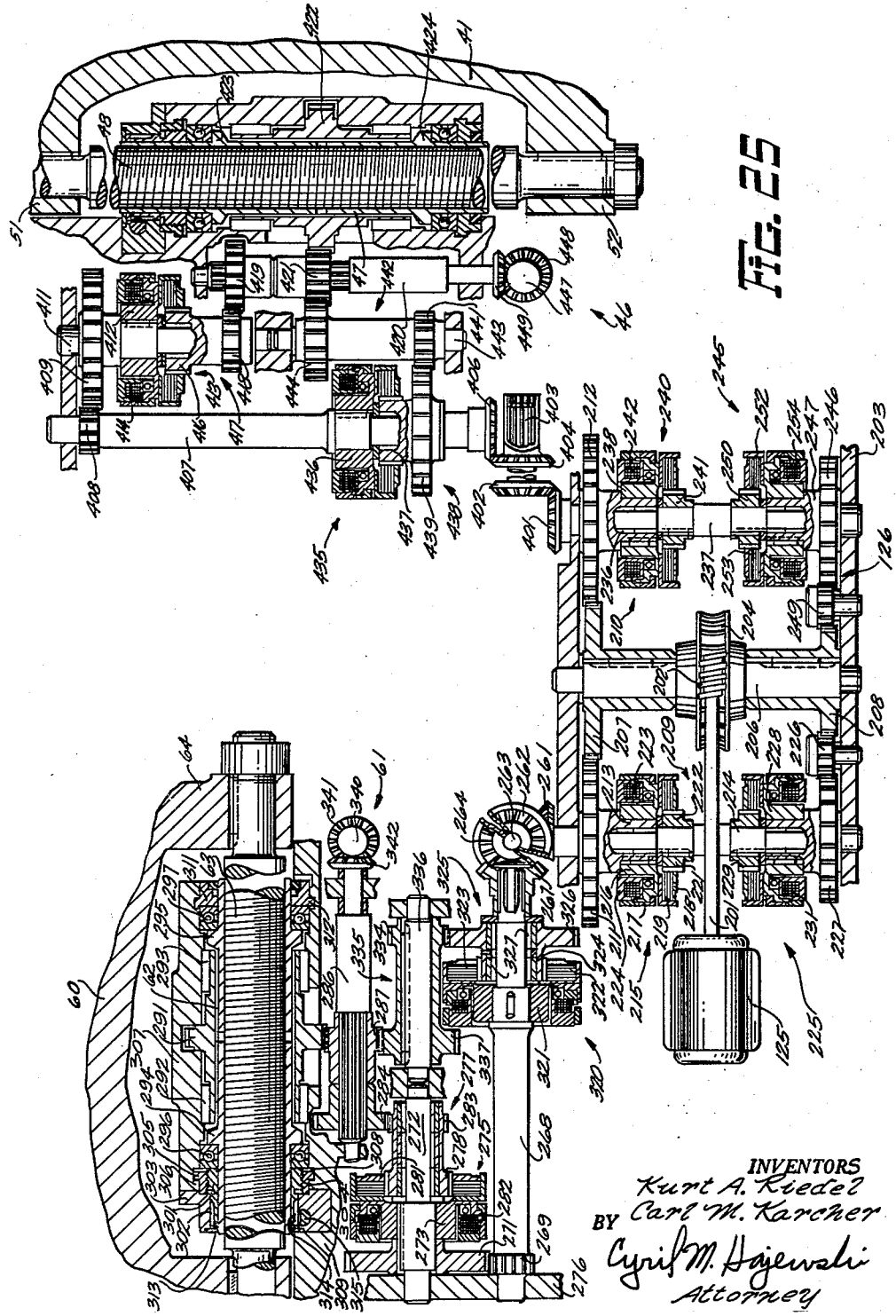

FIG. 30

| Spool Position | Spindle Speed RPM | SHAFT 730 GEAR CLUSTER 694 | SHAFT 745 GEAR CLUSTER 704 | SHAFT 758 GEAR CLUSTER 713 | SHAFT 770 GEAR CLUSTER 719 |
|---|---|---|---|---|---|
| | | | | Spindle Low Range | |
| 1 | 7.5/15 | R | R | L | R |
| 2 | 9/18 | R | L | L | R |
| 3 | 11/22 | L | R | L | R |
| 4 | 13.5/27 | L | R | R | R |
| 5 | 16.5/33 | R | L | R | R |
| 6 | 20/40 | R | R | R | R |
| 7 | 25/50 | L | L | R | R |
| 8 | 30/61 | R | R | L | R |
| 9 | 37/74 | R | L | L | R |
| 10 | 45/90 | L | R | L | R |
| 11 | 55/110 | L | R | R | R |
| 12 | 67/136 | R | L | R | R |
| 13 | 82.5/165 | R | R | R | R |
| 14 | 101/202 | L | L | R | R |
| | | | | Spindle High Range | |
| 15 | 123/246 | R | R | L | L |
| 16 | 151/302 | R | L | L | L |
| 17 | 182/365 | L | R | L | L |
| 18 | 223/445 | L | R | R | L |
| 19 | 272/545 | R | L | R | L |
| 20 | 335/670 | R | R | R | L |
| 21 | 407/815 | L | L | R | L |
| 22 | 500/1000 | R | R | L | L |
| 23 | 610/1220 | R | L | L | L |
| 24 | 750/1500 | L | R | L | L |

FIG. 29

(Chart showing Pendant Speed Change Switches LS1–LS6, Rotary Valve Speed Change Switches Cams LS7–LS11, and Range LS12, for Positions 1–24 across Spindle Low Range and Spindle High Range.)

X Switch Actuated  
O Switch Deactuated

INVENTORS
Kurt A. Riedel
Carl M. Karcher
BY Cyril M. Hajewski
Attorney

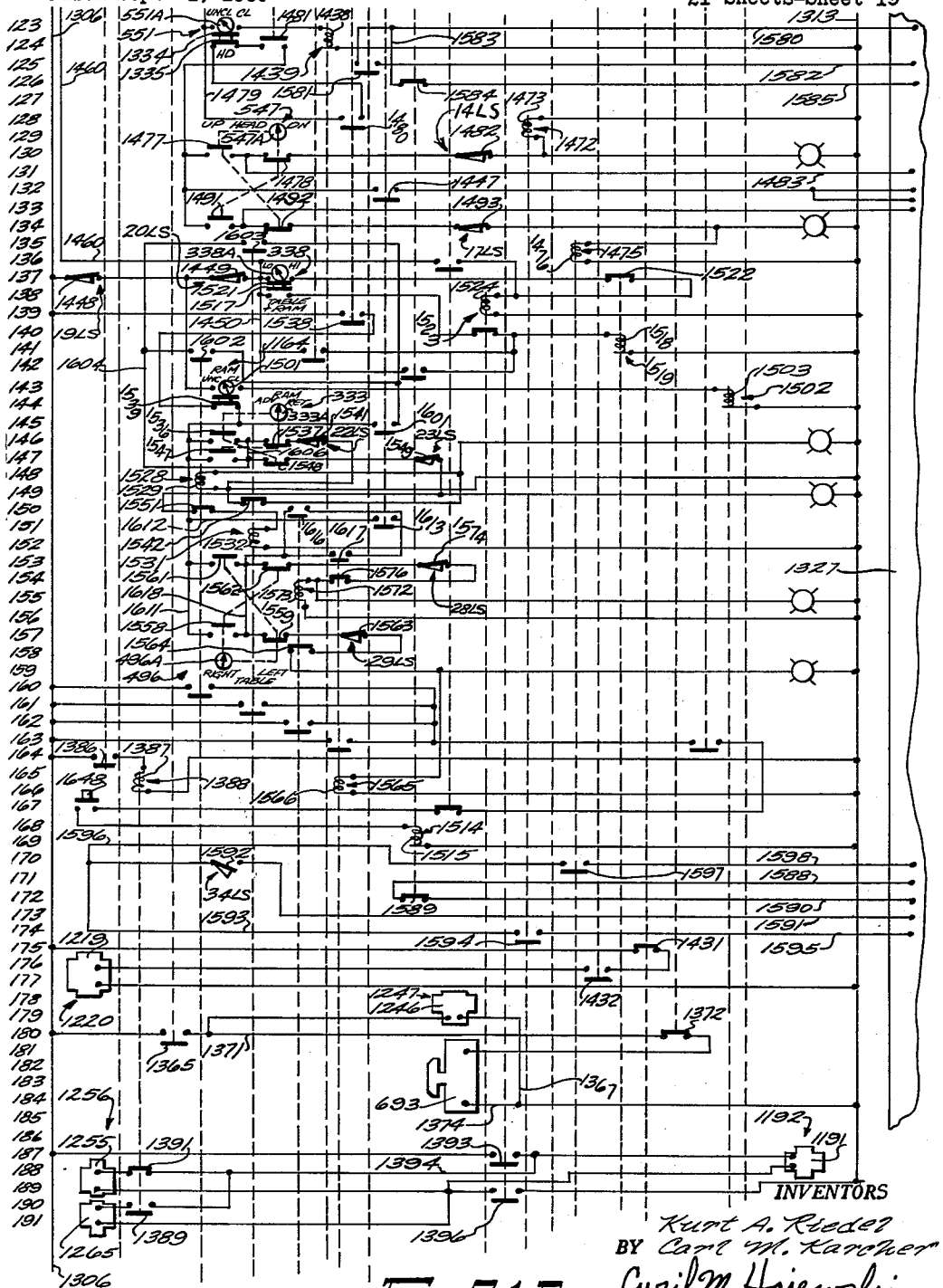

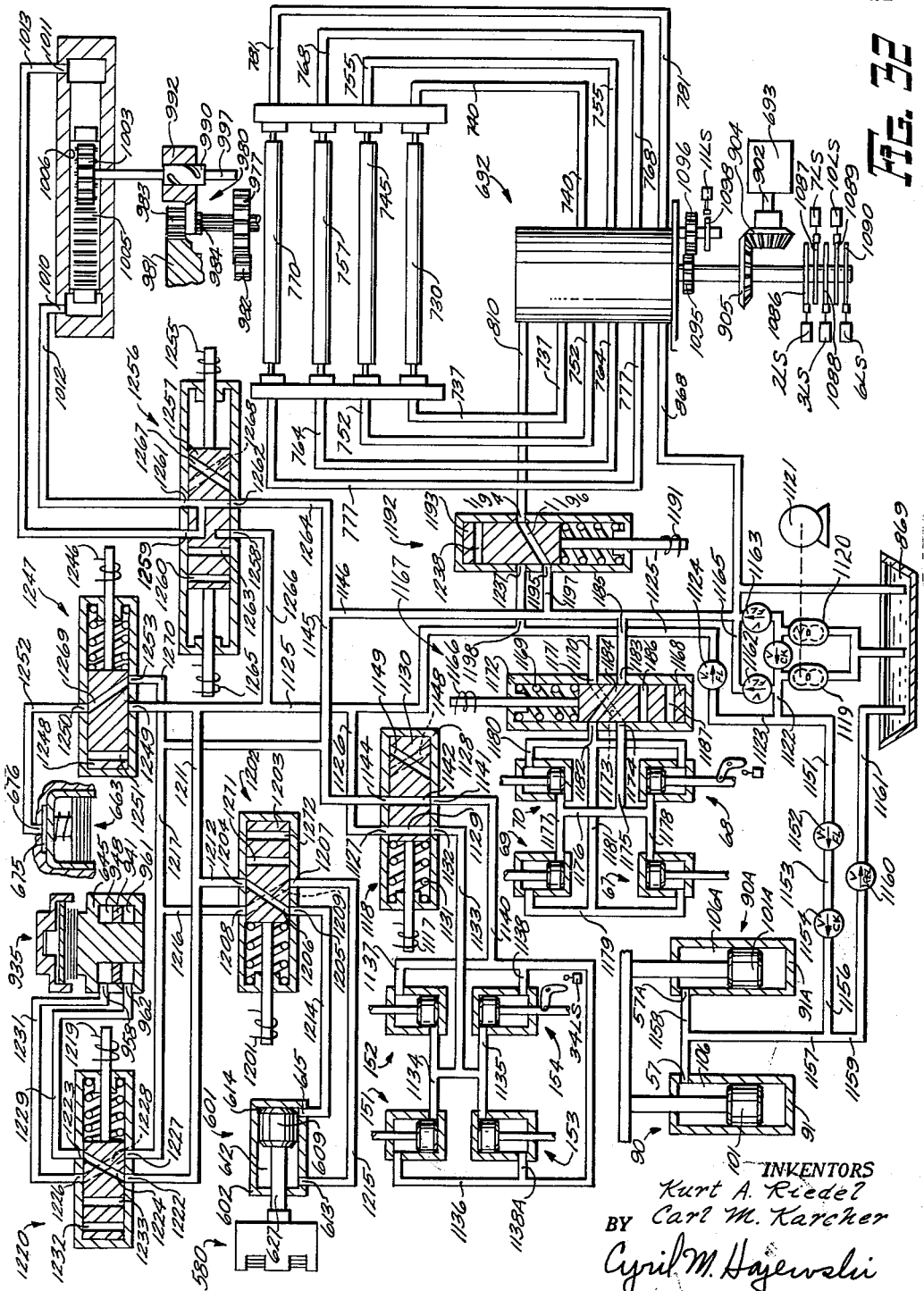

United States Patent Office 3,192,787
Patented July 6, 1965

3,192,787
MACHINE TOOL DRIVE MECHANISM
Kurt A. Riedel, Milwaukee, and Carl M. Karcher, Brookfield, Wis., assignors to Kearney & Trecker Corporation, West Allis, Wis., a corporation of Wisconsin
Filed Sept. 1, 1960, Ser. No. 53,532
13 Claims. (Cl. 74—365)

This invention relates generally to machine tools and more particularly to a vertical spindle bed type milling machine of novel construction provided with improved operating and controlling mechanism for effecting movements of the work supporting and tool supporting member thereof.

A general object of this invention is to provide a milling machine of improved design that is adapted for convenient and rapid operation and that is of simple and rugged construction.

Another object of this invention is to provide a milling machine having simplified controls which are conveniently located.

Another object of this invention is to provide an improved milling machine having the various transmission components associated therewith formed in unit assemblies and arranged in a manner that any one of the unit assemblies may be removed and replaced in the machine without disturbing any other assembly.

Another object of this invention is to provide a novel spindle drive transmission including a speed changing and range changing mechanism operating in combination to effect rotation of the spindle at selected rate in either a high or low range.

A further object of this invention is to provide an improved remote control mechanism for shifting the speed change gearing.

Another object of this invention is to provide a novel speed change mechanism that can be used with equal advantage on any size of speed transmission.

Another object of this invention is to provide an improved multi-contact speed selector switch for remote control shifting of a spindle drive transmission.

A still further object of this invention is to provide a novel drive transmission for the work supporting and tool supporting members of a machine tool which is operable to effect simultaneous movement of the members or independent selective movement of the members as desired.

A still futher object of this invention is to provide a compact completely unitary speed selector that can be assembled as a unit and connected to appropriate hydraulic lines of a machine tool.

According to this invention, an improved milling machine of the vertical bed type is provided which features a rigid main bed that carries a work supporting table for reciprocal movement. A T-bed extension is perpendicular to the main bed and extends rearwardly from the center thereof to support an open end ram for movement normal to the path of table travel. The ram unit supports a rotatable spindle carrying head for vertical movement in a path perpendicular to the table. The improved milling machine is provided with a novel spindle drive, including a unitary speed change mechanism and an improved range changing mechanism functioning cooperatively under the control of a multi-contact speed selector and indicating switch mounted on a control pendant. To effect operation of the speed changing mechanism there is a compact, completely unitary electro-hydraulic speed selector unit which is operable to effect hydraulic shifting of the speed changing mechanism in accordance with the selected speed position of the speed selector switch. The vertical spindle head is power driven from a separate motor carried by the ram and which is arranged to drive through a unitary vertical feed drive saddle assembly disposed in the top of the ram. An infinite feed transmission is operably connected to drive the head in its vertical movement through a screw and nut assembly and is operated through magnetic clutches by a remote control at the pendant station.

The table and the ram are each moved by screw and nut assemblies that are driven from separate unitary feed drive transmissions having low and high ranges that are selectively engageable by means of magnetic disk clutches contained within the transmissions. By providing the electric clutches, instant start, stop and reversing is possible in all feed movements and greater accuracy of control is obtained. The table feed drive transmission and the ram drive transmission are arranged to be driven either selectively or simultaneously from an infinite feed drive reversing mechanism also of unitary construction. Power for driving the table and ram is obtained from an electric motor carried by the T-bed extension and which connects to the infinite feed drive reversing mechanism through a unitary feed drive saddle assembly. The various transmissions are composed of unit assemblies, whereby the removal and replacement of any unit for maintenance purposes is simplified since it may be removed from the machine without the necessity of disrupting other connecting units. Hydraulically actuated clamps are provided for the cross slide and the spindle head so that they are securely locked in position. These clamps are automatically released any time that power is applied to the respective members. Manual control of the various power actuated units of the machine is effected through a pendant control which is movable through 180° of arc so that such controls will be conveniently available to the machine operator.

The invention is exemplified herein by means of a specially designed milling machine incorporating the inventive features. It is to be understood that the particular embodiment disclosed is intended to be illustrative only and that various other types of machine tools may incorporate various structural details disclosed herein which come within the range of equivalents of the features defined in the subjoined claims and which may be utilized in practicing the invention.

The foregoing and other objects of the invention which will become more fully apparent from the following detailed specification, may be achieved by the exemplifying machine tool depicted in and described in connection with the accompanying drawings, in which:

FIG. 3 is a view in right side elevation of the machine tool of FIG. 1, with parts broken away to show a portion of the manual head adjusting mechanism;

FIG. 4 is a view in rear elevation of the machine tool of FIG. 1, showing the spindle clutch drive and valve arrangement;

FIG. 5 is an enlarged fragmentary plan view of the machine tool of FIG. 1, with parts broken away to show portions of the spindle head drive and the arrangement of the fluid actuator for shifting the spindle range change mechanism;

FIG. 6 is an enlarged fragmentary view in vertical section through the spindle head of the machine tool of FIG. 1 taken along the line 6—6 of FIG. 5 showing the spindle brake mechanism, the drive connection effected therefrom to the spindle drive shaft and the range change mechanism;

FIG. 7 is a detailed view in horizontal section taken through the flywheel gear along the line 7—7 of FIG. 6, showing the mechanism for eliminating backlash between the low range flywheel gear, the high range gear and the spindle;

FIG. 8 is a detail fragmentary view in vertical section through the range change shifter mechanism shown in FIG. 6 and taken along the line 8—8 of FIG. 5;

FIG. 9 is an enlarged detail plan view of the shifter fork bracket showing the cam groove follower roller;

FIG. 10 is an enlarged fragmentary view in side elevation of the spindle speed transmission, showing the relative positions of the shifter shafts in relation to their associated gear shafts;

FIG. 11 is a developed view of the spindle speed transmission shown in FIG. 10;

FIG. 12 is an enlarged fragmentary view in transverse vertical section through the table drive saddle and showing the manual table adjusting mechanism;

FIG. 14 is an enlarged detail view in transverse vertical section through the spindle head range change mechanism taken along the line 14—14 of FIG. 5, showing the connection between the head drive saddle, the range change mechanism to the head feed screw;

FIG. 15 is an enlarged detail view in horizontal section of an exemplary head clamp mechanism;

FIG. 16 is an enlarged fragmentary view in transverse vertical section through the ram drive saddle and showing the manual ram adjusting mechanism;

FIG. 17 is an enlarged detail sectional view through the spindle speed transmission taken along the line 17—17 of FIG. 10 showing the shifter shafts;

FIG. 18 is an enlarged detail longitudinal section through the rotary valve mechanism associated with the spindle speed transmission showing the cams and limit switches and the motor for effecting rotation of the cams and valve spool;

FIG. 19 is a developed view of the valve spool of the rotary valve shown in FIG. 10 as it appears when unfolded from the position it occupies as shown in FIG. 10, to illustrate the grooves and associated communicating passages;

FIGS. 20, 20A, 20B, 20C, 20D and 20E are views in vertical section through the rotary valve, taken respectively along the planes represented by the correspondingly numbered lines in FIG. 10;

FIG. 21 is an enlarged plan view of the dial of the pendant spindle speed selector switch shown in FIG. 24;

FIG. 22 is an enlarged view in vertical section depicting the pendant spindle speed selector switch and taken along the line 22—22 of FIG. 24;

FIG. 23 is an enlarged detail elevational view of the limit switch actuator plate shown in FIG. 22;

FIG. 24 is an enlarged elevational view of the machine control pendant showing the various switches employed to control the machine operation;

FIG. 25 is a composite detail view partially in section and partially in plan of the table and ram drive saddle assemblies showing the relationship of the units for effecting table and ram movement;

FIG. 26 is a detail sectional view through the cam shaft housing of the rotary valve assembly taken along the line 26—26 of FIG. 27, showing the drive connection for rotating the low and high range cam;

FIG. 27 is a view in vertical section through the cam shaft housing of the rotary valve;

FIGS. 28, 28A, 28B, 28C and 28D are detail elevational views individually illustrating the several cams which are shown mounted on the cam shaft of the rotary valve in FIG. 18, the actuating rollers of the limit switches that are actuated by these cams being shown diagrammatically in positon relative to their associated cams;

FIG. 29 is a chart showing the twenty-four various positions of the rotary valve for establishing the twenty-four spindle speeds, and also showing the condition of coincidence of the pendant limit switches and the rotary valve limit switches for effecting a selective positioning of the valve spool to establish a particular selected spindle speed;

FIG. 30 is a chart showing the twenty-four various valve spool positions, the spindle speed established thereby and the positions of the shifter shafts and the associated gear clusters in the spindle speed transmission for a selected spindle speed;

FIGS. 31, 31A, 31B and 31C are diagrammatic views of the electrical control circuit as it operates to control the various mechanisms of the machine tool in which the present invention is embodied; and FIG. 32 is a diagrammatic view of the hydraulic circuit of the apparatus incorporated in the machine tool.

Figure 1:
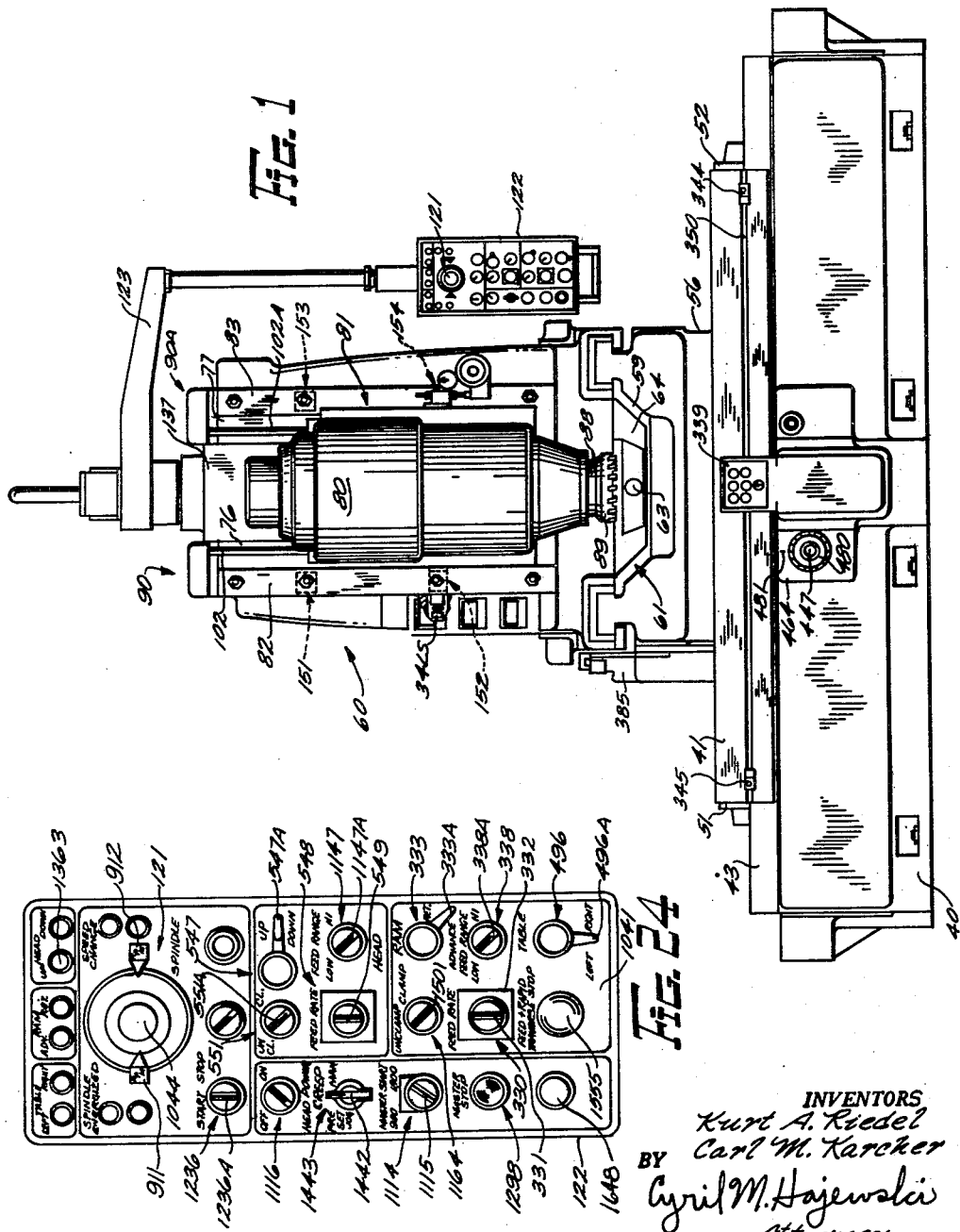
FIGURE 1 is a view in front elevation illustrating a machine tool embodying the features of the present invention.

The machine tool shown in the drawing as exemplifying structure constituting a preferred embodiment of the invention is a vertical spindle bed type milling machine.

Referring more specifically to the drawings, and more particularly to FIGS. 1 to 4, inclusive, thereof, the machine comprises a rigid base or bed 40 upon which a work supporting table 41 is disposed for longitudinal movement on a pair of ways 42 and 43 formed on the bed or base 40. Extending longitudinally of the base or bed 40 between the way surfaces 42 and 43, is a channel 44 in which a unitary table drive saddle 46 is disposed, being securely held in operative position by means of screws (not shown). This arrangement permits the removal of the drive saddle 46 as a unit, to facilitate servicing of the unit as may be required. The drive saddle 46 constitutes a table feed transmission and is operable to effect movement of the table 41 at a low or high rate or at a rapid traverse rate of speed in either direction, as will be subsequently described. The table drive saddle 46 contains a rotatable nut 47, best shown in FIGS. 12 and 25, which is threadedly engaged on a lead screw 48 of relatively large diameter, that is carried in a pair of end brackets 51 and 52 depending from the ends of the table 41. The lead screw 48 is secured in the brackets 51 and 52 so as to be nonrotatable and axially immovable relative to the table and is disposed to extend through the table nut 47 of the table drive saddle so that a drive connection is effected therebetween. Thus, rotation of the nut 47 will effect movement of the table 41 in either direction at a selected rate.

Extending rearwardly from the base or bed 40, there is provided a T-bed extension 56 which is securely bolted to the rear face of the bed 40. The top surface of the T-bed extension 56 is provided with a pair of ways 57 and 58 that extend parallel to the bed extension and transversely of the bed 40. Between the ways 57 and 58 and extending longitudinally of the T-bed extension 56, there is formed a channel 59 in which is located a unitary cross slide or ram feed drive saddle 61 which is substantially the same as the table drive saddle unit 46 and is operative to effect movement of a cross slide or ram 60 that is slidably supported on the ways 57 and 58. The ram drive saddle 61 is removably secured in operative position in the bed extension 56 by means of a plurality of screws and is removable as a unit for the purpose of facilitating servicing of the unit as may be required. The ram drive saddle 61 contains a rotatable nut 62, as best shown in FIGS. 16 and 25, which is threadedly engaged on a lead screw 63, of relatively large diameter, that is carried in a pair of end brackets 64 and 66 depending from the bottom of the cross slide 60 at the front and rear ends thereof. The arrangement is similar to that for the table screw 48 in that the screw 63 is nonrotatable and axially immovable relative to the ram 60. Thus, rotation of the nut 62 in either direction and at a slow or rapid traverse rate will effect movement of the ram 60 relative to the table 41 in a path of travel which is transverse to the path of travel of the table 41.

Figure 2:
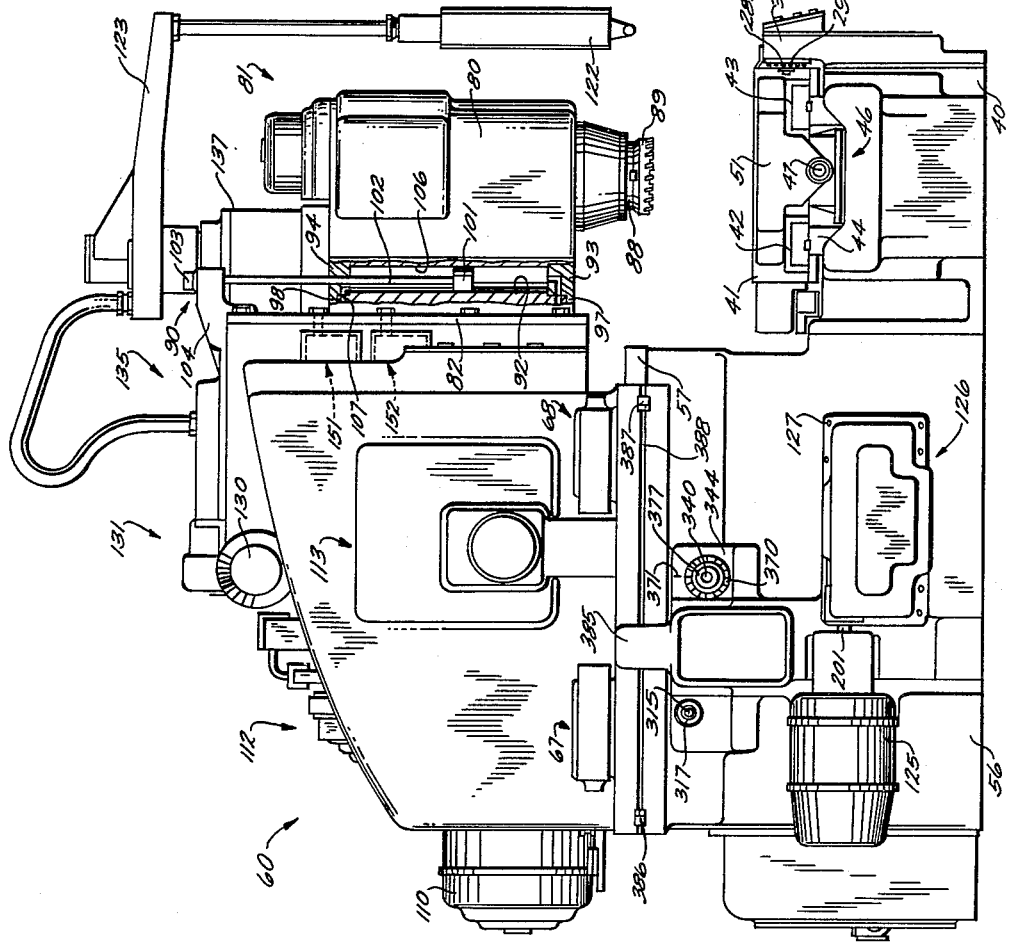
FIG. 2 is a view in left side elevation of the machine tool depicted in FIG. 1, with parts broken away to show one of the head counterbalancing mechanisms.

As shown in FIGS. 2 and 3, four hydraulically actuated clamping units 67, 68, 69 and 70 are disposed in pairs on each side of the ram 60 and are normally conditioned to effect clamping of the ram 60 to the way supports 57 and 58 whenever the ram is not being moved. These clamps are arranged for automatic operation to be released whenever the power feed to the ram is engaged.

The ram 60 is provided on its front face with a pair of spaced vertical ways 76 and 77 which serve to slidably receive complementary ways 78 and 79, respectively, integrally formed with a housing 80 of a tool carrying spindle head 81 to support the spindle head 81 for selected vertical positioning relative to the table 41.

The spindle head 81 is maintained in operative position on the ways 76 and 77 by a pair of retaining plates 82 and 83 which are respectively fastened by means of screws to the front vertical surfaces 84 and 85, respectively, of the ways 76 and 77, as indicated in FIG. 5. A spindle 88 rotatably contained within the spindle head 81 is disposed to carry any of a plurality of well known metal cutting tools such as the cutter 89, as shown in FIGS. 1, 2 and 3. Thus, the cutting tool 89 is positionable vertically relative to the table 41 by movement of the spindle head 81 on the ram 60. Likewise, the cutter 89 may be adjusted in the horizontal plane relative to the table 41 and in a direction transversely of the path of table travel by advancing or retracting the spindle head supporting ram 60, along the T-bed extension 56. These vertical and horizontal movements of the cutter spindle taken with the longitudinal movement of the table 41 transversely of the cutter spindle, provide for relative adjustment between the cutter and the workpiece in three mutually transverse planes, whereby the cutter may be caused to operate at any desired position relative to a workpiece secured on the table within the capacity of the machine.

To relieve the spindle head transmission of the weight of the relatively heavy spindle head 81, a pair of counterbalancing mechanisms 90 and 90A are provided. The counterbalancing mechanisms 90 and 90A are identical, and are located on the right and left sides, respectively, of the spindle head 81 just forward of the spindle head supporting ways 76 and 77. Since the counterbalancing mechanisms 90 and 90A are identical, a description of the counterbalance 90 will apply to both mechanisms. Identical parts are identified by the same reference numeral, but the reference numerals used to identify parts of the mechanism 90A, will also include the suffix letter "A."

As shown in FIG. 2, the counterbalance 90 comprises an elongated bore 92 formed in the left side wall of the spindle head 81 to form a movable cylinder with the ends thereof being closed by suitable closures 93 and 94 having radial flange portions that are disposed and secured within suitable counterbores 97 and 98 provided at the ends of the bore 92. A piston 101 having a piston rod 102 is slidably disposed within the bore 92 and constitutes the fixed member of the mechanism. The piston rod 102 extends upwardly through a suitable opening provided in the upper or top end closure 94 and has its free end 103 secured in a bracket 104 that is bolted or otherwise secured to the top of the ram 60, as shown in FIGS. 2 and 3. To effect a counterbalancing of the head 81, fluid pressure is supplied to a chamber 106 via a passageway 107 formed in the upper end closure 94.

When the spindle head is in an adjusted position, fluid under a predetermined pressure is supplied to the chamber 106 so that substantially the entire weight of the head is counterbalanced by the fluid in the chamber 106 and in the complementary chamber (not shown) in the counterbalance mechanism 90A. However, when the spindle head 81 is caused to move upwardly, fluid will be supplied to these chambers in an amount sufficient to fully occupy the constantly expanding chambers. On the other hand, when the spindle head 81 is caused to move downwardly, the fluid in the chamber 106, and in the complementary chamber of the mechanism 90A, will be allowed to exhaust from the chamber to permit a downward vertical adjustment of the spindle head on the ram 60.

Figure 13:
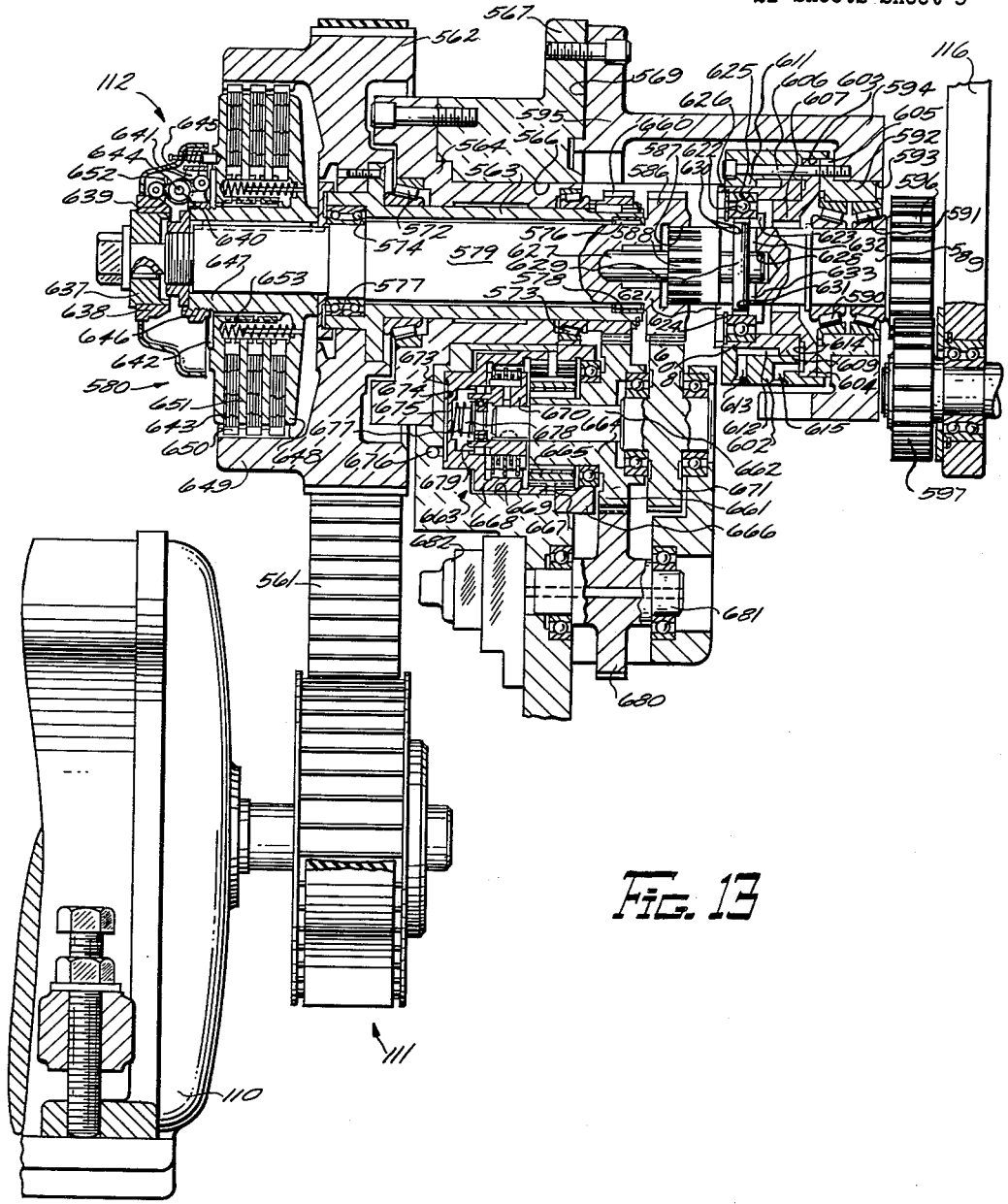
FIG. 13 is an enlarged detail view in vertical section through the spindle clutch drive transmission taken along the line 13—13 of FIG. 4.

Power for driving the spindle 88 is derived from an electric motor 110 that is mounted on an adjustable tensioning platform 105 of well known construction that is disposed at the rear of the ram 60, as shown in FIG. 4. From the motor 110, power is transmitted through a belt drive transmission 111 to a pulley clutch transmission 112 that is secured to the rear face of the ram 60, as shown in FIGS. 4 and 13. From the pulley clutch transmission 112, the power is transmitted to a hydraulically shiftable variable speed change transmission 113 that is contained within a suitable compartment 114 formed in the upper portion of the ram 60, and best shown in FIGS. 10 and 11.

The variable speed change transmission 113 is of unitary construction and extends within the compartment 114 through an opening 117 formed in the left side of the ram 60, as shown in FIG. 10. With the variable speed change transmission 113 being of unitary construction, it may be readily removed from the drive transmission of the spindle, for purposes of maintenance or adjustment, from the left side of the machine without the necessity of dislocating any other mechanism with which it is associated. From the variable speed transmission 113, the power, at a selected speed, is transmitted to a range change mechanism 120 which is operatively contained within the spindle head housing 80, as shown in FIG. 6, and which is arranged to drive the spindle at a selected speed in either a high or low range. The variable speed transmission 113 and the range change mechanism 120 cooperate to drive the spindle 88 at any one of twenty-four speeds selectively. The arrangement is such that the twenty-four output speeds are divided into two groups, with one group comprising sixteen speeds that are employed to drive the spindle in the low range, while the other group has eight speeds for driving the spindle in the high range. The cooperative action of the speed and range selection is established by the machine operator through a single spindle speed selection dial control switch 121 that is mounted on a pendant control box 122 carried on a pendant 123 that is pivotally movable about the machine in 180° of arc.

Both the table 41 and the ram 60 are power driven by an adjustable speed, constant torque D.C. motor 125 that is secured to the left side of the T-bed extension 56 and towards the rear thereof, as shown in FIGS. 2 and 4. The motor 125 is operably connected to a feed distribution transmission 126, also of unitary construction, that is removably mounted in the left side of the T-bed extension 56, as shown in FIG. 2. The distribution transmission 126 is operable to effect a disribution of power to the table drive saddle 46 and, also, to the ram drive saddle 61, for accomplishing simultaneous or individual movement of the associated members in either direction.

The distribution feed transmission 126 may be unitarily removed from the table and ram transmission drive by simply removing a plurality of screws 127 which secure it to the side of the T-bed extension. The table and ram drive saddle assemblies 46 and 61 may likewise be removed by removing the screws (not shown) which secure them to the bed 40 and T-bed extension 56, respectively. These units may be removed from the machine without disrupting other connecting units to greatly facilitate servicing the machine.

The spindle head 81 is vertically positionable on the ram 60, as previously mentioned, and power for effecting such movement is obtained from an electric motor 130 that is mounted on the top of the ram 60 for bodily movement with it, as best shown in FIGS. 4, 5, and 14. As appears in FIG. 5, the motor 130 is connected to a spindle head drive saddle assembly 131, which is also of unitary construction and which is removably mounted on the top of the ram 60. Power from the drive saddle 131 is transmitted to a speed change mechanism 135 that is likewise of unit construction, and which is conveniently disposed within a compartment 134 formed in the spindle head drive saddle 131 and which is accessible from the top of the ram 60 by removing a cover plate 136. The speed change mechanism 135 is operable through the operation of electrical clutches, contained in the unit, to effect vertical movement of the spindle head 81 at either a low or high rate of speed, or, at a rapid traverse rate, selectively.

As shown in FIGS. 5 and 14, power at a selected speed is transmitted by means of gearing located within a forwardly extending gear housing extension 137, integrally formed with the ram 60, to a vertically disposed axially fixed head screw 140 that is rotatably journalled in the gear housing extension 137 of the ram 60. As best shown in FIG. 14, the vertical head screw 140 extends downwardly through the gear housing extension 137 and is disposed so as to extend downwardly behind the head 81 on the right side thereof. In this manner the screw 140 is adequately protected by the vertical ways 76 and 77 and the housing 80 of the head itself. The depending head screw 140 extends through and has threaded engagement in a threaded nut element 142 which is mounted in a nut supporting bracket 143 that is secured to the spindle housing 80. The nut element 142 is connected to the bracket 143 so as to be nonrotatable relative thereto by means of a key 144. At its lower end, the nut 143 is provided with a radially extending flange 146 which engages the lower axial end face of the nut bracket 143. The opposite upper end of the nut 142 is provided with an externally threaded portion 147 which receives a locking nut 148 for locking the nut 142 within the bracket 143 so that the nut is maintained axially immovable relative thereto. The arrangement is such that rotation of the screw 140 will effect vertical adjustment of the head 81 relative to the table 41.

With the spindle head 81 adjusted in a desired position, it is locked therein by means of four hydraulically actuated clamps 151 to 154, inclusive, which are disposed and arranged in pairs within the ram 60 on each side of the ways 78 and 79 of the spindle head 81 and which normally act to engage and clamp the spindle head to the ways whenever the spindle head is not being moved. These clamps are similar to the hydraulically actuated clamps that are provided for clamping the ram 60 to the T-bed extension 56, and are adapted to be released whenever the head is moved.

In FIG. 15 the hydraulic head clamp 152 is shown and a description thereof will apply to the clamps of both the head 81 and the ram 60. The clamp 152 comprises a clamp rod 156 that is reciprocally supported in a bore 157 formed in the side of the ram 60. The outer end of the clamp rod 156 extends through a clamp block 158 that is disposed in a horizontal slot 159 formed in the back of the retainer plate 83. A thrust washer 161 is disposed in an opening 162 formed in the retainer plate 83 in axial alignment with the bore 157 and is operable upon axial inward movement of the clamp rod 156 to effect clamping engagement of the clamp block 158 with the surface 85 of the way 77 and with a front vertical face 163 of the head way 79. The extreme outer end of the clamp rod 156 is threaded and receives a nut 164 and a locking nut 167, the former engaging a washer 168 interposed between the nut 164 and the outer face of the thrust washer 161. Since the retainer plate 83 is securely fastened to the vertical front face of the way 77, it is immovable, therefore upward movement of the clamping rod 156, as viewed in FIG. 15, will operate to forcefully engage the clamp block 158 with the vertical face 85 of the way 77 and with the vertical face 163 of the way 79 of the spindle head 81 to effect a clamping of the spindle head in an adjusted position. On the other hand, downward movement of the clamp rod 156 will effect a release of the clamping action to release the head 81 so that it may be moved either upwardly or downwardly as the case may be.

For effecting axial movement of the clamp rod 156 in either direction, the rod 156 extends into the side of the ram 60 into a supporting block compartment 169 that is formed in the ram in the right side thereof and behind the way 77. The extreme inner end 171 of the rod 156 is supported in a bore 172, the axis of which coincides with the axis of the bore 157. As shown in FIG. 15, the portion of the rod 156 that is within the chamber or compartment 169 is provided with a screw thread 173 for engagement with a nut 174 that is rotatably journalled in a pair of antifriction thrust bearings 175 and 176 carried in a supporting block 177. A cylindrical extension 179 integrally formed with the carrier block 177 extends inwardly into a horizontal bore 181 and serves as the rear supporting member for the carrier block 177. The bore 181 serves as a cylinder for a piston 182 which is reciprocally supported therein and which is connected to effect rotation of the nut 174. Such connection is effected through a piston rod 183 integrally formed with the piston 182 and which is provided with a rack 184 arranged to mesh with a pinion 186 that is mounted on and keyed to the nut 174. The free end of the piston rod 183 extends within and is slidably supported in a bore 187 formed in an outer cylindrical extension 188 which is also integrally formed with the carrier block 177 and serves to support the end of the piston rod in axial alignment with the piston thereof to maintain the meshing engagement between the rack 184 and the pinion 186. The carrier block assembly is maintained in operative position by means of a cover plate 189 which is recessed in a suitable opening 191 formed in the right side of the ram 60. The cover plate 189 is provided with an opening 192 which receives and supports the outer cylindrical extension 188 of the carrier block 177 to thereby effect horizontal positioning of the carrier block 177.

Assuming that the thread of the screw portion 173 of the clamp rod 156 is a left-handed thread, fluid pressure supplied to a chamber 193 on the rod side of the piston 182 via a passageway 196 will cause the piston 182 to move rightwardly, in the bore 181, as viewed in FIG. 15, thereby effecting counterclockwise rotation of the nut 174, as viewed from the bottom in FIG. 15. Since the nut 174 is restrained from axial movement, the clamp rod 156 will be caused to move downwardly, thereby effecting a release of the clamping action exerted by the clamp block 158 on the ways 77 and 79, and thereby release the head 81.

As the piston 182 is moved rightwardly for effecting a releasing operation of the clamp 152, a plunger 197 reciprocally supported in a limit switch mounting block 198 that is secured to the cover plate 189, is released and will move rightwardly by action of a spring 199 operatively disposed in the limit switch mounting block 198. As the plunger 197 moves rightwardly it operates to effect a release of an actuating rod 200 of a limit switch 34LS thereby allowing a contact 1592, shown in FIG. 31B, to close and thereby partially condition the electrical circuit within an electronic control panel 1327 for subsequent movement of the head 81.

On the other hand, fluid pressure supplied to a chamber 194 via a passageway 195 formed in the internal wall of the ram 60 will cause leftward movement of the piston 182, as viewed in FIG. 15, resulting in clockwise rotation of the nut 174, as viewed from the bottom in FIG. 15, and which will result in upward movement of the clamp rod 156 to effect a clamping of the spindle head. As the piston rod 183 is moved leftwardly the left end of the rod engages the plunger 197 forcing it to move leftwardly to actuate the limit switch actuating rod 200 causing the contact 190 thereof to open to interrupt the electrical circuit so that the feed motor 130 cannot be accidentally energized.

As previously mentioned, both the table 41 and the ram 60 are driven in their path of travel by the motor 125 which is provided with a relatively long drive shaft 201 that is operatively disposed to extend within the feed distribution drive transmission 126 and which has integrally formed on the inner extending end thereof a worm 202, as best shown in FIG. 25. The drive shaft 201 extends inwardly into the housing 203 of the feed distribution transmission 126 in position to have the worm 202 thereof mesh with a worm wheel 204 which is mounted on and secured to a distribution shaft 206 that is rotatably journalled in the front and rear walls of the distribution housing 203. The distribution shaft 206 is provided with power distribution gears 207 and 208 which are disposed on either side of the worm gear 204 and which are keyed to the shaft 206 so as to be rotatably driven thereby. As shown in FIG. 25, the drive gear 207 is disposed to have meshing engagement with a ram advance power gear 211 and a table left power gear 212 which are part of a ram directional drive transmission 209 and a table directional drive transmission 210, respectively. The transmissions 209 and 210 for effecting ram movement and table movement, respectively, are substantially identical and a detailed description of the transmission 209 will likewise apply to the table transmission 210 which is utilized to effect table movement.

The power gear 211 is formed with an elongated hub 213 and is journalled on a power output shaft 214 that in turn is journalled in the housing 203. Mounted on and keyed to the hub of the gear 211 is a body 216 of an electromagnetic clutch 215 which includes an armature 217 and a pressure plate 218 mechanically attached together by means of bolts (not shown) in the usual manner. The arrangement is such that as the gear 211 is driven in a counterclockwise direction, as viewed from the bottom in FIG. 25, by the gear 207 through operation of the motor 125, the body 216 of the electrical clutch 215 will rotate with the gear. Secured to the body 216 of the clutch 215 and disposed between the armature 217 and the pressure plate 218 are a plurality of spaced apart driving plates 219 which are connected to be rotatable with the body 216. A driving gear 221 is mounted on the shaft 214 and keyed thereto and is provided with a plurality of friction disks 222 that are disposed in alternate relationship between the driving plates 219. The driving plates and the friction disks 222 are biased apart by means of springs (not shown) in well known manner. A stationary coil 223 having an outer field ring 224 is energizeable through an electrical circuit to be described, for setting up a magnetic clutch circuit which attracts the armature 217 towards the outer field ring 224 causing the pressure plate 218 to move the driving plates 219 into full friction coupling engagement with the driven disks 222. This action effects a coupling of the driving gear 221 to the rotating body 216 which is being driven through the gear 211. As the driving gear 221 is rotated, the key connection effected between the driving gear 221 and the shft 214 will cause the shaft 214 to rotate. By interrupting the circuit to the coil 223, the armature 217 is released along with the pressure plate 218 and the separating springs (not shown) cause instantaneous separation of the driving plates 219 and the friction disks 222, thereby disconnecting the shaft 214 from the gear 211.

For effecting retraction of the ram 60, another electromagnetic clutch 225 is provided which is similar in all respects to the clutch 215. However, the clutch 225 operates to drive the shaft 214 in an opposite direction with respect to the direction that the shaft 214 is driven by the clutch 215. To this end, the gear 208 is arranged to have meshing engagement with an idler gear 226 which is journalled in the distribution housing 203 and which is arranged to have meshing engagement with a driving gear 227 which is antifrictionally journalled on the shaft 214 in the manner of the gear 211. A body 228 of the clutch 225 is keyed to the hub of the gear 227 and comprises an armature and a pressure plate which carry driving plates in the manner of the clutch 215. A driving gear 229 also mounted on the shaft 214 and keyed thereto is provided with friction disks alternately arranged between the driving plates of the body and are disposed to have frictional engagement whenever a stationary coil 231 is energized which attracts the pressure plate of the clutch 225 for frictionally engaging the driving plates and friction disks together to thereby connect the driving gear 229 through the rotating member or body 228 of the clutch. This action will effect rotation of the shaft 214 in a clockwise direction, as viewed from the bottom in FIG. 25, which is opposite to the direction in which the shaft 214 is driven by means of the gear 211.

Thus, whenever the motor 125 is operated to effect a power input to drive the shaft 206 in a clockwise direction, as viewed from the bottom in FIG. 25, the gear 211 will be driven in a counterclockwise direction while the gear 227 will be driven in a clockwise direction by reason of the intermediate idler gear 226. Therefore, by energizing either the clutch 215 for effecting counterclockwise rotation of the shaft 214 or by energizing the clutch 225 to effect clockwise rotation of the shaft 214, the ram 60 may be caused to move either in a retracting direction or in an advancing direction, respectively.

A similar arrangement is provided for effecting power input to the table drive saddle 46 and comprises the gear 212 which is connected to transmit power for moving the table in a leftward direction and includes an elongated hub 236 which is journalled on a shaft 237 that is in turn journalled in the distribution housing 203. A rotating body member 238 of a clutch 240 is mounted on the hub 236 and is keyed thereto for rotation with the gear. A driving gear 241 is mounted on and keyed to the shaft 237 and is provided with a plurality of friction disks which are alternately arranged between driving plates carried by the rotating body member 238 in the identical manner as was described for the clutch 215. A stationary coil 242 is energizable from an electrical circuit, to be subsequently described, which causes the pressure plate of the body member to effect frictional engagement of the driving plates and friction disks for effecting the coupling of the driving gear 241 to the rotating body member of the clutch which thereby effects counterclockwise rotation of the shaft 237.

A table right clutch 245 controls rightward movement of the table and comprises a gear 246 having a hub 247 that is antifrictionally journalled on the shaft 237, with the gear 246 being driven in a clockwise direction by operation of an idler gear 249 that is antifrictionally journalled in the distribution box 203 and which is disposed in meshing engagement with both the gear 246 and the gear 208. Keyed to the hub of the gear 246 is a rotatable body 251 of the clutch 245 to which are connected a plurality of driving plates between which are alternately disposed a plurality of friction disks 253 that are operatively connected to the driving gear 250 in the manner described for the clutches 240. A coil 254 which is maintained stationary by means of a bracket (not shown) is energizable from an electrical circuit, to be described, for engaging the driving plates and the friction disks in coupling arrangement to effect the drive input to the driving gear 250 which operates to effect clockwise rotation of the shaft 237. Thus, power input to the table drive saddle 46 for effecting leftward movement of the table may be effected by energizing the clutch 240 or the table may be moved in a rightward direction by energizing the clutch 245 as desired.

The power from the shaft 214 is imparted to the ram saddle drive transmission 61 through a bevel gear 261 which is secured to the extending end of the shaft 214, as shown in FIGS. 16 and 25. The bevel gear 261 has meshing engagement with a bevel gear 262 which is connected to drive a shaft 263 that is rotatably journalled in the T-bed extension 56. A bevel gear 264 is keyed to the shaft 263 to be rotated thereby and is disposed in meshing engagement with a bevel gear 267 that is splined on the end of an input shaft 268 that is antifrictionally journalled in the table drive saddle assembly 61. The extreme left end of the shaft 268, as viewed in FIG. 25, is provided with an integrally formed pinion 269 which has meshing engagement with a gear wheel 271 keyed on the left end of a low range drive shaft 272. Keyed on the left end of the shaft 272 adjacent to the gear 271 is a rotatable body member 273 of a low range magnetic clutch 275. The shaft 272 is journalled in the exterior wall of the drive saddle housing 276 and an interior wall thereof. Antifrictionally journalled on the right end of the shaft 272 is a gear cluster 277 which comprises a driving gear 278 that has mounted thereon for driving engagement therewith a plurality of friction disks. The rotatable body member 273 of the clutch 275 is provided with a plurality of driving plates which are arranged to rotate therewith and which are disposed in alternating relationship with the friction disks of the driving gear 278. The driving plates and friction disks are adapted to be frictionally coupled by means of an axially movable pressure plate 281 that is operatively connected to the rotatable member 273 by means of bolts (not shown). A stationary coil 282 is operable when energized to effect movement of the pressure plate to move the friction disks into engagement to effect a coupling of the rotatable member with the driving gear 278. The gear cluster 277 includes a pinion 283 which is arranged in meshing engagement with a gear 284 splined on a drive shaft 286 that is rotatably journalled in the ram drive saddle assembly 61. The rotation of the drive shaft 286 as effected through the gear 284 is transmitted to a pinion 287 which is also splined on the shaft 286 and is arranged to have meshing engagement with a ram nut driving gear 291 that is journalled in axially immovable bushings 292 and 293 that are mounted in the ram drive saddle 61. The nut driving gear 291 is provided with elongated axially extending body members which are mounted on and spline connected to the inner extending end of a pair of nut elements 294 and 295 that are threadedly engaged on the ram lead screw 63 which is fixedly mounted in the ram end brackets 64 and 66, as shown. Thus, rotation of the nut driving gear 291 will effect rotation of the nut elements 294 and 295 relative to the screw 63 by reason of the splined connection therebetween to cause movement of the ram 60 in an advancing or retracting direction depending upon the direction of rotation of the nut driving gear 291.

In order to maintain the nut elements 294 and 295 axially stationary, their tubular outer ends receive antifriction thrust bearings 296 and 297, respectively, which are disposed within suitable openings provided in the drive saddle 61, as shown in FIG. 25. A thrust washer 301 having a peripheral thread is disposed to engage the outer race of the antifriction thrust bearing 296 while the axial outer end of the thrust washer abuts the axial inner face of an antibacklash adjusting nut 302 that is disposed on the extreme outer end of the nut element 294. The adjusting nut 302 is disposed within a retainer bracket 303 that is fastened to the end of the drive saddle 61 by means of screws (not shown) and which operates to maintain the antibacklash adjusting nut 302 in operative position. An adjusting nut 304 is threadedly engaged on the threaded thrust washer 301 and is disposed so that a radial flange 305 formed on the nut 304 engages against an inwardly extending flange 306 provided on a cap 307 of the drive saddle assembly 61. The radially extending flange 305 of the nut 304 also engages in an annular groove 308 formed in a drive saddle bracket 309. The flange 305 and the shoulder of the groove 308 cooperate to prevent axial outward movement of the nut 301. A somewhat similar arrangement is provided for the nut element 295 in that the bearing 297 is locked in position on the outer tubular end of the nut 295 by means of a thrust washer 311 which is provided with a radialy extending flange 312 that is engaged in an annular recess provided in the cap 307 and in a complementary annular recess provided in the drive saddle bracket 309, as shown in FIG. 25. Thus, the nut elements 294 and 295 are prevented from moving axially outwardly relative to each other but are free to move axially inwardly towards each other for the purpose of adjusting the backlash that may exist between the associated nut elements 294 and 295 and the screw 63.

To effect an adjustment, the backlash adjusting nut 302 is provided with a peripheral geared portion 313 which has meshing engagement with a gear rack 314 provided on the inwardly extending end of an adjusting rod 315 that is supported for axial movement in the end block or bracket 303 and which extends outwardly through the T-bed extension 56 through the left side of the machine, as shown in FIGS. 2 and 4. As shown in FIG. 2, the outwardly extending end of the adjusting rod 315 is provided with an adjusting knob 317 which has a threaded connection with the adjusting rod 315 so that clockwise rotation of the knob 317 will cause an axial movement of the adjusting rod 315. Since the rack 314 is formed on the rod 315, axial movement of the latter will effect longitudinal movement of the rack 314 to rotate the gear 313 and its associated backlash adjusting nut 302. The adjusting nut 302 rotates relative to the threaded thrust ring 304 so that relative axial movemetn between the thrust ring 304 and the adjusting nut 302 is effected to exert an axial inwardly acting force on the nut element 294 through the bearing 296 to effect its axial movement relative to the screw 63, placing the screw 63 under compression. On the other hand, when the knob 317 is rotated in a counterclockwise direction, as viewed in FIG. 2, the inwardly acting thrust force is relieved and the nut element 294 will be released so that the compressive force on the section of the screw 63 within the nut elements 294 and 295 is released. This relieves the antibacklash adjustment that may have been made on the nuts 294 and 295 with respect to the screw 63.

To effect ram movement in a high range in a selected direction as established by the energization of either of the directional clutches 215 and 225, the shaft 268 is provided with a high range clutch 320 which is essentially the same as the clutches previously described. As shown, the clutch 320 generally comprises a rotatable body member 321 which is keyed to the shaft 268 and which is provided with a plurality of driving plates 322 that are arranged in alternate relationship with a plurality of friction disks connected to a driving gear 324. The driving gear 324 is formed as a part of a gear cluster 325 which has a large gear wheel 326 formed thereon. The gear cluster 325 is mounted on antifriction bearings 327 that are disposed on a reduced portion of the shaft 268, as shown in FIG. 25. With this arrangement the shaft 268 may be driven in one direction or the other as determined by the engagement of one or the other of the clutches 215 or 225, and the shaft 268 will rotate relative to the gear cluster 325 until such time as the high range clutch 320 is energized to effect the frictional engagement of the driving plates and friction disks thereby coupling the gear cluster 325 to the rotating body member 321 of the clutch.

The larger gear 326 of the gear cluster 325 is disposed in meshing engagement with a small gear 334 that is part of a gear cluster 335 mounted on and key connected to a high range drive shaft 335 that is antifrictionally journalled in the drive saddle housing. The gear cluster 335 is provided with a larger gear 337 which has meshing engagement with the gear 287 splined on the shaft 286 so that a high range drive to the nut drive gear 291 is effected. Thus, with the low range clutch 275 deenergized and the high range clutch 320 energized, the drive is through the shaft 268, the rotatable body 321 of the clutch 320, the driving gear 324 coupled to the rotatable body member 321 by operation of the driving disks and friction disks, and through the gear 326 which drives the smaller gear 334 of the gear cluster 335 with the larger gear 337 thereof effecting rotation of the gear 287 which in turn drives the nut driving gear 291 in a high range and in a direction as effected by selective energization of either the retracting clutch 215 or the advancing clutch 225 contained within the feed distribution housing 203. Thus, the ram 60 may be advanced or retracted in either a low or high range and at a selected speed which is established by controlling the speed of the variable speed motor 125.

The speed of the motor 125 is controlled and established by means of a potentiometer 330 that is contained in the pendant 122. The selective setting of the potentiometer is effected by means of a manually adjustable knob 331 having an indicator pointer which is readable against indicia scribed on a face plate 332 of the potentiometer 330. The potentiometer is operable to control the speed of the motor 125 so as to effect a variable feed drive of the ram from five to seventy-five inches per minute in the high range or from zero to five inches per minute in the low range, and in either direction.

The directional clutches 215 and 225 are energizable by manually actuating a neutrally biased lever 333A of a directional selector switch 333 located on the pendant 122 which lever when moved upwardly, as viewed in FIG. 1, will effect energization of the ram retracting clutch 215 and when actuated downwardly from the neutral position shown in FIG. 24, will effect energization of the ram advancing clutch 225. The switch 333 will return to a neutral position whenever it is released and when in such neutral position will cause the advance and retract clutches 225 and 215, respectively, to be deenergized. The low range clutch 275 and the high range clutch 320 are energizable by means of a range selector switch 338 which is conditionable for effecting energization of either clutch selectively by means of an actuating knob 338A that is positionable to one or the other of two positions, and as shown, is in a position to effect energization of the low range clutch 275. The switch knob 338A, when rotated or actuated in a clockwise direction, as viewed in FIG. 2, will be in position of effect energization of the high range clutch 320. Thus, the operator may establish the rate at which the ram is to be moved either in a low range by selectively positioning the knob 338A to the left to effect energization of the low range clutch 275 and by adjusting the knob 331 of the potentiometer 330 to the desired setting. After such a setting has been effected, the operator will then actuate the switch lever 333A downwardly to effect energization of the advance direction clutch 225 which causes the drive from the motor 125 to be imparted to the ram 60 in the desired direction of advancement. If the operator desires to effect a retraction of the ram 60 at the same feed rate, the switch actuating lever 333A will be moved upwardly through the neutral position to its uppermost position which will effect deenergization of the advancing clutch 225 and will effect energization of the retraction clutch 215 thereby retracting the ram at the established feed rate in the low range. On the other hand, if it is desired to effect movement of the ram 60 at a rate of speed which is within the high range, the operator will rotate the actuating lever 338A of the range selector switch 338 in a clockwise direction to its rightward position, thereby effecting deenergization of the low range clutch 275 and energization of the high range clutch 320. The knob 331 of the potentiometer 330 will then be adjusted to establish the feed rate at which it is desired that the ram 60 be moved in the high range, and upon obtaining such setting, the actuating lever 333A of the switch 333 will be moved upwardly from its neutral position to effect a retraction of the ram or it will be moved downwardly from its neutral position to effect an advancement of the ram at the selected speed in the high range.

Provision has been made for advancing or retracting the ram 60 manually and such movement is accomplished by means of a manual adjusting shaft 340 which is rotatably supported in the T-bed extension and which extends outwardly thereof on the left side of the machine, as shown in FIGS. 2 and 16. The inner end of the adjusting shaft 340 is provided with a bevel gear 341 which has meshing engagement with a bevel gear 342 that is mounted on the extending end of the shaft 286, as shown in FIG. 16. As best illustrated in FIG. 16, the outwardly extending end of the adjusting shaft 340 extends through and is journalled in a pair of antifriction bearings 343 that are mounted in a recess provided in a bracket 344 that is fastened to the left side of the T-bed extension 56. The manual adjusting shaft 340 is provided with a bore 346 in which is disposed a reciprocal plunger 347 that is biased outwardly by means of a spring 348 contained within the inner end of the bore 346 and which engages the inner end of the plunger 347. A cone shaped cam 349 is engaged on the shaft 340 and is connected to the plunger 347 by means of a transverse pin 351 that passes through aligned slots provided in the shaft 340. Therefore, axial inward movement of the plunger 347 will effect axial inward movement of the cone shaped cam 349 so that the cam surface 352 thereof will move into engagement with the extending end of a switch actuating rod 354 that is disposed within a bore 355 provided in the bracket 344. The switch actuating rod 355 is arranged for axial movement and is biased upwardly into the path of travel of the cam 349 by means of a spring 356 which engages an enlarged portion of the actuating rod 354 that is disposed within a counterbore 357 of the bore 355. The spring 356 is maintained in operative position by means of a threaded bushing threadedly engaged in the outer end of the counterbore 357. The arrangement is such that the spring 356 is constantly biasing the actuating rod 354 inwardly into the path of travel of the cam 349. Extending outwardly or downwardly, as viewed in FIG. 16, from the enlarged portion of the actuating rod 354 is a switch actuating pin 358 which is disposed to be moved into engagement with an actuating button 359 of a limit switch 19LS which is securely fastened within the interior of the bracket 344. The limit switch 19LS is electrically connected into the circuit of the ram directional clutches 215 and 225, and into the electrical circuits of the low and high range clutches 275 and 320, respectively, and operates when actuated to interrupt the circuit to these clutches so that they cannot be energized whenever the manually operable shaft 340 is used to effect adjustment of the cross slide 60. For effecting rotation of the manual adjusting shaft 340, its extreme outer end is provided with a plurality of axially extending teeth 362 which are arranged to mesh with axially extending teeth 363 formed on the hub of a hand crank 364 that is provided for effecting rotation of the shaft 340. The hand crank 364 is provided with an elongated nose portion 367 which is adapted to engage against the axial outer end of the plunger 347 whenever the crank 364 is engaged to rotate the shaft 340. The arrangement is such that when the crank 364 is employed, the nose portion 367 thereof will abut the end of the rod 347 and cause it and its associated cam 349 to move inwardly for effecting actuation of the limit switch 19LS before the teeth 363 of the crank become meshed with the teeth 362 of the shaft 340.

The amount of ram movement effected through the manual adjusting shaft 340 is visually indicated by an indicator dial 370 which cooperates with an indicator mark 371 scribed on the bracket 344.

In operation, whenever the ram 60 is to be moved by the manually actuatable shaft 340, the crank 364 will be inserted in the bore 346 of the rod 340 and the crank guide pin 367 will engage the end of the plunger 347 before the teeth 363 of the crank engage the teeth 362 of the shaft 340. As the crank is further engaged in the bore 346, the plunger will be caused to move axially inwardly against the spring pressure 348 to effect axial inward movement of the cam 349 so that the cam surface 352 thereof will engage against the end of the rod 354 which is disposed within its path. The rod 354, upon being actuated, will move downwardly, as viewed in FIG. 16, compressing the spring 356 and moving the rod 358 into engagement with the actuating button 359 of the limit switch 19LS to interrupt the electrical circuits to the directional clutches 215 and 225 and also to the low and high range clutches 275 and 320, respectively. Upon further inward movement of the crank, the teeth 363 thereof will engage the teeth 362 of the rod 340 and rotation of the crank will thereby effect axial adjustment of the ram head in an advancing or retracting direction, depending upon the direction of rotation of the crank 364. The manual adjustment for effecting advancing or retracting movement of the ram 60 is provided to facilitate extremely fine positioning of the ram and thereby the cutter 89 relative to the table 41.

As previously mentioned, the motor 125 is, also, operably connected to effect table movement in either direction and in a low or high range of table feed. This directional control is effected through the table left clutch 240 or the table right clutch 245, as previously described. For effecting a directional drive to the table drive saddle 46, the shaft 237 is provided with a bevel gear 401 which is disposed to have meshing engagement with a bevel gear 402 that is secured to the end of a shaft 403. The shaft 403 is journalled in the T-bed extension 56 and extends into the table bed 40 where it has a splined connection with a bevel gear 404 that is journalled in the table drive saddle 46, as shown in FIGS. 12 and 25. The bevel gear 404 is disposed in meshing engagement with a bevel gear 406 that is secured to the extending end of a drive shaft 407 that is journalled in the table drive saddle 46. As viewed in FIG. 25, the upper end of the shaft 407 is provided with a relatively small gear 408 that is secured thereto for rotation with the shaft 407 and which has meshing engagement with a relatively large gear 409 mounted on and keyed to a low range drive shaft 411 that is journalled in the table drive saddle 46. Mounted on and keyed to the low range drive shaft 411 is a rotatable body member 412 of a low range clutch 413 which is similar to the low range clutch 275 associated with the ram 60. When the low range clutch 413 is engaged, by energizing a coil 414 thereof, it operates to couple a driving gear 416 of a gear cluster 417 that is journalled on the low range shaft 411. The gear cluster 417 is also provided with a driving gear 418 which is disposed to have meshing engagement with a gear 419 that is splined on a transfer shaft 420 which is also journalled in the table drive saddle 46. The driven gear 419 drives the transfer shaft 420, which, in turn, rotates a gear 421 that is also splined on the transfer shaft 420 and which is disposed in meshing engagement with a table nut driving gear 422 that is operatively connected to a pair of table nut elements 423 and 424 for effecting their rotation relative to the screw 48 to produce longitudinal movement of the table 41. The table nut assembly is identical to the nut assembly associated with the ram 60 which was previously described.

For effecting table movement in a high range, the shaft 407 is provided with a high range clutch 435 that is similar in all respects to the high range clutch 320 associated with the ram 60. The clutch 435 comprises a rotatable body member 436 which is keyed to the shaft 407 and is arranged to be coupled to a driving gear 437 which is a portion of a gear cluster 438 that is journalled on the shaft 407. The gear cluster 438 also includes a relatively large gear 439 that has meshing engagement with a relatively small gear 441 which is formed as a part of a gear cluster 442 that is keyed on a high range drive shaft 443 which is journaled in the table drive saddle 46. As can be seen in FIG. 25, the gear cluster 442 includes a gear 444 that is disposed to mesh with the gear 421 that is splined on the transfer shaft 420. Thus, whenever the high range clutch 435 is energized, the drive from the shaft 407 is transmitted to the driving gear 437, and thence to the larger gear 439 which has meshing engagement with the gear 442 and which is arranged to drive the gear 444, and the power is transmitted therefrom to the table nut drive gear 422 via the intermediate transfer gear 421. Since the low range drive clutch is deenergized, the gear train comprising the gears 419, 418, and 416 will be rotated but will be ineffective since the driving gear 416 and the body 412 of the clutch 413 are not coupled. In like manner, whenever the low range clutch 413 is energized, the drive to the transfer gear 419 will also cause the high range gear train comprising the gears 444, 442, 439 and 437 to rotate without transmitting power, since there is no connection or coupling effected between the driving gear 437 and the rotatable body member 436 of the high range clutch 435.

Provision has also been made for effecting manual movement of the table 41 in either direction and such mechanism, as shown in FIG. 12, is substantially the same as the mechanism provided for manually moving the ram 60 and which has been described in detail. Generally, the mechanism for manually actuating the table 41 comprises an adjusting shaft 447 which is rotatably supported in the bed 40 and extends outwardly through the front of the bed, as shown in FIG. 1. A bevel gear 448 is spline connected to the inner extending end of the adjusting shaft 447 and is disposed to mesh with a bevel gear 449 secured to the extending end of the idling drive shaft 420 to complete a drive to the table nut drive gear 422.

As shown in FIG. 12, the mechanism for effecting manual actuation of the adjusting shaft 447 is identical to the mechanism provided for manual actuation of the adjusting shaft 340 associated with the ram 60. Such adjusting mechanism generally comprises a bore 452 that is formed in the outer end of the adjusting shaft 447 for receiving an actuating plunger 453 that is biased outwardly by a spring 454 that is arranged to act against the right end of the bore and the inner end of the plunger 453. A cone cam 456 is slidably mounted on the shaft 447 and is connected to move with the plunger 453 by means of a transverse pin 457 that extends through aligned slots provided in the shaft 447. The pin 457 serves not only to connect the cam 456 to the plunger 453 but also to limit the outward movement of the plunger 453. The cam 456 has a cam surface 461 that is disposed to engage an extending end of a limit switch actuating rod 462 whenever the plunger 453 is moved inwardly or to the right, as viewed in FIG. 12. The rod 462 is contained within a bore 463 that is formed in a dial bracket 464 which is secured to the front surface of the bed 40 by means of screws 467, one of which is shown.

The actuating rod 462 is maintained in its uppermost position so that it extends in the path of travel of the cam 456 by means of a spring 468 which acts against an enlarged portion of the actuating rod that is contained within a counterbore 469 and which is maintained in operative position by a threaded bushing 471 threadedly engaged in the counterbore 469, as shown in FIG. 12. The actuating rod 462 is provided with a pin or dowel 472 that extends through a suitable opening provided in the bushing 471 and which is arranged to be engageable with an actuating button 473 of a limit switch 20LS that is secured in a suitable compartment within the bracket 464. The limit switch 475 is operable, when actuated by the pin 472, to interrupt the electrical circuits to the table left and table right clutches 240 and 245, respectively, and also to the table low range clutch 413 as well as to the table high range clutch 435. Thus, whenever the table is to be moved manually, the limit switch will be actuated to disengage the associated clutches and thereby insure that the table cannot be power operated while manual movement is being accomplished.

For actuating the adjusting shaft 447, the crank 364 shown in FIG. 16 may be employed and inserted in the bore 452 of the shaft 447 whereupon the guide pin 367 of the crank will engage the end of the plunger 453 prior to the teeth 363 of the crank becoming engaged with complementary teeth 476 provided on the extreme outer end of the shaft 447. As the crank is engaged with the shaft, the guide pin 367 thereof actuates the plunger 453 inwardly to move the cam 456 into position for shifting the switch actuating rod 462, thereby disconnecting the clutches associated with the table from the electrical circuit. A dial 480 cooperates with an indicating mark 481 scribed on the bracket 464 for visually indicating the amount of movement effected by manually actuating the shaft 447.

Since the variable speed motor 125 is operable to supply power for moving both the ram 60 and the table 41, through the feed distribution box 126, the potentiometer 330 also operates to establish the feed rate of the table 41, while the range selector switch 338 operates to establish the low or high range drive for both the ram and the table. However, the table 41 may be moved either to the left or to the right, selectively, independently of the direction of movement of the ram 60. This control is effected through a directional switch 496 located on the pendant 122 and which is similar to the ram directional switch 333, in that an actuating lever 496A thereof is biased to a neutral position, as shown in FIG. 24, and is positionable to the left for effecting a leftward table movement and when so positioned, will cause the directional clutch 240 to be energized so that the drive from the motor 125 will be transmitted to the table drive saddle 46 via the gear 207, the gear 212, the driving gear 241 of the clutch 240, the shaft 237 and thence to the table drive saddle 46. On the other hand, should it be desired to effect rightward movement of the table 41, the actuating lever 496A will be moved rightwardly from its neutral position thereby effecting energization of the rightward directional clutch 245 so that the power of the motor 125 is transmitted to the table drive saddle via the gear 208, the idler gear 249, the gear 246, the driving gear 250 of the clutch 245 and thence to the drive shaft 237.

In operation, the ram low range clutch 275 and high range clutch 320, and, also, the table low range clutch 413 and high range clutch 435 are maintained energized at all times whenever the ram or table, respectively, are not in motion to effect a braking action in their associated movable members. At the same time, however, the ram directional clutches 215 and 225 or the table directional clutches 240 and 245 are deenergized so that the motor 125 merely operates to drive the gears 211 and 212 and gears 227 and 246 of the directional transmission 126 in an idling motion. When it is desired to effect ram or table movement either together or independently in a selected direction, one or the other of the directional clutches 215 or 225 associated with the ram 60 will be energized and one or the other of the table directional clutches 240 or 245 will be energized and the energization of any of the directional clutches operates to automatically deenergize the low range clutch or the high range clutch associated with each drive saddle depending upon the position of the range selector switch 338 that is located on the pendant 122.

For example, assuming that it is desired to move the ram 60 at a selected feed rate in the low range and in an advancing direction of movement, the operator will set the potentiometer 330 to a desired setting for effecting the desired feed rate and will position the range selector switch lever 338A to the left, as shown in FIG. 24. This will complete the electrical circuit to the ram low range clutch 275 and the high range clutch 320, and, also, to the table low and high range clutches 413 and 435, respectively, for effecting the energization of these clutches. However, when the operator actuates the ram directional switch lever 333A downwardly for effecting energization of the ram advance clutch 225, the high range clutch 320 will also be automatically deenergized simultaneously therewith, so that the directional movement of the ram in an advancing movement and in a low range at a selected speed will be effected immediately. When the ram arrives at the desired position, the operator will stop ram movement by depressing a transverse stop button 1555 which operates to effect deenergization of the advancing clutch 225 and automatically and simultaneously therewith effect energization of the high range clutch 320 so that both range clutches are engaged which applies a braking action to the ram.

Similarly, if it was desired to move the table to the right at the same feed rate in the low range, the potentiometer 330 will be maintained in the setting and the range selector switch 338 will be maintained in its position so that when the operator actuates the table directional switch lever 496A to the right, as viewed in FIG. 24, to effect table rightward movement, the directional clutch 235 will be energized for effecting such movement and the high range clutch 435 will be simultaneously deenergized so that movement of the table to the right will be accomplished at a selected feed rate in the low range.

When table movement has been initiated through actuation of the directional switch actuating lever 496A, the lever may be released to return to its neutral position and table movement in the selected direction will continue until either a table left limit switch 28LS or a table right limit switch 29LS, that are disposed in a post 339, is actuated, depending upon the direction in which the table is moving. The switches 28LS and 29LS are actuated by a table left stop dog 344 and a table right stop dog 345, respectively, both adjustably mounted in a T-slot 350 provided in the table 41. When one or the other of the limit switches 28LS or 29LS is actuated, the circuit to the energized directional clutch will be interrupted and the circuits to the table low and high range clutches will be re-established, thereby stopping table movement. Table movement may also be terminated by depressing the traverse stop button 1555 located on the pendant 122, as shown in FIG. 24.

Similarly, ram movement in a selected direction will continue in the selected direction until a ram advance limit switch 22LS or a ram retract limit switch 23LS, located on a post 385, is actuated, by operation of a ram advance stop dog 386 or a ram retract stop dog 387, respectively, both adjustably mounted in a T-slot 383 provided on the left side of the ram 60, as shown in FIG. 2. When one or the other of the limit switches 22LS or 23LS is actuated, the circuit to the selected energized directional clutch will be interrupted and the circuit to the ram low and high range clutches will be re-established, thereby stopping ram movement. Movement of the ram may also be stopped manually by depressing the traverse stop button 1555, as previously mentioned.

While the movements of the ram 60 and the table 41 have been described as independent movements, they may be moved together in selected directions by simultaneously actuating the ram directional switch 333 and the table directional switch 496 as desired. This will cause one or the other of the associated directional clutches to be energized and simultaneously therewith will cause deenergization of the ram high range clutch 320 and the table high range clutch 435, assuming that the range selector switch 338 is set in the low range position, so that simultaneous movement of the ram 60 and table 41 will be accomplished. It is apparent, therefore, that the ram 60 may be moved in an advancing or retracting direction of movement while the table is at rest, or the table 41 may be moved to the right or to the left while the ram 60 is at rest, or both can be operated simultaneously in any direction as desired.

With the novel ram and table drive transmission described, it is apparent that the cutter 89 may be quickly and positively orientated with respect to a workpiece (not shown) located on the table 41, through the motion of the ram 60 and table 41 which is directly under the control of the operator through the directional control switches 333 and 496 which are readily available at all times since they are located on the movable pendant 122. The novel transmission provides for instantaneous movement of the two movable members and also provides for dynamic braking of these members in a desired position once such position has been attained.

As previously mentioned, the spindle head 81 may be vertically adjusted on the ways 76 and 77 so that the position of the cutter 89 may be established in a vertical plane relative to the table 41 as the ram 60 and the table are moved in mutually transverse paths. Power for positioning the head 81 is derived from the variable speed, constant torque, D.C. motor 130 that is mounted on the ram 60. Referring now specifically to FIGS. 5 and 14 of the drawings, a motor drive shaft 501 extends into the head drive saddle 131, with the inwardly extending end of the drive shaft 130 being provided with a worm (not shown) disposed to mesh with a worm gear 502 that is rotatably mounted in the drive saddle 131. The worm wheel 502 is operatively connected to a shaft 503 which extends forwardly into the compartment 134 in which the spindle head speed change mechanism 135 is disposed. A high range drive gear 506 is splined to the forwardly extending end of the shaft 503 and is arranged to have meshing engagement with a gear 507 that is journalled on an output shaft 508 which, in turn, is journalled in the compartment 134. The gear 507 has integrally formed therewith an elongated hub to which is keyed a body member 509 of a high range clutch 510 so that it will rotate with the gear 507. The rotatable body member 509 of the clutch 510 has secured thereto for axial movement a pressure plate 511 and a plurality of driving plates 512 which are arranged in alternate relationship with a plurality of friction plates 513 that are keyed on a driving gear 514 that, in turn, is key connected to the shaft 508. Thus, whenever a coil 515 of the clutch 510 is energized, the driving plates and the friction plates will be tightly engaged to effect a driving connection between the body member 509 and the driving gear 514 to effect a high range drive input to the shaft 508.

A low range drive to the shaft 508 is also included and comprises a relatively small pinion 520 secured on the shaft 503 in position to mesh with a relatively large gear 521 of a gear cluster 522 that is antifrictionally journalled on the shaft 508. The gear cluster 522 includes a relatively small gear 523 that is disposed in meshing engagement with a gear 524 of another gear cluster 525 that is mounted on and keyed to a transfer shaft 526 which is antifrictionally journalled in internal webs formed in the compartment 134. The gear cluster 525 includes a relatively small gear 529 that is disposed in meshing engagement with a gear 530 that is antifrictionally journalled on the drive or output shaft 508. The gear 530 is provided with an integrally formed elongated hub on which is mounted a rotatable body member 531 of a low range clutch 532 with the body member 531 being keyed to the hub of the gear 530 so as to be rotatable with it. The rotatable body member 531 of the clutch 532 includes a pressure plate 533 which is secured thereto by means of bolts and also includes a plurality of driving plates 534 which are arranged to rotate with the body member and are disposed in alternate relationship with a plurality of friction disks 536 that are keyed on a driving gear 537 that is keyed to the shaft 508. When a coil 538 of the clutch 532 is energized, it operates to frictionally engage the driving plates 534 of the rotatable body member with the friction disks of the driving gear 537 to effect a coupling of the rotatable body member 531 with the driving gear 537 to thereby impart a low range drive to the output shaft 508.

The power from the motor 130 is therefore transmitted to the output shaft 508 either by the low range clutch 532 or the high range clutch 510. In either case, the power output of the shaft 508 is transmitted to a bevel gear 541 which is spline connected to the extending end of the shaft 508. The bevel gear 541 is arranged to mesh with a bevel gear 542 which is secured to a horizontal shaft 543 that is journalled in the ram 60. A transfer of power from the shaft 543 is continued to a gear 544, shown in FIG. 5, which is secured to the inwardly extending end of the shaft 543 and which is disposed to drive a gear 546 that is spline connected to the upper end of the vertically disposed head screw 140 that is journalled in the ram 60, as shown in FIG. 14. The screw 140 extends downwardly from the head and is threadedly engaged in the nut 142 which is disposed in the nut bracket 143 attached to the housing 80 of the spindle head 81, as previously described. Thus, rotation of the screw in a clockwise direction, as viewed from the top in FIG. 14, will operate to move the spindle head 81 upwardly. Conversely, rotation of the screw 140 in a counterclockwise direction, as viewed from the top in FIG. 14, will operate to move the spindle head 81 downwardly towards the table 41. Such selective rotation of the head screw 140 is effected by controlling the direction of motor rotation which is under the control of a directional control head switch 547 located on the pendant 122. The directional control switch 547 is connected in the electrical circuit, and when actuated upwardly from the position shown, will cause the motor 130 to be energized for rotation in a direction to effect clockwise rotation of the head screw 140. On the other hand, when the directional control switch 547 is actuated downwardly from its neutral center position, it will cause the motor 130 to be energized for rotation in the opposite direction to effect counterclockwise rotation of the head screw 140 to cause the head 81 to be moved downwardly.

In operation, the low range clutch 532 and the high range clutch 510 are both normally maintained energized and they are electrically interconnected with the directional control switch 547 so that when the directional control switch is actuated either upwardly or downwardly, as the case may be, one or the other of the clutches will be deenergized simultaneously therewith. With this arrangement, i.e., with both the low range clutch 532 and the high range clutch 510 being energized simultaneously, one or the other of the clutches will be deenergized upon selective operation of the directional switch 547. Head movement in the selected direction, once initiated, will continue in the selected direction, until such time as one or the other of a head-up stop limit switch 14LS or a head-down stop limit switch 17LS, located in a switch box 559 at the right side of the head 81, is actuated by operation of a head-up stop dog 556 or a head-down stop dog 557, both of which are adjustably mounted in a T-slot 558 provided on the right side of the head 81, as shown in FIGS. 3 and 5. When one or the other of the limit switches 14LS or 17LS is actuated, it will operate to effect energization of either the head low range clutch 532 or the head high range clutch 510 depending upon which clutch has been deenergized. At the same time the circuit within the electronic control panel 1327 which has been established by selective actuation of the head directional switch 547 will, also, be interrupted to stop operation of the motor 130. Thus, since one or the other of the high or low range clutches is maintained energized for accomplishing head movement, the energization of the deenergized clutch and the simultaneous deenergization of the motor 130 will operate to apply a dynamic braking effect on the head to stop its movement in the desired position.

As previously mentioned, the spindle head 81 may be moved in either direction, i.e., upwardly or downwardly, at a selected feed rate in either a high or low range. The feed rate is established by adjusting a potentiometer 548 which is located in the pendant 122 and which is adjustable by means of an adjusting knob 549. For selectively maintaining either the low or the high range clutches energized depending upon the desired feed rate set on the potentiometer 548, a range selector switch 1147 is provided. The range selector switch 1147 is positionable to a low range position, as shown in FIG. 24, or to a high range position by rotating a button 1147A. The selective operation of the range selector switch 1147 in either the low range position or the high range position, will determine which of the range clutches 532 or 510 will be deenergized when the operator actuates the directional switch lever 547A. Thus, the operator may establish a feed rate at which it is desired to move the spindle head and movement of the spindle head at the selected feed rate in either the high or low range will be initiated by merely actuating the directional control lever 547A of the switch 547.

Referring now to FIGS. 4 and 13 of the drawings, power for rotating the spindle 88, as previously stated, is transmitted from the dual speed A.C. motor 110 disposed on the ram 60, by means of a belt 561 that passes over a clutch pulley 562 mounted on and secured to the outer end of an elongated hollow pulley sleeve 563 that is antifrictionally journalled in a pulley sleeve bearing carrier 564. The bearing carrier 564 extends into a suitable opening 566 provided in a spindle mounting drive bracket 567 and is fixedly secured thereto with the spindle drive bracket 567 being secured to the rear surface 569 of the ram 60. The bearing carrier 564 supports a pair of antifriction bearings 572 and 573 in which the pulley sleeve 563 is mounted, as shown in FIG. 13. A pair of antifriction bearings 574 and 576 are disposed within suitable recesses 577 and 578, respectively, formed in the pulley sleeve 563, and these bearings operate to support a hollow drive shaft 579. With this arrangement the pulley 562 and pulley sleeve 563 are supported for independent rotation relative to the driving shaft 579, while the driving shaft 579 is independently rotatable relative to the pulley 562.

To effect an input drive to the spindle speed selector transmission 113, the clutch pulley 562 may be selectively connected to the hollow drive shaft 579, that extends into the ram 60, by operation of a friction clutch 580. The inner end of the hollow drive shaft 579 is therefore provided with an integrally formed gear 586 which, in turn, is formed with an internal gear portion 587 that receives a complementary gear 588 that is formed on the end of a clutch drive shaft extension 589. The drive shaft extension 589 is rotatably supported in a pair of antifriction bearings 590 and 591 that are carried in a bearing carrier 592 which is mounted and suitably secured in a suitable opening 593 provided in an internal bracket 594 formed integrally with a rear wall 595 of the ram 60. A gear 596 integrally formed on the inner end of the drive shaft extension 589 has meshing engagement with an input gear 597 of the spindle speed selector transmission 114, and, these constitute a fixed range gear set. Thus, power from the motor 110 is transmitted to the clutch pulley 562 by means of a belt 561 and the pulley is selectively coupled to the drive shaft 579 by operation of the friction disk clutch 580. The power drive shaft 579 operates through the drive shaft extension 589 and gear 596 to drive the input gear 597 of the speed selector transmission 113.

Engagement and disengagement of the disk friction clutch 580 is effected by means of a fluid actuator 601. The fluid actuator 601 comprises a cylinder 602 having an axial recess 603 which receives a circular fluid distribution plate 604 that constitutes the end closure of the cylinder 602. The axial recess 603 of the cylinder 602 is of a depth sufficient to receive a radial flange 605 of the bearing carrier 592 which serves as a mounting for axially aligning the cylinder 602 with the drive shaft extension 589. The entire assembly of the bearing carrier 592, fluid distribution end plate 604 and cylinder 602 is secured to the bracket 594 by means of a plurality of screws 606, one of which is shown.

The fluid distribution end plate 604 is formed with an axial inwardly extending hub 607 which slidably receives a piston 608 and serves to center the piston relative to the axis of the drive shaft extension 589. A radial flange 609 formed on the piston 608 slidably engages the interior wall surface of the cylinder 602 and serves as the head of the piston. The arrangement is such that an inwardly extending radial flange 611 of the cylinder 602 and the outwardly extending flange 609 of the piston 608 in cooperation with the peripheral outer surface of the piston and the inner wall surface of the cylinder define an expansible annular chamber 612 for receiving fluid under pressure to effect axial rightward movement of the piston 608, as viewed in FIG. 13. Fluid pressure is supplied to the chamber 612 by means of a port 613. To effect leftward movement of the piston 608, the fluid distribution end plate 604 is provided with an annular groove 614 in the end face thereof adjacent the piston 608. One side of the groove 614 is sufficiently wide to establish communication with a port 615 formed in the cylinder 602.

For coupling the piston 608 to the friction clutch 580 so that engagement and disengagement of the clutch may be effected and, also, to permit the drive shaft extension 589 to rotate relative to the axial movable piston 608, a clutch operating bearing hub 621 is slidably mounted on the drive shaft extension 589 and receives the inner race of an antifriction bearing 622, which is positioned against a radial flange 623 formed on the inner end of the hub 621. A snap ring 624 locks the inner race of the bearing 622 to the clutch operating bearing hub 621. The outer race of the antifriction bearing 622 is disposed in a counterbore 625 formed in the left end of the piston 608 and is locked therein by means of a snap ring 626. Thus, the drive shaft extension 589 is free to rotate relative to the hub 621 and piston 608, while the piston 608 and hub 621 are coupled together for axial movement relative to the shaft 589.

The clutch operating bearing hub 621 is operably coupled to the end of a clutch control rod 627 that extends inwardly within an axial bore 628 provided in the drive shaft extension 589 and which is also slidably disposed in the hollow drive shaft 579 in a manner to project outwardly beyond the drive clutch pulley 562. The connection between the hub 621 and the control rod 627 is effected by means of a pin 629, the ends of which are engaged in transversely aligned openings 630 and 631 provided in the hub 621. The pin 629 extends through transversely aligned slots 632 and 633 that are formed in the drive shaft extension 589 and which are aligned with the openings 630 and 631 in the hub 621. With this construction, whenever the piston 608 and the hub 621 are moved axially in either direction, the clutch control rod 627 will also be moved axially within the hollow drive shaft 579. Since the pin 629 extends through the rotatable drive extension shaft 589 the hub 621 will rotate with the shaft but by reason of the slots 632 and 633 it is also free to move axially with the piston 608.

Keyed to the outer end of the control rod 627 is a clutch cone hub 637 on which is mounted a circular clutch cone 638 that is formed with a peripheral cam surface adapted, as shown, to engage the arm 639 of a plurality of pivotally movable levers 640, one of which is shown. The lever 640 has an inwardly extending arm 641 which is adapted to be pivoted into engagement against a circular thrust plate 642 that is recessed in and secured to a circular axially movable clutch pressure plate 643 of the disk friction clutch 580.

The lever 640 is pivotally secured to a stub shaft 644 which is mounted in a radially extending web or fin 645 integrally formed on a threaded nut 646 that is threadedly engaged on the threaded end of a clutch driving plate hub 647 that is mounted on and keyed to the extending end of the drive shaft 579. The driving plate hub 647 is provided with a fixed back pressure plate 648 which serves as the reaction member for the axial thrust force exerted by the front or forward floating pressure plate 643. The clutch pulley 562 is formed with a spider 649 to which are keyed a plurality of friction disks 650 that are disposed in alternating relationship between a plurality of auxiliary floating driving disks 651 that are keyed to the driving hub 647. The arrangement is such that when the control rod 627 is moved to the right, to the position shown in FIG. 13, the cone cam 638 is moved to the right, to the position shown, to pivot the lever 640 in a clockwise direction to effect engagement of the clutch 530, thereby coupling the clutch pulley 562 to the driving shaft 579 for effecting a drive connection to the spindle speed selector transmission 113.

Such rightward movement of the control rod 627 is effected by supplying fluid pressure to the chamber 612 via the port 613 to effect a rightward movement of the piston 608 and thereby, through the operation of the bearing 622, bearing hub 621 and pin 629 effect rightward movement of the control rod 627. When the piston 608 is caused to move to the left, as viewed in FIG. 13, by discontinuing fluid pressure to the chamber 612 and by supplying fluid pressure to the annular groove 614 of the distributor end plate 604 via the port 615, the control rod 627 is moved to the left, thereby releasing the lever 640, and the lever operates under the influence of a spring 652 to pivot in a counterclockwise movement for releasing the right end of the lever from engagement with the floating pressure plate 643. This allows the friction disks 650 and driving disks 651 to be moved to a disengaged position by operation of a plurality of compression springs 653. As a result, the clutch pulley 562 is disconnected from the main driving shaft 579 for terminating the power input to the spindle speed transmission 113.

To facilitate the speed changing operation of the spindle speed transmission 113, apparatus is provided for turning the entire transmission slowly while the gearing thereof is being selectively shifted. As shown in FIG. 13, power for driving the auxiliary drive apparatus is derived from the pulley sleeve 563 which is constantly driven as long as the motor 110 is energized. The inner extending end of the pulley sleeve 563 is provided with a drive gear 660 that is spline connected thereto. The gear 660 meshes with and drives a gear 661 which is rotatably mounted on a shaft 662 concentric with a synchromesh clutch 663, constituting a part of the slow speed auxiliary drive apparatus. The gear 661 is provided with an eccentrically disposed hub 664 upon which is journalled a planetary gear 665 in a manner to be revolved bodily in a circular path about the axis of the shaft 662.

The planetary gear 665 meshes with and rolls within a stationary internal gear 666, which is fixedly secured to the spindle drive pulley bracket 567. The planetary gear 665 also meshes with and rolls within an internal gear 667 formed with a clutch piston member 668 which is supported for rotational and axial movement in a bore 669 provided in the bracket 567 and which constitutes the housing for the clutch 663, the piston 668 constituting the driving element of the clutch. The ratio of the number of teeth in the internal gears 666 and 667 to the number of teeth on the planetary gear 665 is such that a differential action occurs when the planetary gear 665 is rotated bodily within the internal gears, with the result that the piston 668 of the clutch 663 is caused to rotate relative to the stationary internal gear 666 but at a greatly reduced speed.

As shown in FIG. 13, the other element 670 of the friction clutch 663 is keyed to the shaft 662 so that a driving connection between the gearwheel 661 and the shaft 662 may be effected by engaging the clutch 663 in a manner to rotate it at a slow speed and constitutes the slow speed drive input to the spindle speed selector transmission 113 for facilitating the shifting of the gears thereof. To this end, a gear 671 is keyed to the shaft 662 and is disposed in meshing engagement with the gear 586 integrally formed on the end of the main drive shaft 579 to effect slow rotation of the main drive shaft 579 and thereby slow rotation of the drive shaft extension 589 and the gear 596 for effecting a slow drive input to the input gear 597 of the transmission 113.

For effecting engagement of the slow speed drive clutch 663, the piston 668 thereof is provided with a recess 673 which in cooperation with the rear surface 674 of the bore 669 in which the piston 668 is disposed, defines a chamber 675 into which fluid pressure may be admitted via a passageway 676 formed in the bracket 567. When fluid pressure is supplied to the chamebr 675, the piston 668 is caused to move rightwardly, as viewed in FIG. 13, to frictionally engage the friction disks thereof with the driving plates of the second element 670 thereby coupling the shaft 662 to the gear wheel 661 for effecting a slow speed input to the spindle speed transmission 113. When the piston 668 is shifted rightwardly by the action of fluid pressure the movement occurs against the pressure of a compression spring 677 that is mounted on a stub shaft 678 antifrictionally journalled in a bearing extension 679 provided on the second element 670 of the clutch 663. Thus, when fluid pressure is discontinued to the chamber 675, the spring 677 operates to move the piston 668 leftwardly to disengage the slow speed clutch 663 and thereby disconnect the gear wheel 661 from the shaft 662.

As shown in FIG. 13, the gearwheel 661 is meshed with a lubricating pump gear 680 that is mounted on and keyed to the extending end of a drive shaft 681 of a lubricating supply pump 682 that is secured to the bracket 567. The lubricating pump 682 is operative to supply lubricant to the various mechanisms of the machine, in a well known manner.

Referring now to FIGS. 10 and 11, the power input gear 596 has meshing engagement with the input gear 597 splined to the extending end of a first horizontal shaft 690 which is journalled in the speed box 116. The speed box 116 extends within the compartment 114 formed in the ram 60 through an opening 117 in the left side thereof, a cover plate or rotary valve mounting plate 691 being formed as a part of the speed box and serves as a closure for the opening 117. As shown in FIG. 10, the cover plate 691 carries a rotary valve 692 and a motor 693 for effecting selective operation of the valve 692 which is operable to effect a shifting of the various gears of the variable speed transmission 113 as will be more fully described. As best shown in FIG. 10, the speed box 116 is of unitary construction and may be inserted into or removed from the spindle drive transmission as a unit without disturbing the other components of the drive.

Splined on the shaft 690 for longitudinal sliding movement, as appears in FIG. 11, is a gear couplet 694 comprising gears 695 and 696 which are disposed to be selectively meshed, respectively, with cooperating gears 697 and 698 fixed on a rotatable intermediate shaft 699 that is parallely journalled in the speed box 116 slightly below and forward of the first shaft 690. As shown in FIG. 11, the gear 698 is a part of a fixed gear couplet 701 which includes a power transfer gear 702 that is disposed to mesh with a gear 703 of a gear couplet 704 splined on a shaft 705 for longitudinal sliding movement. The shaft 705 is journalled in the speed box 116 in parallel relationship to the shafts 690 and 699 but is located above and forward of the shaft 699.

The gear couplet 704 also includes a gear 706 which is disposed to be meshed with the gear 698 of the fixed gear couplet 701 keyed to the second shaft 699. The shiftable gear couplet 704 operates to rotate the shaft 705 thereby rotating a gear 707 fixedly mounted on the shaft 705, and a spur gear 708 integrally formed on the left end of the shaft 705.

A fourth shaft 712, antifrictionally journalled in the speed box 116 in parallel relation to the shafts 690, 699 and 705, carries a gear couplet 713 which is splined on the shaft for longitudinal sliding movement. The gear couplet 713 comprises gears 714 and 715 which may be selectively meshed, respectively, with the cooperating fixed gears 706 and 707 that are mounted on the shaft 705. The shaft 712 is also provided with a spur gear 716 which is splined thereto but is axially immovable, and a spur gear 717 which is integrally formed on the right end of the shaft.

A fifth shaft 718 is also journalled in the speed box 116, and has splined thereon an axially slidable gear couplet 719 comprising gears 720 and 721 which are arranged to be selectively meshed, respectively, with the fixed gears 716 and 717 on the rotatable fourth shaft 712. As shown, the fifth shaft 718 extends outwardly of the speed box 116 to the right, as viewed in FIG. 11, and has splined thereon a gear 722 that meshes with a gear 723 of a spindle brake transmission 724, that is shown in detail in FIG. 6.

To effect selective shifting of the gear clusters 694, 704, 713 and 719 of the spindle speed selector transmission 113, a plurality of shifter shafts are provided which are selectively actuated by operation of the rotary speed selector valve 692. To this end, as shown in FIGS. 10 and 17, a shifter shaft 730 is slidably supported in the speed box 116 in cylinder end bearings 731 and 732 that are secured in the side walls of the housing 116. The shifter shaft 730 carries a shifter fork 733 which is connected thereto for longitudinal movement with the shaft. The shifter fork 733 is provided with an arm 734 having a bifurcated end portion which is engaged in a groove 735 provided on the gear cluster 694, as shown in FIG. 11, for mechanically connecting the shaft 730 to the gear cluster 794. As shown in FIG. 17, the shaft 730 is shiftable rightwardly to the illustrated position by admitting fluid pressure to a chamber 736 provided in the left cylinder bearing 731 via a conduit 737 which is connected to a port 738 that is in communication with the chamber 736. Fluid pressure in the chamber 736 will operate to effect rightward movement of the shaft 730 for effecting rightward movement of the gear cluster 794 on the shaft 690 which operates to connect the gear 695 of the gear cluster 694 with the stationary gear 697 on the transfer gear shaft 699, as shown in FIG. 11. On the other hand, fluid pressure to a chamber 739 formed in the right cylinder 732 via a conduit 740 which is connected to a port 741 that is in communication with the chamber 739, will operate to effect leftward movement of the shifter shaft 730, as viewed in FIG. 17, thereby carrying the shifter fork 733 with it to effect leftward movement of the gear cluster 694 on the shaft 690, thereby disengaging the gear 695 from the gear 697 and engaging the gear 696 with the gear 698 of the gear cluster 701 on the transfer shaft 699.

A similar arrangement is provided for effecting longitudinal movement of the gear cluster 704 on the shaft 705 and comprises a shifter shaft 745 which is also slidably supported by cylinders 746 and 747 that are fixedly mounted in the side walls of the speed box 116. As shown, the shifter shaft 745 is provided with a shifter fork 748 which is connected thereto for longitudinal movement therewith. The fork 748 is provided with an arm 749 having a bifurcated end that is engaged in a groove 750 provided in the gear cluster 704. Fluid pressure is supplied to a chamber 751 formed in the cylinder 746 via a conduit 752 that is connected to a port 753 which communicates with the chamber 751. The fluid pressure in the chamber 751 operates to effect rightward movement of the shifter shaft 745 to the position shown in FIG. 17, thereby effecting the rightward placement of the shifter fork 748 which results in a rightward placement of the gear cluster 704 on the shaft 705 so that the gear 703 thereof is meshed with the gear 702 of the gear cluster 701 on the transfer shaft 699. On the other hand, fluid pressure may be supplied to a chamber 754 formed in the right cylinder 747 via a conduit 755 that is connected to a port 756 formed in the cylinder 747. Fluid pressure to the chamber 754 will operate to effect leftward movement of the shifter shaft 745, as viewed in FIG. 17, and thereby the shifter fork 748 which operates to effect leftward longitudinal of the gear cluster 704 on the shaft 705, thereby disengaging the gear 703 from the gear 702 and engaging the gear 706 with the gear 698 of the transfer gear cluster 701.

It is apparent therefore that the shaft 705 of the speed selector transmission 113 may be driven at any one of four speeds. The four output speeds of the shaft 705 are utilized to drive the shaft 712 which is connectable thereto via the gear cluster 713 and the gears 707 and 708. A further increase in the number of output speeds from the shaft 712 is effected by shifting the gear cluster 713 into one of the two positions selectively by means of a shifter shaft 757 that has pinned thereto a shifter fork 758 having an arm 759 provided with a bifurcated end that is engaged in a groove 760 formed on the gear cluster 713, as shown in FIG. 11. The shifter shaft 757 is reciprocably supported in cylinders 761 and 762 that are secured to the walls of the speed box 116. The cylinder 761 has a chamber 763 formed therein to which fluid pressure may be supplied via a conduit 764 that is connected to a port 765 formed in the cylinder 761 and which is in communication with the chamber 763. Fluid pressure supplied to the chamber 763 will effect rightward movement of the shifter shaft 757 to the position shown in FIG. 17, so that the gear cluster 713 is moved longitudinally on the shaft 712 into its rightward position, as shown in FIG. 11, with the gear 715 of the gear cluster 713 being meshed with the gear 707 on the shaft 705. By shifting the shaft 757 leftwardly, as viewed in FIG. 17, with resultant leftward movement of the gear cluster 713, four additional output speeds from the shaft 712 are obtainable. Such leftward movement of the shifter shaft 757 is effected by supplying hydraulic pressure to a chamber 767 formed in the right cylinder bearing 762 and which is supplied thereto via a conduit 768 that is connected to a port 769 formed in the cylinder bearing 762 and which communicates with the chamber 767. When fluid pressure is supplied to the chamber 767, the shifter shaft 757 is caused to move leftwardly, thereby effecting leftward movement of the shifter fork 758 and resultant leftward movement of the gear cluster 713 on the shaft 712, as viewed in FIG. 11. Such leftward movement of the gear cluster 713 operates to effect disengagement of the gear 715 from the stationary gear 707 and to effect engagement of the gear 714 of the gear cluster 713 with the stationary gear 708 on the shaft 705. Thus, the shaft 712 may be driven selectively at any one of eight speeds which speeds are utilized to drive the shaft 718.

The transfer of power from the shaft 712 to the shaft 718 is effected by means of the gear cluster 719 slidably supported on the shaft 718 and which is arranged to be moved selectively into one or the other of two positions by means of a shifter shaft 770 that is slidably supported by a pair of cylinders 771 and 772 that are secured to the speed box 116. The shifter shaft 770 is provided with a shifter fork 773 having a bifurcated arm 744 that is engaged in a groove 775 provided on the gear cluster 719. A rightward positioning of the gear cluster 719 into the position shown in FIG. 11, is effected by means of fluid pressure supplied to a chamber 776 formed in the left cylinder bearing 771. The pressure is supplied to the chamber 776 via a conduit 777 that is connected to a port 778 formed in the cylinder 771 and which has communication with the chamber 776 thereof. Thus, fluid pressure to the chamber 776 will effect rightward movement of the shifter shaft 770, into the position shown in FIG. 17. Such positioning of the shifter shaft 770 operates to effect a rightward positioning of the gear cluster 719 on the shaft 718 into the position shown in FIG. 11, in which position the gear 721 thereof is meshed with the stationary gear 717 provided on the shaft 712. Thus, the shaft 718 may be driven at any one of eight speeds from the shaft 712 to the stationary gear 717 and the larger gear 721 of the gear cluster 719. An additional eight speeds may be obtained by shifting the gear cluster 719 leftwardly to its alternate position by effecting leftward movement of the shifter shaft 770. This is accomplished by supplying fluid pressure to a chamber 780 formed in the right cylinder 772 with the fluid pressure being supplied thereto via a conduit 781 that is connected to a port 782 which has communication with the chamber 780. When fluid pressure is supplied to the chamber 780, the shifter shaft 770 will be caused to move leftwardly to thereby effect leftward movement of the gear cluster 719 on the shaft 718 to disengage the gear 721 from the gear 717 and to engage the gear 720 with a stationary gear 716 on the shaft 712.

The selective shifting of the shafts 730, 745, 758 and 770 of the spindle speed selector transmission 113 is achieved by the operation of a rotary valve 692, shown in FIG. 18. By selective operation of the rotary valve 692, fluid pressure may be supplied to the chambers of the shifter shaft cylinders for establishing a particular selected speed at which it is desired that the spindle be rotated. A detailed description of the operation and construction of the rotary valve will be given in conjunction with the control means provided for establishing a selected speed.

Distribution of hydraulic pressure to effect selective movement of the various shifter shafts is made through the operation of the rotary valve 692. To this end the rotary valve 692 comprises a housing 785 which is secured to a mounting plate 786 that, in turn, is secured to the mounting plate 691. The housing 785 is provided with an axial bore 788 in which a sleeve 789 is disposed. A spool 790 is rotatably supported in the sleeve 789 and has an axially extending shaft 791 that is journalled in an opening 792 formed in the base of the housing 785. As shown in FIG. 18, the housing 785 is provided with a plurality of ports 793 to 800, inclusive, to which the various conduits associated with the shifter shaft cylinders are connected, as shown in FIG. 18. The sleeve 789 is likewise provided with a plurality of ports 801 to 808, inclusive, which are arranged to be in communication with the ports 793 to 800, inclusive, of the valve housing 789, respectively.

The valve housing 785 has a pressure inlet port 809 to which a supply conduit 810 is connected, as shown in FIG. 20. The pressure inlet port 809 is arranged to communicate with an annular pressure groove 811 formed in the sleeve 789. A plurality of openings 812 to 823, inclusive, as best shown in FIG. 20, are formed in the sleeve 789 equally spaced about the periphery of the groove 811 and are arranged to communicate with a plurality of radially extending passageways 824 to 835, inclusive, respectively, which are formed in the spool 790 and which are equally spaced to form connecting lines for supplying fluid presure from the pressure groove 811 to longitudinally extending passageways 836 to 847, inclusive, also formed in the spool 790. As shown in FIG. 20A, the longitudinally extending passageways 836 to 847, inclusive, formed in the spool 790 are each in communication with other angularly spaced radially extending pasageways 848 to 859, inclusive, respectively formed in the valve spool 790. At the particular position of the spool 790, shown in FIGS. 18 and 20A, the radial passageway 856 is in communication with the sleeve opening 806 which registers with the port 797 in the valve housing 785 to which the fluid conduit 737 is connected. Thus, the fluid pressure supplied through the conduit 810 to the port 809 will flow into the distribution pressure groove 811 and thence via the openings 812 to 823, inclusive, will flow through the sleeve into the communicating radial passageways 824 to 835, inclusive, and thence into the longitudinally extending passageways 836 to 847, inclusive, respectively. The fluid pressure in the longitudinally extending passageways 836 to 847 will flow into the communicating radially extending passageways 848 to 859, inclusive, but cannot escape therefrom since all the passageways are blocked by means of the sleeve 789, with the sole exception of the passageway 856 which at this time is in communication with the opening 806 in the sleeve so that fluid pressure will flow therefrom into the opening 806 and thence into the port 797 formed in the housing. From the port 797 the pressure flows into the conduit 737, the opposite end of which is connected to the port 738 of the cylinder 731 to supply fluid pressure to the chamber 736 for effecting rightward positioning of the shifter shaft 730. At this time fluid will exhaust from the chamber 739 of the shifter shaft cylinder 732 via the conduit 740 to the port 793 in the value housing 785, which port is now in registry with an opening 801 provided in the valve sleeve, as shown in FIG. 20A, and the opening 801, in turn, communicates with a radially extending passageway 862 that extends inwardly towards the center of the spool 790 to communicate with a bore or enlarged axial passageway 863 that serves as a fluid exhaust collector passageway. The passageway 863 communicates with a radially extending passageway 864 formed in the spool 790, as shown in FIGS. 18 and 20E, which passageway communicates with an annular groove 865, also formed in the spool. A fluid return opening 866 formed in the sleeve 789 is arranged to communicate with the fluid collector groove 865 of the spool 790 and also registers with a port 867 formed in the valve housing 785 to which a return conductor 868 is connected, with the conductor being connected to return exhaust fluid to a reservoir 869, as shown schematically in FIG. 32.

At the particular setting in which the spool 790 of the valve 692 is illustrated in the drawings, fluid pressure will also be supplied to the chamber 751 for effecting rightward positioning of the shifter shaft 745 into the position shown in FIG. 17. To this end, the longitudinally extending passageway 844 formed in the spool 790 is also in communication with a relatively small groove 873, as shown in FIG. 20B and schematically in FIG. 19. The groove 873, at this position of the spool 790, registers with the opening 805 provided in the sleeve 789, which, in turn, registers with the port 798 in the valve housing 785 to which the fluid conductor 752 is connected. Thus, as fluid pressure is supplied to the chamber 736 for effecting rightward positioning of the shifter shaft 730, fluid pressure is also supplied to the chamber 751 via the pressurized longitudinal passageway 844, the groove 873, the opening 805 in the sleeve 789, and thence by means of the port 798, is supplied to the conduit 752, the opposite end of which is connected to the port 753 in the cylinder bearing 746.

At this time fluid in the chamber 754 at the right end of the shifter shaft 745 will be exhausted therefrom via the port 756, the conduit 755, the opposite end of which is connected to the port 794 in the valve housing 785 and which, at this time, registers with the opening 802 formed in the sleeve 789. The opening 802 at the particular position of the valve spool 790 shown in FIG. 20B, registers with a peripheral groove 876 that has communication with a radial passageway 877 formed in the spool 790, which passageway communicates with the axial passage 863. The fluid exhaust in the axial passage 863 will exhaust therefrom into the radial communicating passage 864 which also communicates with the peripheral spool groove 865, as shown in FIGS. 19 and 20E, which groove communicates with the opening 866 provided in the sleeve 789 and which, in turn, registers with the port 867 to which the fluid return conductor 868 is connected.

At this time fluid pressure is also supplied to the chamber 763 in the cylinder bearing 761 associated with the shifter shaft 757 so that the shaft will be located in its rightward position, as shown in FIG. 17. To this end, a peripheral groove 880 is formed in the spool 790 which registers with the pressurized longitudinal passageway 843, as shown in FIGS. 19 and 20C, with the groove 880 having communication with the opening 807 formed in the sleeve 789, which opening registers with the port 799 formed in the valve housing 785 to which the opposite end of the fluid conduit 764 is connected. Thus, fluid pressure from the pressurized longitudinally extending passageway 843 in the spool 790 will flow into the groove 880 and thence through the opening 807 and the port 799 of the housing, from whence it will flow into the conduit 764 to be directed thereby to the port 765 formed in the cylinder bearing 761 and will flow into the chamber 763 at the left end of the shifter shaft 757 to urge the shifter shaft rightwardly into the position shown in FIG. 17. At this time fluid in the chamber 767 at the right end of the shifter shaft 757 will be exhausted therefrom through the port 769 into the conduit 768 and thence will flow into the port 795 of the rotary valve housing 785, as shown in FIG. 20C. The fluid exhaust flowing into the port 795 of the valve housing will flow through the communicating opening 803 in the valve sleeve 789 and will then flow into a peripheral spool groove 883, as shown in FIGS. 19 and 20C, from whence it will flow into a communicating radial passageway 884 that is formed in the spool 790 and communicates with the axially extending exhaust passage 863. From the exhaust passage 863, the exhaust fluid will flow into the return conductor 868 as previously described.

In order to achieve the particular output of the transmission 113, the shifter shaft 770 must be shifted to its rightward position, as shown in FIG. 17, for effecting a rightward positioning of the gear cluster 719. To this end, fluid pressure is supplied to the chamber 776 of the cylinder 771 at the left end of the shifter shaft, by means of the pressurized passageway 843 in the spool 790 which communicates with a peripheral groove 885 formed in the spool 790, as shown in FIGS. 19 and 20D. The fluid pressure supplied to the groove 885 will flow therefrom through an opening 808 formed in the sleeve 789 which opening registers with the port 800 in the valve housing 885. The fluid pressure will flow through the port 800 into the conduit 777, to the port 778 to enter the chamber 776 of the cylinder 771 for effecting rightward positioning of the shifter shaft 770. Fluid in the chamber 780 at the right end of the shaft will be exhausted therefrom via the port 782 and into the conduit 781, to the port 796 formed in the valve housing 785, as shown in FIG. 20E. The exhaust fluid flowing to the port 796 will flow through the opening 804 in the sleeve 789 into a groove 888 formed in the periphery of the spool 790. The fluid exhaust in the groove 888 will flow into a communicating radial passageway 889 formed in the spool 790 and thence to exhaust passageway 863 so that the fluid exhaust will be returned to the reservoir via the conductor 868 as previously described.

The passageways, grooves and ports formed in the rotary valve 692 for effecting selective distribution of fluid pressure for operating the shifter shafts 730, 745, 757 and 770 to establish a desired spindle speed are shown in the various sectional views of FIGS. 20 to 20E, inclusive. The relationship of all the passageways and grooves of the spool 790 are illustrated in the developed view of the valve spool shown in FIG. 19, wherein the passageways shown in the sectional view of FIG. 20 are illustrated in the line that is identified by the reference letter G in FIG. 19. Similarly, the passageways shown in FIGS. 20A to 20E, inclusive, are shown in the lines H to L, inclusive, in FIG. 19, respectively. Thus, for any position of the valve spool 790 the distribution of the fluid pressure to the shifter shaft cylinders may be determined.

While a detailed description of the operation of the rotary valve 692, at one particular setting of the valve spool 790, for establishing a specific setting of the gear clusters of the transmission 113 to obtain a desired spindle speed, has been given, the valve spool 790 is positionable to twenty-four different settings for obtaining twenty-four different spindle speeds. The positions of the gear clusters for each valve setting are indicated in the chart of FIG. 30. The first column of the chart lists the twenty-four spool positions and the second column indicates the spindle speed that will be established for each of these spool positions. Columns 3 to 6, inclusive, of the chart indicate the position in which the gear clusters are for each of the spindle speeds obtainable. The brackets in the side of the chart indicate which of the speeds are in the high range and which are in the low range. Thus, from the detailed description previously given of the operation of the rotary valve 692 and with reference to the chart of FIG. 30, it will be noted that the positions of the gear clusters 694, 704, 713 and 719 shown in FIG. 11, and the position of the valve spool 790, as illustrated in FIGS. 20 to 20E, inclusive, correspond to the spool position indicated as No. 5 on the chart for establishing a spindle speed of 16.5 or 33 r.p.m. depending upon the operating speed of the dual speed spindle motor 110. Thus, for the selected spindle speed of 33 r.p.m., the gear clusters 694, 704, 713 and 719 will all be shifted to the rightward position as viewed in FIG. 11.

The first column of the chart in FIG. 30 identifies the twenty-four various spool positions by number and each of these positions is correspondingly identified by the column of numbers appearing on the right of the developed view of the valve spool 790 illustrated in FIG. 19. Thus, by following the horizontal line of the spool position number shown in FIG. 19, the particular passageways and grooves, formed in the spool, that are employed to effect the distribution of fluid pressure to the shifter shafts for establishing that particular spindle speed may be determined. For example, assuming that it is desired to establish a spindle speed of 74 r.p.m., then, from the chart of FIG. 30, it can be determined that the spool position for obtaining this spindle speed is identified as position No. 9. Upon referring to FIG. 19, it can be determined that spool position No. 9 includes the pressurized longitudinally extending passageway 842. Following the pressurized passageway 842, in FIG. 19 from left to right, it can be ascertained that this passageway communicates with the radially extending passageway 854 which appears in the reference line H. It will be noted that the passageways appearing in the reference line G of FIG. 19 have been disregarded, since the groove 811 and the passageways 824 to 835, inclusive, appearing therein are the pressure supply means for the valve. Since the passageways appearing along the reference line H in FIG. 19 correspond to the passageways appearing in FIG. 20A, it can be seen that the spool 790 must be rotated until the radially extending passageway 854 in the spool 790 is aligned with the opening 806 and the port 797 of the valve housing 785. With the spool 790 in this position hydraulic pressure will be directed to the several cylinders in the manner required to shift the gear clusters 694 and 704 to their rightward positions and the gear clusters 713 and 719 to their leftward positions as indicated by the chart in FIG. 30. Thus, with the valve spool 790 positioned so that the radially extending passageway 854 thereof is aligned with the port 798, fluid pressure will flow from the passageway 842 through the communicating radially extending passageway 854 to the sleeve opening 806 and out of the valve 692 via the port 797. From the port 797 fluid pressure will be supplied to the chamber 736 at the left end of the shifter shaft 730, by means of the connected conduit 737. Thus, the shifter shaft 730 and its associated gear cluster 694 will be retained in the rightward position shown in FIGS. 11 and 17, to comply with the requirements indicated in the chart of FIG. 30.

With the valve spool 790 positioned so as to align the radially extending passageway 854 with the port 797, a radial passageway 891 formed in the spool 790 and which communicates with the axial exhaust passage 863 will be in registry with the sleeve opening 801 so as to connect the port 793 of the valve housing 785 with the exhaust passageway 863. In this manner, the chamber 739 at the right end of the shifter shaft 730 will be connected to the reservoir via the conduit 740 which is in communication with the port 793 of the valve housing 785, and the opening 801 in the valve sleeve and thence by the radially extending passageway 891 formed in the valve spool 790 which is in communication with the axial exhaust passageway 863 in the valve spool so that fluid pressure in the chamber 739 will be returned to the reservoir via the conductor 868 as previously described.

In addition, to establish the spindle speed of 74 r.p.m., the chart indicates that the gear cluster 704 must also be in a rightward position and therefore fluid pressure must be supplied to the chamber 751 at the left end thereof. To this end, the passageway 842 communicates with a peripheral groove 892 shown in FIG. 20B and position No. 9 of the spool 790 places the groove 892 in registration with the opening 895 in the valve sleeve 789 so that fluid pressure from the passageway 842 will flow into the groove 892 and thence by means of the opening 895 will flow into the port 798 of the housing 785 and thence into the conduit 752 to be directed into the chamber 751 at the left end of the shifter shaft 745 to effect rightward positioning of the shifter shaft 745 and its associated gear cluster 704. The chamber 754 on the right end of the shifter shaft 745 is exhausted through a peripheral groove 893 formed on the valve spool 790, as shown in FIGS. 19 and 20B. The groove 893 registers with the opening 802 in the valve sleeve 789. A radially extending passageway 894 formed in the valve spool 790 registers with the groove 893 and communicates with the exhaust passagewal 863 in the valve spool. Thus, the chamber 754 at the right end of the shifter shaft 745 is connected to the reservoir and fluid therein will flow via the conduit 755 into the valve housing 785 by means of the port 794 and will flow through the opening 802 into the groove 893 and thence by means of the radially extending passageway 894 into the return passageway 863 to flow into the return conduit 868 and thence to the reservoir 869 as previously described.

As indicated in the chart of FIG. 30, the shifter shaft 745 and its associated gear cluster 704 must be in a leftward position, as viewed in FIG. 17, to establish a spindle speed of 74 r.p.m. Thus, when the valve spool 790 is positioned to establish the desired 74 r.p.m. speed, a groove 895 formed in the periphery of the valve spool 790, as shown in FIG. 20C and in reference line J of the developed view of the valve spool as shown in FIG. 19, will be in communication with the opening 803 formed in the valve sleeve 789 so that fluid pressure from passageway 847 will flow into the groove 895 and thence by means of the communicating connection effected between the groove and the opening 803 will flow into the port 795 of the valve housing 785 and thence into the conduit 768 to be directed thereby into the chamber 767 at the right end of the shifter shaft 757 for effecting leftward positioning of the shifter shaft 757 and its associated gear cluster 704. At this time the fluid in the chamber 763 at the left end of the shifter shaft 757 will be returned to the reservoir via the connected conductors 764, the opposite end of which is connected to the port 799 of the valve housing 785. The fluid exhaust will flow through the port 799 and through the aligned opening 807 in the sleeve 789 into a communicating groove 896 that is formed in the periphery of the valve spool 790 and which at this time is in communication with the opening 807 of the sleeve. A radially extending passageway 897 formed in the valve spool communicates with the groove 896 and also communicates with the axially extending exhaust passageway 863 of the valve spool 790. Thus, the fluid exhaust will flow into the groove 896 and by means of the communicating radially extending passageway 897 will flow into the return exhaust passage 863 and thence will be returned to the reservoir as previously described.

Again, with reference to the chart of FIG. 30, it will be seen that the gear cluster 719 and its associated shifter shaft 770 must be in a leftward position so that the desired spindle speed of 74 r.p.m. will be established. This means that the chamber 780 at the right end of the shifter shaft 770 must be supplied with fluid pressure via the conduit 781, the opposite end of which, as shown in FIG. 20E, is connected to the port 796 of the valve housing 785. With the valve adjusted to establish the desired speed, a groove 898 formed in the periphery of the valve spool 790 will be positioned so that it has communication with the opening 804 in the valve sleeve 789 which opening is in communication with the port 796. The groove 898 will receive fluid pressure via the pressurized passageway 843, shown in FIG. 19 and FIG. 20E, which passageway communicates with the groove, so that the fluid pressure will flow therefrom into the groove 898 and be supplied to the chamber 780 via the opening 804, the port 796 and the conduit 781. At this time the chamber 776 at the left end of the shifter shaft 770 will be connected to the reservoir by means of the conduit 777 which has its opposite end connected to the port 800 of the valve housing 785, as shown in FIG. 20D. With the valve spool 790 positioned to effect the desired 74 r.p.m. spindle speed, a peripheral groove 899 formed in the valve spool will be in communication with the opening 808 in the valve sleeve so that the fluid exhaust will flow from the port 800 through the opening 808 into the return groove 899 and thence by means of a communicating radially extending passageway 900 will flow into the return passageway 863 and thence will be returned to the reservoir 869 as previously described.

It is apparent that by adjusting the valve spool 790 of the rotary valve 692, a distribution of fluid pressure for effecting selective positioning of the gear clusters of the speed selector transmission 113 may be obtained and such shifting of the gear clusters is accomplished in a smooth and facile manner by means of the synchromesh transmission previously described in connection with FIG. 13.

The valve spool 790 is rotated by an electric motor 693 which is mounted on a bracket 901 that is secured to the plate 786 located within a compartment 890, as shown in FIGS. 10 and 18. A drive shaft 902 of the motor 693 is connected to drive a shaft 903 that is journalled in the top surface of the bracket 901. A bevel gear 904 keyed to the shaft 903 is in meshing engagement with a bevel gear 905 keyed to a cam shaft 906 which is rotatably supported at either end by the front wall of the bracket 901 and the bore 792 in the valve body 785, as shown in FIG. 18. The cam shaft 906 is operatively connected to the spool shaft 791 so that the motor 693 will rotate the spool 790 of the rotary valve 692. The motor 693 is connected into an electrical circuit associated with the spindle speed selector dial switch 121 located on the pendant control box 122 and which is operable when actuated by the operator to establish a desired selected spindle speed.

As shown in FIG. 21, the spindle speed selector switch 121 is provided with a dial having an outer annular row of indicia which is readable against an indicator 912 with the indicia contained thereon indicating the twenty-four spindle speeds that may be established when the duel speed motor 110 is energized for operation at 900 r.p.m. The dial also contains an inner annular row of indicia which is readable against another indicator 911 for indicating the twenty-four speeds at which the spindle 88 may be driven when the spindle motor 110 is energized for operation at 1800 r.p.m. The coordinated operation of the spindle speed selector switch 121 will be described in greater detail in conjunction with the electrical diagrams shown in FIGS. 31 to 31C, inclusive.

As previously stated, the spindle speed transmission 113 is operatively connected to drive the spindle 88 at a selected speed from the output gear 722 which has meshing engagement with the gear 723 of the spindle brake transmission 724. The spindle brake transmission, as shown in FIG. 6, is also of unitary construction disposed within the gear housing extension 137 and is removable therefrom through an access opening 920 provided in the top surface of the ram 60. The access opening is closed by a gear cover 921 that is fastened in position by means of screws (not shown). The spindle brake transmission 724 comprises a carrier bracket 923 having upstanding end bearing carrier walls 924 and 926. The forward wall 924 is provided with recesses in which are mounted thrust bearings that rotatably support the splined hub 927 of a spiral bevel gear 928. The rear wall 926 receives a pair of antifriction bearings in which the splined hub of the gear 723 is rotatably supported. A drive shaft 931 having splined ends is spline connected to the hub of the gear 723 and the hub 927 of the gear 928, respectively. Thus, the drive shaft 931 is power driven from the spindle speed transmission 131 and is operatively connected to effect rotation of the spindle 88 at a selected speed.

A fluid actuated brake 935 is provided for stopping rotation of the spindle 88 and comprises a brake hub or sleeve 936 keyed to the drive shaft 931. The brake hub or sleeve 936 is provided with a plurality of braking plates 937 that are keyed thereto for rotation with the hub but are free to move axially relative to the hub, in a well known manner, and are alternately spaced between friction disks 938 that are carried by a spider 939. The spider 939 is secured to the rear wall 926 of the carrier 923 so as to be maintained stationary relative to the shaft 931. The brake is actuated by a piston 941 mounted on the brake hub 936 with the left end thereof abutting a shoulder 942 that is formed on the hub 936 to prevent leftward movement of the piston 941. A snap ring 944 is engaged on the right end of the brake hub 936 to lock the elements in position.

A brake cylinder 945 is slidably mounted on the leftwardly extending hub of the piston 941 and is adapted to be moved leftwardly, to effect axial movement of the friction disks and braking plates against an axially stationary pressure plate 946 that is mounted on the drive shaft 931. Leftward movement of the cylinder 945 is effected by means of fluid pressure supplied to a chamber 948 that is formed by the right axial end face of the cylinder and an annular recess formed in the left axial end face of the piston 941. A collector ring 949, having an inwardly extending hub 951, is mounted on a hub portion 952 of the piston 941 and extends inwardly into the cylinder 945. An end closure 953 is provided for the cylinder 945 and is mounted on the inwardly extending hub 951 of the fluid collector ring 949. The end closure 953 snugly engages the interior surface of the cylinder 945 so that little or no leakage of fluid will occur between the two members. A snap ring 954 engaged in an annular groove formed in the interior surface of the cylinder operates to prevent the end closure 953 from axial rightward movement, while the collector ring 949 is maintained in operative position by means of the spacer 943 and the snap ring 944.

For supplying the fluid pressure to the chamber 948 for effecting leftward movement of the cylinder 945, the interior surface of the rightwardly extending hub 952 of the piston 941 is provided with an annular groove 956, which cooperates with the surface of the brake sleeve 936 to define a chamber 957. The clutch 935 is engaged by admitting fluid to the chamber 957 through a passageway 958 formed in the collector ring 949, and is supplied to the operating chamber 948 by means of a communicating passageway 959 formed in the piston 941. Fluid pressure to the chamber 948 will effect leftward movement of the cylinder 945, as viewed in FIG. 6, because the piston 941 is prevented from moving axially.

When the cylinder 945 moves leftwardly, it operates to move the braking plates 938 and the friction disks 937 into frictional engagement to couple the brake sleeve 936 to the fixed spider 939, for stopping rotation of the drive shaft 931. The spindle brake clutch 935 is operably connected to be energized whenever there is no power input to the spindle either through the spindle drive clutch 580 or through the synchromesh clutch 663.

To effect a release of the brake clutch 935, fluid pressure is supplied to a chamber 961 which is formed by the right axial end face of the piston 941 and the inner face of the end closure 953 via a passageway 962 formed on the collector ring 949. Since the piston 941 is stationary, fluid pressure in the chamber 961 will react on the end closure 953, causing it to move rightwardly. With the cylinder 945 coupled to the end closure 953 by means of the snap ring 954, the cylinder 945 will also move rightwardly with the end closure, thereby disengaging the braking plates and the friction disks to release the spindle drive shaft 931.

The drive from the spindle speed selector transmission 113 is continued via the shaft 931 and the gear 928 which is disposed in meshing engagement with a spiral bevel gear 970 keyed on a splined driving sleeve 971 rotatably journalled in the extreme outer end of the gear housing extension 137, as shown in FIG. 6. A spindle drive shaft 972 is splined in the sleeve 971 and extends upwardly within a tubular pendant post 973 that is rotatably mounted on the top surface of the gear housing extension 137, the pendant post 973 serving as a protecting housing for the spindle drive shaft whenever the spindle head 81 is in a retracted position, as shown in FIG. 6. The spindle drive shaft 972 extends downwardly through a suitable opening provided in the bottom surface of the gear housing extension 137 and extends into a rear spindle head extension 974 that is integrally formed with the head housing 80. The lower end 975 of the drive shaft 972 is rotatably supported in a hub 976 of a transfer gear 977, the hub of which is rotatably supported in bearings disposed in a hub 978 formed in the lower or bottom surface of the extension 974. Thus, the gear 977 serves to rotatably support the lower end of the drive shaft 975 so that the drive shaft 972 is rotatable relative to the gear 977 with the gear being rotatable independently thereof.

A splined gear cluster 980 is slidably supported on a splined portion 979 of the drive shaft 972 for effecting a power input either to a low range flywheel gear 981 or to a high range gear 982 which are splined on the spindle 88. The axially movable gear cluster 980 comprises a relatively large gear 983 which is adapted to be meshed with the flywheel gear 981 whenever the gear cluster is in its uppermost position, as shown in FIG. 6. The gear cluster 980 also is provided with a relatively small gear 984 that is adapted to be meshed with an internal gear 986 formed in the transfer gear 977 whenever the gear cluster is moved downwardly into engagement therewith. Thus, rotation of the shaft 972 will be imparted to the gear cluster 9890 which, in turn, operates to drive either the low range flywheel gear 981 by means of the large gear 983, or the high range gear 982 by means of the smaller gear portion 984 which is shifted into meshing engagement with the internal gear 986 of the transfer gear 977.

Selective shifting of the gear cluster 980 into one or the other of its two positions is effected by a novel shifting mechanism, generally identified by the reference numeral 120, and contained within the spindle head extension 974. The shifting mechanism 120 comprises an elongated barrel cam 990 that is rotatably supported in the upper surface of the spindle extension 974 and depends therefrom into the compartment defined by the extension. As shown in FIG. 8, a relatively small spur gear 991 is keyed to the upper end of the barrel cam 990. Vertical movement of the gear cluster 980 is effected by a shifter bracket 992 which is provided with a horizontally extending forked arm 993 that is engaged in an annular groove 994 provided on the gear cluster 990. By moving the shifter bracket 992 upwardly or downwardly relative to the barrel cam 990, the gear cluster 980 will also be caused to move in the same direction so that selective positioning of the gear cluster 980 will be accomplished to effect a driving connection between the drive shaft 972 and the spindle 88 in either a high or low range. Vertical movement of the shifting bracket 992 relative to the barrel cam 990 is accomplished by means of a cam follower roller 996, FIG. 9, which is horizontally journalled in the bracket 992 and extends inwardly to engage a spiral cam groove 995 provided on the peripheral surface of the barrel cam 990. By causing the barrel cam 990 to rotate, the cam follower roller 996 will follow the spiral cam grooves 995, causing the bracket 992 to move vertically either upwardly or downwardly, depending upon the direction of rotation of the barrel cam, and thereby effect a shifting of the gear cluster 990 into selective driving engagement with either the high or low range drive gears 981 or 982, respectively.

The barrel cam 990 is rotated by a relatively long vertical rod 997 that is disposed partially within the spindle head extension 974. The rod 997 extends through the bore of a barrel cam driving gear 998 that is rotatably supported within a suitable opening formed in the top surface of the spindle head extension 974. As shown in FIG. 8, the barrel cam driving gear 998 is in meshing engagement with the gear 991 keyed to the barrel cam 990 so that retation of the gear 998 will effect rotation of the barrel cam 990.

To effect a driving connection between the rod 997 and the drive gear 998, a longitudinal keyway 999 is formed in the peripheral surface of the rod 997. A key 1000 engaged in the keyway 999 operates to effect a driving connection between the gear 998 and the rod 999. Thus, a rotational coupling is effected between the rod 997 and the gear 998 while the rod is free to move axially relative to the gear 998. The rod 997 extends upwardly into the ram extension 137 and into a driving sleeve 1001 that is rotatably supported by the extension 137, as shown in FIG. 8. A driving connection between the drive sleeve 1001 and the rod 997 is effected by means of a key 1002 that is engaged in the longitudinally extending keyway 999 of the rod and a cooperating keyway that is formed in the lower end of the driving sleeve 1001. The upper end of the driving sleeve 1001 is formed with a pinion 1003 which is in meshing engagement with a gear rack 1004 on a piston 1005 that is reciprocally supported in a bore 1006 formed in an elongated boss 1007 integrally formed on the upper surface of the extension 137, as shown in FIGS. 5 and 8. The ends of the bore 1006 are closed by end closure plugs 1008 and 1009 so that the bore 1006 serves as a cylinder for the piston 1005. Hydraulic pressure is supplied to the ends of the bore 1006 through ports 1010 and 1011 to which the ends of hydraulic conduits 1012 and 1013, respectively, are connected.

The drive connection between the shifting piston 1005 and the barrel cam driving gear 998 and the rod 997 is maintained throughout the entire range of vertical travel of the spindle head 81 by reason of the extensible provisions that are provided for the rod 997. As the spindle head 81 is caused to move downwardly from the position shown in FIGS. 6 and 8, it will move relative to the rod 997. After the head 81 is moved downwardly through approximately one-half of its full range of movement, a pin 1014 in the lower end of the rod 997 which extends into the keyway 999 thereof will be engaged by the lower end of the key 1000. Thereafter, further downward movement of the head 81 will cause the rod 997 to move downwardly with it relative to the drive sleeve 1001.

A pin 1016 is disposed in the wall of the spindle head extension 974 and extends into the axial path of the rod 997. When the head 81 is retracted, the pin 1016 engages the lower end of the rod 997 causing the rod to move upwardly with the spindle head. When the head 81 is in a retracted position, approximately one-half of the rod 997 will be contained within the head extension 974 while the other half of the rod will be contained and located within the ram extension 137.

To effect operation of the range change mechanism 120 for shifting from the low range drive to a high range drive, fluid pressure is supplied to the left end of the bore 1006, as viewed in FIG. 5, thereby effecting rightward movement of the piston 1005 within the bore. Rightward movement of the piston 1005 will operate to effect clockwise rotation of the pinion 1003 and the drive sleeve 1001, which, in turn, effects clockwise rotation of the rod 997. Due to the connection between the rod 997 and the gear 998, the latter will also rotate in a clockwise direction, thereby causing the barrel cam driving gear 991 to rotate in a counterclockwise direction, as viewed from the top. The barrel cam 990 will therefore likewise rotate in a counterclockwise direction relative to the shifter bracket 992 and the cam follower 996 will be caused to follow the spiral groove 995 on the barrel cam and to move it downwardly relative to the barrel cam, for effecting axial downward movement of the gear cluster 980 so that the relatively small gear portion 984 of the gear cluster will be engaged in the internal gear 986 of the transfer gear 977. Thus, the spindle 88 will be driven at a selected speed in the high range.

When the range changer 120 is set to drive in the high range, the shifting piston 1005 will be in a rightward position, as viewed in FIG. 5, and when hydraulic pressure is supplied to the right end of the bore 1006 leftward movement of the piston will be effected so that it will be moved to the position shown in FIG. 5. This leftward movement of the piston 1005 will operate to produce clockwise rotation of the barrel cam 990 for moving the shifter bracket 992 upwardly to shift the gear cluster 980 upwardly and disengage the gear 984 from the internal gear 986 of the transfer gear 977. When the gear cluster 980 has been moved to its uppermost position, the gear 983 will have been meshed with the flywheel low range drive gear 981 so that the spindle 88 will be driven at a selected speed in the low range.

The operation of the range change mechanism 120 is automatically effected whenever the opeartor actuates the spindle speed dial selector switch 121 for establishing a spindle speed. Such automatic connection will be more fully described in conjunction with a detailed description of the operation of the selector switch 121.

As described, the spindle 88 is adapted to be driven either in a low range through the operation of the flywheel gear 981, or, in a high range by means of the high range gear 982. Both of these gears are splined to the spindle 88, as shown in FIG. 6, and therefore both will rotate whenever one or the other of the gears is connected to be driven from the shaft 972. With this arrangement, a certain amount of angular movement is possible between the three members, i.e., between the flywheel gear 981 and the high range gear 982 and the spindle 88. Such angular movement or backlash that exists between the three members would soon damage the splines on the spindle as well as the splines in the two gears. In order to minimize the backlash between the three members, the high range gear 982 is provided with a hub 1021 disposed within a counterbore 1022 formed in the low range flywheel gear 981. The hub 1021 of the high range gear 982 is provided with two diametrically opposed segmental notches 1023 and 1024, as shown in FIG. 7. The flywheel gear 981 and the high range gear 982 are orientated with respect to each other so that a pair of bores 1025 and 1026, formed in the flywheel gear 981 from the peripheral surface thereof, register with the notches 1023 and 1024, respectively. Disposed in each of the bores 1025 and 1026 are pins 1027 and 1028, which are positioned so that their inner ends engage against a flat surface of the segmental notches 1023 and 1024, respectively.

By forcing the pin 1028 into tight engagement against the flat surface of the notch 1024 to urge the two gears 981 and 982 in opposite directions, the splines of the gears 981 and 982 will likewise be urged in opposite directions to engage the right faces of the splines of the high range gear into tight engagement with the left faces of the splines on the spindle 88, as viewed in FIG. 7. This action will cause the right faces of the splines of the spindle 88 to tightly engage against the left faces of the complementary splines on the flywheel gear 981. Thus, backlash between the spindle 88 and the gears 981 and 982 will be eliminated. When the backlash has been removed, the pin 1028 will be locked in position by means of a set screw 1029 threadedly engaged in a threaded opening or counterbore that is concentric with the bore 1028. When the pin 1026 is locked in its position, the pin 1027 will be moved axially into tight engagement with the flat surface of the notch 1023 by means of a set screw 1030 which is threadedly engaged in a concentric counterbore associated with the bore 1025 and will serve to lock the three members relative to each other and in their adjusted position. It is apparent that one or the other of the pins 1028 and 1027 may be adjusted to effect a removal of the backlash between the three members while the other remaining pin will then be adjusted into tight engagement with the face of the associated notch and serve as a lock.

Spindle speed selection is effected, as previously mentioned, by means of the spindle speed selector switch 121 which is mounted on the pendant box 122. The spindle speed selector switch 121 is shown in greater detail in FIGS. 21, 22 and 23 and comprises a stationary dial body 1039 having a rotatable speed indicia plate 1040 on which there is provided an inner annular row of spindle speed indicia which is readable against the indicator 911, appearing to the left of the dial, and these indicia are used whenever the spindle motor 110 is energized for operation at 1800 r.p.m. The dial indicia plate 1040 also includes a concentric outer annular row of spindle speed indicia which are readable against another indicator 912 appearing to the right of the dial and these indicia are used whenever the spindle motor 110 is energized for operation at 900 r.p.m. Since the operation of the spindle speed selector switch 121 and its cooperating rotary valve 692 is identical in either case, the description will be confined and will refer to the condition wherein the spindle motor 110 is electrically connected for operation at 1800 r.p.m.

As shown in FIGS. 22 and 23, the spindle speed selector switch 121 comprises the dial body 1039 which is secured to the outer face of a pendant box cover plate 1041 by means of a plurality of screws 1042. The screws 1042 also serve to secure a switch mounting bracket 1043 to the cover 1041, as shown in FIG. 22. The dial body 1039 also includes a manual adjusting knob 1044 that is rotatably and slidably supported on a cup-shaped bushing 1046 that is disposed in suitable axially aligned openings provided in the cover 1041 and in the front plate 1045 of the bracket 1043. The bushing 1046 is arranged to extend through the stationary body portion 1039 of the switch through an axial opening provided therein. The adjusting knob 1044 is provided with a radially extending flange 1047 which is disposed within a suitable recess provided in the stationary body 1039 and carries a circular spindle speed indicia plate 1040.

The switch mounting bracket 1043 comprises a front plate 1045 which is fastened to the cover 1041 by means of the screws 1042 so that the bracket 1043 and the body 1039 of the dial switch 121 are concentrically secured to the cover 1041. The bracket 1043 also includes top and lower plates 1051 and 1052, which are secured to the front plate 1045 as well as to a rear plate 1053 to form an enclosure in which a plurality of switches are secured. The rear plate 1053 is formed with a transversely extending bar member 1054 to which a plurality of selector limit switches 1LS, 4LS, 5LS, 8LS and 9LS are secured by means of elongated screws which extend through the bottom and top plates 1051 and 1052 of the bracket 1043. The rear plate 1053 is provided with a bore 1061 which is concentric with the cup-shaped bushing 1046. A shaft 1062 is rotatably and slidably supported in the bore 1061 of the rear plate 1053 and extends outwardly through an axially aligned opening provided in the cup-shaped bushing 1046 and through an axial opening provided in the knob 1044. A circular switch actuating plate 1063 is mounted on the shaft 1062 and has an axially extending hub 1064 which extends into an axial bore 1065 formed in the cup-shaped bushing 1046. A pin 1066 extends transversely through the hub 1064 of the actuating plate 1063 and through the shaft 1062 to lock the plate 1063 to the shaft 1062 for unitary movement.

A spring 1067 is mounted about the shaft 1062 within the bore 1065 of the bushing 1046 to abut the base or bottom of the bore and is confined in position therein by means of the axial end face of the hub 1064 of the circular plate 1063. The compression spring 1067 operates to urge the circular switch actuating plate 1063 leftwardly, as viewed in FIG. 22, so that it abuts the transverse bar 1054 of the rear plate 1053. The shaft or rod 1062 is provided with a radial flange 1068 which is arranged to abut the outer end of the bushing 1046 and serves to limit the inward or leftward travel of the shaft 1062. The knob 1044 is coupled to the shaft 1062 by means of a pin 1069 which is inserted in aligned openings provided in the knob 1044 and the shaft 1062. As shown in FIG. 23, the peripheral edge of the switch actuating plate 1063 is provided with twenty-four notches 1071 equally spaced about the periphery of the plate. The notches 1071 are adapted to be engaged by locating projections 1072 and 1073 which are fastened on the transverse bar portion 1054 of the rear plate 1053 in alignment with each other. The notches 1071 of the plate 1063 cooperate with the locating projections 1072 and 1073 to positively locate the plate 1073 in any one of the twenty-four positions. By moving the knob 1044 axially outwardly, the shaft 1062 and switch actuating plate 1063 are moved against the pressure of the spring 1067 to disengage the plate 1063 from the projections 1072 and 1073, freeing the knob and plate for rotation to any particular setting that may be desired. When such a setting has been accomplished, the knob will be released and the spring 1067 will urge the switch actuating plate 1063 inwardly to locate it by means of the projections 1072 and 1073 in the desired selected position.

The plate 1063 is provided with a plurality of pegs 1076 which serve as a means for actuating switches 1LS, 4LS, 5LS, 8LS and 9LS that are fixed to the bracket 1043. The pegs 1076 are arranged in five concentric annular rows in a manner so that for any one position of the plate 1063, one or more of the selector switches 1LS, 4LS, 5LS, 8LS and 9LS will be actuated. Thus, for the twenty-four possible positions to which the actuating plate 1063 may be positioned, twenty-four different combinations of switch conditions will be established. The pegs 1076 in the several concentric annular rows are spaced in radial lines that pass through the center of an adjacent notch 1071. Thus, each of the pegs is disposed on a line which passes through the center of the plate 1063 and which bisects a pair of associated notches so that for any setting to which the indicia plate 1040 may be rotated, a particular single diametrical row of pegs in the actuating plate 1063 will be in alignment with the selector switches 1LS, 4LS, 5LS, 8LS and 9LS. Thus, when the operator moves the knob 1044 outwardly, the actauting peg plate 1063 moves with it to release all of the limit switches. With the knob 1044 in its outermost position, the switch actuating peg plate 1063 will be disengaged from the projections 1072 and 1073 and the knob may be rotated to a selected spindle speed setting for establishing the desired speed. When the desired spindle speed selection has been made, the knob 1044 is released and the spring 1067 operates to move the plate 1063 leftwardly so that the projections 1072 and 1073 engage in the associated notches to lock the plate in the selected setting. When the plate 1063 returns to its normal position, the pegs in a diametrical line that establish the selected spindle speed will actuate a particular combination of the selector switches 1LS, 4LS, 5LS, 8LS and 9LS to obtain the desired selected speed. Although the same diametrical row of pegs 1076 is utilized for actuating the switches when the peg plate 1063 is rotated 180°, it is apparent from the view in FIG. 23 that a different combination of switches will be actuated by reason of the spacing of the pegs and it is necessary to rotate the plate 1063 through 360° to actuate the same combination of switches.

The electric motor 693 is connected to rotate the valve spool and is energized by actuating a spindle start button 1236A of a spindle start switch 1236 which is located on the pendant 122. The motor 693 continues to operate for rotating the valve spool 790 of the rotary valve 692 until complementary coincidence switches 2LS, 3LS, 6LS, 7LS and 10LS, shown in FIG. 18, that are associated with the rotary valve, are actuated in the combination which coincides with the combination of the actuated selector switches 1LS, 4LS, 5LS, 8LS and 9LS in the pendant. The coincidence switches 2LS, 3LS, 6LS, 7LS and 10LS, as shown in FIG. 18, are secured in position on the lower plate of the mounting bracket 901. The coincidence limit switches 2LS, 7LS, 3LS, 10LS and 6LS are actuated by cams 1086 to 1090, inclusive, which are secured to the shaft 906 for rotation with it. As shown in FIGS. 28 to 28D, inclusive, each of the cams 1086 to 1090, inclusive, is formed with switch actuating cam surfaces which are arranged to engage the actuating rollers of the associated coincidence switches.

These cams are orientated on the shaft 906 with respect to the position of the rotary valve plunger or spool 790 so that at any particular position of the valve spool 790 a particular combination of limit switches will be actuated which will correspond to the particular combination of switches actuated in the pendant by the actuating plate 1063. As depicted in FIG. 28B, the cam 1090 is shown with its switch actuating surface in contact with the actuating roller of the limit switch 6LS causing it to be actuated and the limit switch 6LS corresponds to the limit switch 5LS in the pendant which was caused to be actuated by the positioning of the plate 1063 upon rotation of the speed selector switch 121 to establish a spindle speed of 33 r.p.m. Thus, when the knob 1044 is moved outwardly, it moves the actuating plate 1063 with it, thus, releasing all of the limit switches 1LS, 4LS, 5LS, 8LS and 9LS. When the knob 1044 is rotated to a selected spindle speed setting and released, the plate 1063 will move with it inwardly and will be locked in the selected position by the positioning projections 1072 to 1073. In the selected position, a diametrical row of pegs of the plate 1063 will be superimposed over the limit switches of the pendant to actuate a combination of selector switches to condition the electrical circuit for effecting deenergization of the motor 693. However, once energized by actuation of the start button 1236A, the motor 693 will continue to operate until the cams on the shaft 906 actuate the coincidence switches 2LS, 3LS, 6LS, 7LS and 10LS in the corresponding combination. When such coincidence is achieved, the motor 693 will be deenergized to terminate the rotation of the valve spool 790 and the gears will be shifted hydraulically to obtain the selected speed.

As shown in FIGS. 18 and 28B, the cam 1090 is shown in position to actuate the limit switch 6LS. In FIG. 23, the complementary switch 5LS is shown actuated so that the combination of the actuated switches associated with the rotary valve are in coincidence with the combination of the actuated switches of the pendant and the motor 693 is now deenergized to positon the valve spool 790 in position No. 5 which corresponds to a spindle speed of 33 r.p.m. The chart in FIG. 29 indicates the actuation of the selector and coincidence switches to obtain each of the rotary positions of the valve spool 790 for establishing the spindle speeds. In this chart an X indicates that the switch listed at the top of the column is actuated while the absence of an X in a square indicates that the switch is deactuated. Both the selector switches in the pendant and the coincidence switches associated with the rotary valve are listed on the chart to indicate their condition for establishing each position of the rotary valve spool 790. Thus, for position 5, the chart in FIG. 29 indicates that the selector switches in the pendant will be conditioned so that the switches 1LS, 4LS, 8LS and 9LS are deactuated while the switch 5LS is actuated. Also, the rotary valve speed change coincidence switches 2LS, 3LS, 7LS and 10LS will be deactuated, while the coincidence limit switch 6LS thereof is shown actuated by the cam 1090. Thus, the selector switches are in coincidence with the coincidence switches of the rotary valve and when such condition obtains the motor 693 will be deenergized and will have effected the positioning of the valve spool 790 to the required position for establishing the desired selected spindle speed.

The range in which the spindle is driven is automatically established upon selection of a desired spindle speed. To this end, a gear 1095 is keyed on the shaft 906, as shown in FIGS. 18, 26, and 27, and is arranged to mesh with a gear 1096 keyed to a stub shaft 1097 that is journalled in the mounting plate 786. Also keyed to the shaft 1097 is a cam 1098 having a switch actuating surface 1099 for actuating a limit switch 11LS. The cam 1098 rotates with the gears 1095 and 1096 for actuating the limit switch 11LS whenever the rotary valve spool 790 is positioned in any one of the low range positions from 1 to 16, inclusive, as shown in the chart of FIG. 29. Thus, a spindle speed from 15 r.p.m. to 302 r.p.m., inclusive, will be in the spindle low range and the limit switch 11LS will be actuated. When a spindle speed is selected between 365 r.p.m. and 1500 r.p.m. corresponding to the high range positions 17 to 24, inclusive, of the valve spool 790, the limit switch 11LS will be deactuated. The condition of the limit switch 11LS for each rotary position of the spool 790 is shown in the extreme right-hand column of the chart of FIG. 29. When the limit switch 11LS is actuated, it operates to condition a valve 1256, shown in FIG. 5 and schematically in FIGS. 31B and 32, for directing fluid pressure to the right end of the bore 1006 of the spindle range change actuator, shown in FIGS. 5 and 8 to move the piston 1005 thereof into a leftward position for establishing the low range of spindle speeds in the manner previously described. On the other hand, whenever the limit switch 11LS is deactuated, it will operate to condition the valve 1256 for effecting a distribution of fluid pressure to the left end of the bore 1006 to effect a rightward positioning of the piston 1005 therein for effecting spindle operation in a high range at a selected speed.

It is apparent from the chart in FIG. 29 that for each successive position of the speed selection dial indica plate 1040 and its associated actuating plate 1063, the condition of only one of the selector switches 1LS, 4LS, 5LS, 8LS and 9LS will change. As a result, of course, each successive positon likewise requires a change in the condition of only one of the coincidence switches 2LS, 3LS, 6LS, 7LS and 10LS. This arrangement minimizes the possibility of an error occurring in the speed selection as a result of the malfunctioning of one of the selector or coincidence switches. For example, to change from position 5 to position 6, only the selector switch 8LS is actuated requiring the actuation of coincidence switch 7LS to obtain coincidence in the switches for establishing the selected speed. The condition of all of the other switches remains the same. To change from position 18 to position 19, the selector switch 4LS is deactuated, requiring the deactuation of coincidence switch 3LS to obtain coincidence. With this arrangement the possibility of an error occurring in setting the desired speed is minimized. For example, if a successive setting required a change in the condition of two selector switches and both switches did not change simultaneously, it would be possible to establish two different combinations in addition to the desired one, depending upon which of the two switches was reconditioned first. Since the present arrangement provides for a change in condition of only one selector switch for each successive position, the repositioning will occur only when this one switch is actuated or deactuated and upon its failure to do so, the setting will remain the same. Therefore, the possibility of establishing an erroneous spindle speed is minimized.

The hydraulic control circuit for operating the various elements of the machine is illustrated diagrammatically in FIG. 32. The spindle head 81 is clamped in a desired position by the operation of the hydraulically actuated head clamps 151 to 154, inclusive, under the control of the manually operated clamp switch 551 located on the pendant 122. Counterclockwise rotation of the clamp switch 551 to the unclamp position effects deenergization of a solenoid 1117 of a valve 1118 to direct fluid pressure for releasing the clamps 151 to 154. The pressure flows from the reservoir 869 through a pair of pumps 1119 and 1120 connected to be driven by a motor 1121. The pumps 1119 and 1120 supply fluid pressure to a supply conduit 1122 from which it flows into a conduit 1123 and thence through a flow control valve 1124, into a conduit 1125, and a conduit 1126 which is connected to a port 1127 of a valve body 1128 of the valve 1118. Fluid pressure flows through the valve via a passage 1129 formed in a valve plunger 1130 and which is biased into its rightward position by means of a spring 1131 whenever the solenoid 1117 thereof is deenergized. The fluid pressure flowing through the passage 1129 is discharged from the valve through a port 1132 and flows into a conduit 1133 that is operatively connected to distribution conduits 1134 and 1135 which direct the fluid pressure to the actuators of the head clamps 151 to 154, inclusive, for effecting their operation in a releasing action.

The fluid on the rod side of the clamp actuators is exhausted through conduits 1136, 1137, 1138 and 1138A which are all connected to a common conduit 1140 that, in turn, is connected to a port 1141 of the valve 1118. From the port 1141, the fluid flows through a passageway 1142 formed in the plunger 1130 and is discharged from the valve through a port 1144. The flow of exhaust fluid continues into a connected conduit 1145 and is returned to the reservoir 869 via a return conduit 1146. With the head 81 unclamped, it may be moved in vertical adjustment either upwardly or downwardly at a feed rate as established by the potentiometer 548 located on the pendant control 122 in either a low or high range as established by an actuating switch button 1147A which is positionable to the left for establishing a low feed range or to the right for establishing a high feed range. The direction of the movement of the head 81 at the selected feed rate is established by operation of the directional switch 547 on the pendant 122. The head 81 may be clamped in a desired position by revolving the clamp switch button 551A in a clockwise direction to establish an electrical circuit to the solenoid 1117 of the valve 1118 for causing the solenoid to be energized. Energization of the solenoid 1117 effects leftward positioning of the valve plunger 1130 of the valve against the pressure of the spring 1131 to connect the port 1127 with the port 1141 via an internal cross passage 1148 formed in the valve plunger 1130, and to connect the ports 1132 and 1144 together by means of another cross passage 1149. With the valve 1118 thus conditioned, fluid pressure will flow from the port 1127 through the cross passage 1148 and out through the port 1141 into the conduit 1140 and the conduits 1136 to 1138A, inclusive, and thereby to the rod side of the actuators of the clamps 151 to 154, inclusive, for effecting their operation in a clamping action to clamp the head in position. The fluid on the head side of the fluid actuators of the head clamps 151 to 154, inclusive, will be exhausted into the conduits 1134 and 1135 which communicate with the common conduit 1133, and thence by means of the port 1132 will flow through the cross passage 1149 and out of the valve through the port 1144 into the conduit 1145 and thence back to the reservoir via the return line 1146.

The head 81 is counterbalanced by operation of the hydraulic counterbalancing mechanisms 90 and 90A. During upward movement of the head 81, fluid pressure flows from the supply conduit 1122 through a conduit 1151 and a flow control valve 1152 which operates to regulate fluid flow therethrough in a well known manner. From the flow control valve 1152 the fluid pressure will continue through a conduit 1153 which is connected to the inlet side of a check valve 1154. The fluid pressure flows from the check valve 1154 into a connected conduit 1156 which has its opposite end connected to a conduit 1157 that communicates with a common distribution conduit 1158. The fluid pressure in the common distribution conduit 1158 will be supplied to the chambers 106 and 106A of the head counterbalancing mechanisms 90 and 90A, respectively. Since the pistons 101 and 101A of the mechanisms 90 and 90A, respectively, are stationary, the cylinders 91 and 91A, respectively, will move upwardly, as viewed in FIG. 32, as the head 81 is adjusted upwardly, thereby causing the volume of the chambers 106 and 106A to increase and the fluid pressure supplied to these chambers will be sufficient to compensate for such increase in volume so that substantially the entire weight of the head 81 is carried by the fluid pressure in the chambers 106 and 106A. After the movement of the head is terminated, the fluid pressure in the conduit 1156 will be diverted into a conduit 1159 and flow therethrough to a pressure relief valve 1160 which is set to open at a predetermined pressure. When the relief valve 1160 opens the fluid will flow therethrough into a connected return conduit 1161 and be returned to the reservoir 869.

On the other hand, if the spindle head 81 is caused to move downwardly, fluid in the chambers 106 and 106A will be forced out of these chambers and will return to the reservoir 869 via the common distribution conduit 1158, the conduit 1157, and the conduit 1159, and will flow through the relief valve 1160 into the return conduit 1161 and thence to the reservoir 869. This return fluid develops pressure in the conduit 1156 to prevent the opening of the check valve 1154, thereby preventing the flow of fluid pressure from the conduit 1153 through the valve 1154.

The ram 60 may be clamped in position by operation of the hydraulically actuated clamps 67 to 70, inclusive, under the control of a rotatable knob or button 1501. Clockwise rotation of the button 1501 effects deenergization of a solenoid 1166 of a valve 1167 which allows a plunger 1168 thereof to be biased to the position shown in FIG. 32, by operation of a spring 1169. With the valve 1167 thus conditioned, fluid pressure from the conduit 1125 will flow into a conduit 1170 which is connected to a port 1171 of the valve body 1172. The flow of pressure continues through a passage 1173 formed in the valve plunger 1168 to a port 1174. The fluid pressure flows out of the port 1174 into a conduit 1175 which communicates with a distribution conduit 1176, the opposite ends of which connect with common conduits 1177 and 1178 that are connected to the head side of the pistons of the actuators for the clamps 69 and 70, and 67 and 68, respectively, to cause the clamps to be released.

Fluid will be exhausted from the rod side of the actuators by conduits 1179 and 1180 which are connected to a common conduit 1181. The common conduit 1181, in turn, is connected to a port 1182 formed in the valve body 1172, which is now in communication with another port 1183 in the valve body, by means of a connecting cross passage 1184 formed in the valve plunger 1168. The fluid exhaust will flow out through the port 1183 into a conduit 1185 which is in communication with the return conduit 1146 and thence return to the reservoir 869. With the clamps 67 to 70, inclusive, released, the operator may effect ram movement selectively in an advancing or retracting direction by actuating the directional switch 333 at a feed rate as established by means of the potentiometer 330. The ram 60 may be clamped in position by revolving the knob 1501 in a clockwise direction to energize the solenoid 1166 of the valve 1167. Energization of the solenoid 1166 causes upward movement of the plunger 1168 of the valve to connect the port 1171 to the port 1182 by means of a passage 1186 formed in the valve plunger 1168. At this time the ports 1174 and 1183 are also connected together by means of another passage 1187 formed in the valve plunger 1168 so that fluid pressure from the conduit 1125 will flow into the conduit 1170 and thence to the port 1171 of the valve and by means of the passage 1173 will flow through the valve and out through the port 1182 into the common conduit 1181 and be distributed thereby into the conduits 1179 and 1180 to be supplied to the rod sides of the pistons of the actuators of the ram clamp mechanism 67 to 70, inclusive. The fluid pressure supplied to the rod sides of the pistons of the actuators of the clamps 67 to 70, inclusive, will operate to effect the clamping of the ram in the desired position.

When the knob 1044 of the spindle speed selector switch 121 is pulled outwardly by the operator for selecting a desired spindle speed, it operates to effect deenergization of a solenoid 1191 of a valve 1192 allowing a plunger 1193 of the valve to be spring returned to the position shown in FIG. 32. In this position of the plunger 1193, fluid pressure to the rotary valve 692 is discontinued and the pressure side of the rotary valve 692 is connected to the reservoir 869 via the conduit 810, which is connected to a port 1194 of the valve 1193. The port 1194 is connected to an exhaust port 1195 by means of a connecting passage 1196 formed in the valve plunger 1193. A conduit 1197 is connected to the port 1195 and is also connected to the reservoir return conduit 1146 so that any pressure in the rotary valve 692 is free to return to the reservoir via the conductor 810, the port 1194, the passage 1196, the port 1195 and thence by the connected line 1197 that is connected to the return conduit 1146. In the meantime, the pressure in the supply line 1125 and a connected conduit 1198 is prevented from flowing to the rotary valve 692 by operation of the plunger 1193. Deenergization of the solenoid 1191 therefore serves to terminate the flow of pressure through the rotary valve 692 while it is being adjusted for establishing a new spindle speed.

When the spindle speed is to be changed, the operator will revolve the button 1236A of the spindle start-stop switch 1236 in a clockwise direction to stop the rotation of the spindle. Such actuation of the switch 1236 serves to interrupt a circuit to a solenoid 1201 of a valve 1202 to condition the valve so as to supply fluid pressure to the spindle drive clutch actuator 601 for disengaging the clutch 580. With the solenoid 1201 of the valve deenergized, a plunger 1203 in the valve is moved into a rightward position, as shown in FIG. 32, by action of a spring contained in the valve. With the plunger 1203 in a rightward position, a port 1204 of the valve is connected to a port 1205 by a cross passage 1206 formed in the valve plunger 1203, and a port 1207 of the valve is connected with a port 1208 by means of another cross passage 1209 that is formed in the plunger 1203. Fluid pressure from the supply conduit 1125 will therefore flow into a conduit 1211 and a branch conduit 1212 to the port 1204. The fluid pressure entering the port 1204 will flow through the valve via the cross passage 1206 and out through the port 1205 into a conduit 1214 that is connected to the port 615 which communicates with the chamber 614 of the spindle clutch actuator 601. The fluid pressure to the chamber 614 of the actuator 601 will cause disengagement of the spindle drive clutch 580 to interrupt the power drive to the spindle. The fluid in the chamber 612 of the actuator 601 will be exhausted via the port 613 and a conduit 1215, the opposite end of which is connected to the port 1207 of the valve 1202. The exhaust fluid entering the valve via the port 1207 will flow through the valve via the cross passage 1209 and flow out of the valve via the port 1208 to flow into a connected conduit 1216 that is in communication with a conduit 1217 which, in turn, is connected to the return conduit 1146 that communicates with the reservoir 869.

With the spindle drive clutch 580 disengaged to interrupt the power drive to the spindle, a circuit to a solenoid 1219 of a valve 1220 that is associated with the spindle brake 935 is momentarily energized to effect a rightward positioning of a plunger 1221 within the valve to thereby connect a pressure inlet port 1222 formed in the valve to a port 1226 by means of a passage 1232 formed in the plunger 1221. The rightward positioning of the valve plunger 1221 also operates to connect a port 1223 with a port 1227 by means of another passage 1233 formed in the plunger 1221. As shown in FIG. 32, the pressurized conduit 1211 is connected to the port 1222 so that fluid pressure will flow to the port 1222 and through the valve via the passage 1232 and will flow out through the port 1226 into a conduit 1231 which has its opposite end connected to the port 958 that communicates with the chamber 948 of the spindle brake 935. The fluid pressure supplied to the chamber 948 of the brake 935 will engage the brake for effecting a positive stopping of the spindle 88.

As the spindle brake clutch 935 is engaged, fluid in the chamber 961 will be exhausted therefrom via the port 962 and will flow into a conduit 1229 which has its opposite end connected to the port 1223. The fluid exhaust will enter the port 1223 of the valve 1220 and will flow through the valve via the passage 1233 and out through the port 1227 into the conduit 1217 which is in communication with the return conduit 1146. The solenoid 1219 of the valve 1220 is energized momentarily to cause the brake to operate for stopping the spindle 88. The plunger 1221 is then immediately returned to the leftward position by the spring wherein it operates to connect the port 1222 to the port 1223 via a passage 1224 formed in the plunger and also operates to connect the port 1226 with the port 1227 via another passage 1228. With the plunger 1221 of the valve 1220 in leftward position, as shown in FIG. 32, fluid pressure in the pressurized conduit 1211 will flow through the valve via the port 1222, the passage 1224 and out through the port 1223 into the conduit 1229 which leads to the chamber 961 of the brake 935. The fluid pressure supplied to the chamber 961 of the brake 935 will cause the brake to become disengaged for freeing the spindle. As the brake 935 is actuated into a disengaged position, the fluid in the chamber 948 of the clutch will exhaust therefrom via the port 958 and will flow into the conduit 1231, to the valve 1220 via the port 1226, the communicating passageway 1228 and the port 1227 to flow into the conduit 1217 which communicates with the return conduit 1146.

With the spindle drive clutch in a disengaged condition for effecting an interruption of the power drive to the spindle 88, a spindle speed change may be initiated by drawing the spindle speed selector switch knob 1044 and its associated switch actuating plate 1063 outwardly to thereby effect a release of all the selector switches 1LS, 4LS, 5LS, 8LS and 9LS for partially conditioning the electrical system for a speed change operation. With the speed selector switch 121 positioned so as to establish a desired spindle speed, and with the knob 1044 released, a combination of the selector switches 1LS, 4LS, 5LS, 8LS and 9LS will be actuated depending upon the position of the dial knob 1044 of the spindle speed selector switch 121. With the spindle speed selector switch 121 positioned for establishing a particular spindle speed, the electrical circuits, to be described, for effecting operation of the various mechanisms to obtain the desired spindle speed are partially conditioned for operation. After the speed selecting switch 121 has been set, the spindle start button switch 1236A will be actuated leftwardly into the start position for a moment and this operates to effect engagement of the synchromesh clutch 663 for effecting a slow rotation of the spindle speed transmission 113 to facilitate gear shifting.

Actuation of the spindle start switch 1236 completes an electrical circuit to a solenoid 1246 of a valve 1247 for effecting a rightward positioning of a plunger 1248 to connect a port 1249 with a port 1250 by means of a passage 1251 formed in the valve plunger 1248 so that fluid pressure in the pressurized conduit 1125, which is connected to the port 1249, will flow through the valve via the port 1249, the passage 1251 and out through the port 1250 into a conduit 1252, the opposite end of which is connected to the port 676 that communicates with the chamber 675 of the synchromesh clutch 663. The fluid pressure to the chamber 675 of the synchromesh clutch 663 actuates the clutch into engagement thereby connecting the slow speed drive train previously described for effecting slow operation of the spindle speed selector transmission 113 to facilitate a gear shifting operation. At the same time that the solenoid 1246 of the valve 1247 is energized, the rotary valve motor 693 will be energized to effect rotation of the rotary valve spool 790 which operates until the coincidence switches 2LS, 3LS, 6LS, 7LS and 10LS associated with the rotary valve are in coincidence with the selector switches 1LS, 4LS, 5LS, 8LS and 9LS associated with the pendant switch. When these switches are in coincidence, the valve spool 790 will have been positioned to effect a desired fluid connection to the shifter shafts 770, 757, 745 and 730 so that fluid pressure supplied thereto will effect their operation to shift the transmission gears for establishing a desired spindle speed.

When the switches are in coincidence, an electrical circuit is completed to the solenoid 1191 to effect its energization for effecting downward movement of the valve plunger 1193 thereby disconnecting the ports 1194 and 1195, and connecting the port 1194 to a port 1237 by means of a passage 1238 that is formed in the valve plunger 1193. With the valve thus conditioned, fluid pressure in the conduit 1198 will flow to the port 1237 and through the valve 1192 via the passage 1238 and out through the port 1194 into the conduit 810 which is connected to the inlet port 809 of the rotary valve 692 so that fluid pressure is supplied to the rotary valve to be selectively distributed to one side or the other of the shifter shafts 730, 745, 757 and 770 for effecting the shifting of the gear clusters associated with the shifter shafts to establish a desired spindle speed.

As the motor 693 operates to rotate the valve spool 790 and the cams 1086 to 1090, inclusive, it will also rotate the cam 1098 for setting the spindle range change mechanism 129 to establish the selected speed. Assuming that the desired speed is 33 r.p.m., which is the No. 5 spindle speed position in the chart of FIG. 30, and this speed is in the low range, the cam 1098 will be rotated to actuate the limit switch 11LS. Thereupon, simultaneously with the energization of the solenoid 1191 of the valve 1192, an electrical circuit to a solenoid 1255 of a valve 1256 will be established to energize the solenoid for effecting rightward positioning of a valve plunger 1257 to establish a connection between a port 1258 and a port 1259 by means of a passage 1260, and to connect a port 1261 with a port 1262 by means of a passage 1263 formed in the plunger 1257. This electrical connection to the solenoid 1255 is establish automatically by the selection of one of the sixteen spindle speeds in the low range.

With the valve plunger 1257 of the valve 1256 positioned in a rightward position, as viewed in FIG. 32, fluid pressure from the pressurized conduit 1125 will flow into a conduit 1266 that has its opposite end connected to the port 1258. The flow continues through the valve 1256 via the passage 1260 and out through the port 1259 into the conduit 1013 which is connected to the right end of the bore 1006 so that fluid pressure will operate to effect leftward movement of the piston 1005 into the position shown in FIG. 32. This action effects upward movement of the gear cluster 980 to connect the spindle drive shaft 972 to the low range flywheel gear 981 for effecting rotation of the spindle 88 in a low range, as previously described. Fluid in the left end of the bore 1006 will exhaust therefrom through the port 1010 and into the conduit 1012 which conduit is connected to the port 1261 of the valve 1256. The exhaust fluid will flow through the valve via the passage 1263 and out through the port 1262 into a conduit 1264 which communicates with the return conduit 1146.

Had the selected speed been in the high range, instead of the solenoid 1255 the solenoid 1265 would have been energized which would have effected a leftward positioning of the valve plunger 1257 of the valve 1256 so that the ports 1258 and 1261 would be connected together by means of a cross passage 1267, while the ports 1259 and 1262 would be connected together by means of another cross passage 1268. When thus conditioned the valve 1256 operates to direct fluid pressure to the left end of the bore 1006 to effect a rightward positioning of the piston 1005 to thereby cause the gear cluster 980 to be shifted downwardly for effecting a high range gear connection, as previously described.

When the selected spindle speed has been established, a time delay relay in the electrical circuit to the valve associated with the synchromesh clutch 663 will operate to interrupt the circuit to the solenoid 1246 of the valve 1247 to deenergize the solenoid, whereupon the plunger 1248 of the valve will be spring returned to a leftward position, as shown in FIG. 32, to block the flow of pressure to the clutch. However, the fluid in the chamber 675 of the synchromesh clutch 663 will be free to return to the reservoir via the line 1252 which is connected to the port 1250 and thence via a passage 1269 to the port 1253 into a conduit 1270 which communicates with the return conduit 1146. Therefore, the synchromesh clutch 663 will be disengaged to interrupt the slow speed drive to the spindle speed transmission 113.

With the transmisison 113 conditioned for driving the spindle 88 at a selected speed and with the synchromesh clutch 63 disengaged, the operator will again actuate the spindle start button 1236A leftwardly to energize the solenoid 1201 of the spindle clutch actuator 601 for effecting a leftward movement of the valve plunger 1203 of the valve 1202 to connect the ports 1205 and 1208 together by means of a passage 1271, and, also, to connect the ports 1207 and 1204 together by means of a passage 1272. Fluid pressure from the conduit 1211 will then flow through the conduit 1212 to the port 1204 and thence through the valve via the passage 1272 and out through the port 1207 into the conduit 1215 which is connected to the port 613 of the actuator 601 to supply fluid pressure to the chamber 612 on the rod side of the piston 609. This causes the piston 609 to move rightwardly, drawing the rod 627 with it to effect engagement of the spindle drive clutch 580 for connecting the spindle drive motor 110 to the spindle 88 for effecting its rotation at a selected speed in the range established by the speed selector switch 121. As the piston 609 moves rightwardly into the position shown in FIG. 12, the fluid in the chamber 614 on the head side of the piston will exhaust therefrom via the port 615 and into the conduit 1214 that is connected to the port 1205 of the valve 1202. This fluid exhaust will flow through the valve via the connecting passage 1271 and out through the port 1208 into the conduit 1216 which communicates with the conduit 1217 that is connected to the return conduit 1146.

Figure 31:
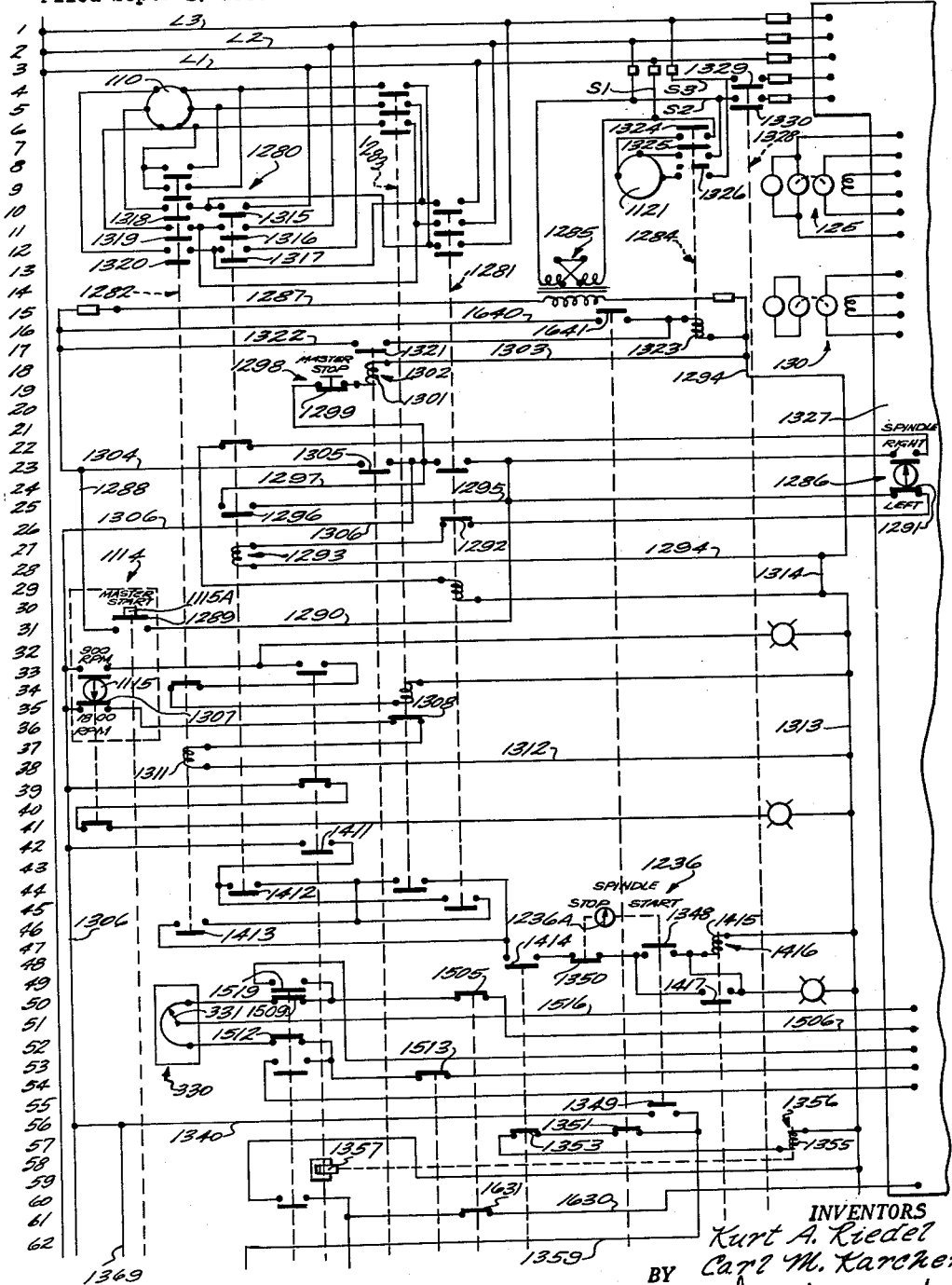
Figure 31A:
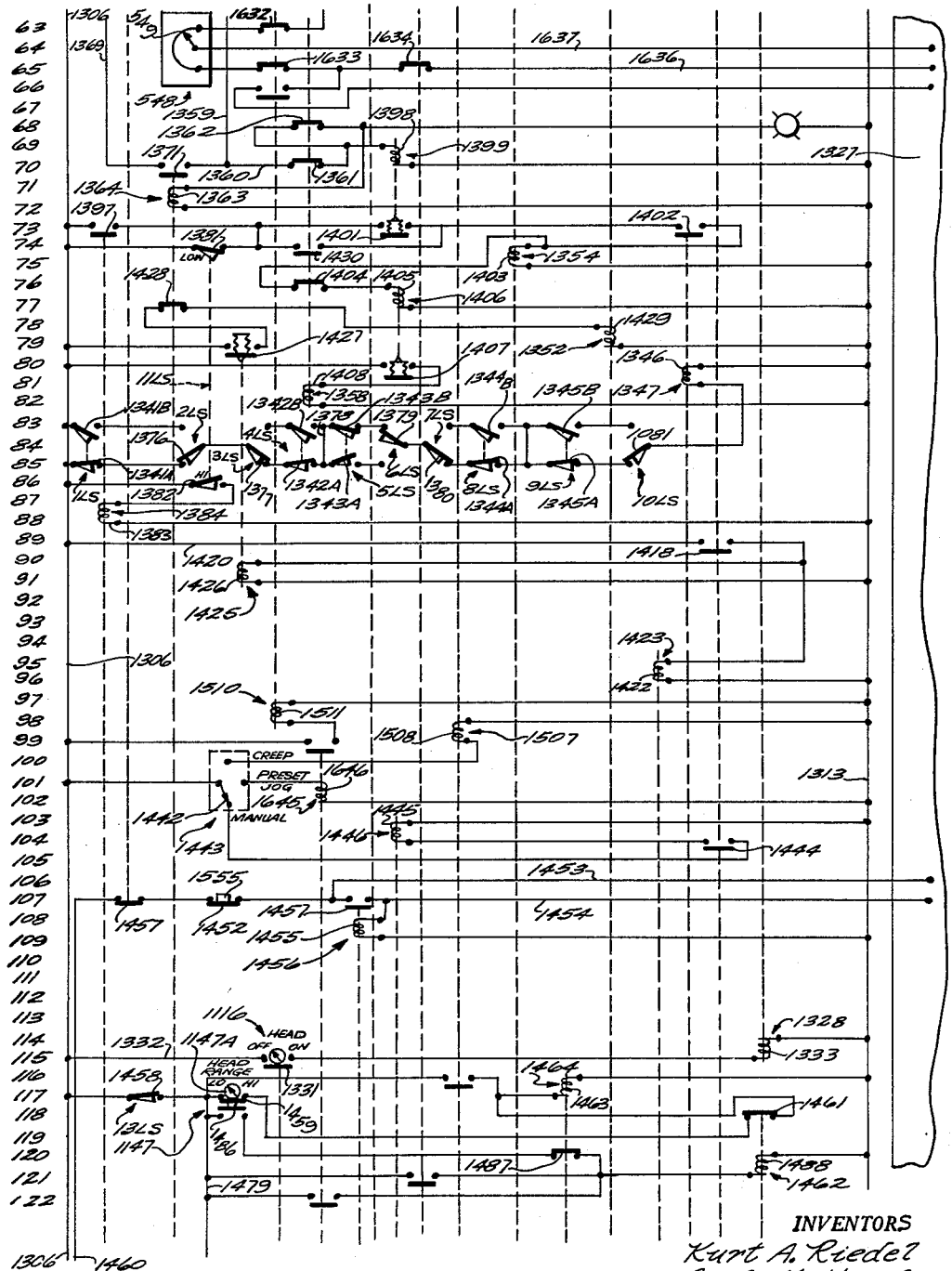
Figure 31C:
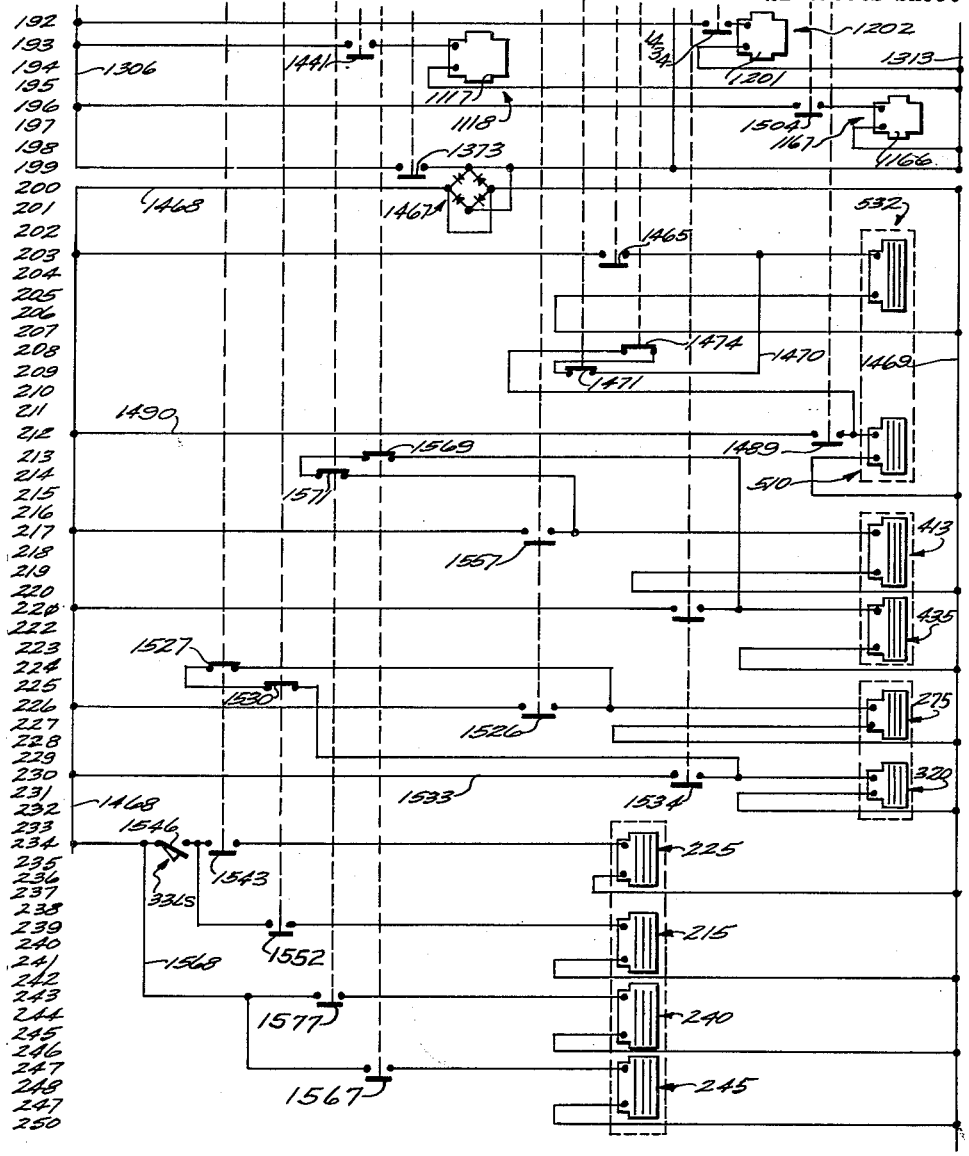

Reference is now made to FIGS. 31 to 31C, inclusive, which illustrate the electrical control circuits for controlling the operation of the machine. The tool spindle motor 110 is reversible and operable at two different speeds to effect rotation of the spindle 88 in either direction selectively at either a high or low speed. The operation of the motor is regulated by a left-hand rotation directional starter 1280 or a right-hand rotation directional starter 1281, and through the selective operation of a high speed starter 1282 or a low speed starter 1283. The directional starters 1280 and 1281 are controlled by a rotary button 1286, illustrated in FIG. 31, and have one side of their contacts wired directly to a source of three phase current L1, L2 and L3, while the contact of the speed starters have one side of their contact wired to the opposite side of the contacts of the directional starters 1280 and 1281, respectively.

The master start switch 1114 is actauted by manipulating the button 1115 which is mounted on the pendant control panel as illustrated in FIG. 24. The master start switch 1114 controls the energization of the electrical circuit and of the motor 110 and also establishes the rate of rotation of the motor 110. The motor 110 and the control circuit are energized by depressing the button 1115 after the rate of rotation of the motor 110 has been established by rotating the button 1115 in either direction. Although the single button 1115, depicted in FIG. 24, functions in this dual capacity, for clarity, two separate buttons are illustrtaed in the control circuit of FIG. 31 with the rotatable button for establishing the rate of rotation being designated as 1115 and the master start push button being identified by the reference numeral 1115A. After the direction of rotation of the motor 110 has been set by turning the directional switch 1286 in the appropriate direction and the rate of rotation of the motor 110 has been established by revolving the button 1115, operation of the motor may be initiated by depressing the button 1115. Assuming that the circuit is adjusted to produce rotation of the motor 110 at its high rate of 1800 r.p.m. in a direction to effect leftward rotation of the spindle 88, actuation of the master start push button 1115A will actuate the switch 1114 to complete a circuit from the secondary of the transformer 1285 through a conductor 1287, on line 15, to a conductor 1288 and thence through the now closed contact 1289, on line 31, of the master start switch button 1115A to a conductor 1290, on line 31. From the conductor 1290 the current will flow through a conductor 1295, on line 25, and thence through the bridging contact 1291 of the spindle motor directional switch 1286 and through a normally closed contact 1292 of the deenergized right-hand directional starter 1281, to a coil 1293 of the left-hand rotation directional starter 1280. The current will return to the transformer 1285 via a conductor 1294 that is connected to the opposite side of the transformer. Energization of the left-hand directional starter coil 1293 effects a closing of contacts 1315, 1316 and 1317 of the starter to partially condition the circuit for energizing the motor 110. At this time, current in the conductor 1295, on line 25, will also flow through a now closed contact 1296, on line 25, of the energized starter relay 1280 and thence through a conductor 1297 which leads to one side of a master stop switch 1298, shown in line 19. The current will continue through the normally closed contact 1299 of the master stop switch 1298 and will flow through the coil 1301 of a master relay 1302 and thence via a conductor 1303 to the return conductor 1294 which is connected to the transformer 1285.

With the master relay 1302 energized, a holding circuit for the relay will be established through the now closed contact 1305, on line 23, to maintain the relay 1302 energized when the master start button 1115A is released. This holding circuit for the relay comprises the energized conductor 1287, the conductor 1304, on line 23, the now closed contact 1305 of the relay 1302, the normally closed contact 1299 of the master stop switch 1298, appearing on line 19, and the coil 1301 with the circuit being completed to the transformer 1285 via the conductor 1303.

With the holding circuit established, the current flowing through the now closed contact 1305 of the relay 1302 will also flow to a conductor 1306 which serves as a supply conductor to the control circuit. From the supply conductor 1306 the current will flow through a closed contact 1307 of the spindle motor speed selection switch 1114, on line 35, and continue on to a normally closed contact 1308, on line 36, of the deenergized low speed motor relay 1283 and will flow to a coil 1311, on line 37, of the high speed starter relay 1282. The current will flow through the coil 1311 and return to the transformer via a conductor 1312 on line 38, which is connected to the control circuit return conductor 1313, that, in turn, is connected to the return conductor 1294 via a connecting conductor 1314. This circuit serves to energize the coil 1311 for actuating the relay 1282 to close the contacts 1318, 1319 and 1320 thereof so that the circuit to the motor 110 will now be completed, since the relay 1280 had previously been energized to close its contacts. The current from the three phase cource L1, L2 and L3 will flow through the now closed contacts 1315, 1316 and 1317 which are in lines 10, 11 and 12, respectively, and through the now closed contacts 1318, 1319 and 1320 of the energized relay 1282 to the motor 110 for effecting its operation at 1800 r.p.m. and in a direction to rotate the spindle 88 in a left-hand direction.

With the spindle motor 110 energized, the motor 1121 which drives the pumps for supplying fluid pressure to the various fluid actuators associated with the various mechanisms of the machine tool may be energized for operation. Such energization of the motor 1121 is effected through a motor starter 1284 which has one side of its contacts connected to the conductors L1, L2 and L3 via conductors S1, S2 and S3. Thus, with the contact 1321 of the relay 1302 closed, current from the energized conductor 1287 will flow through a conductor 1322 and the now closed contact 1321 of the relay 1302 to a coil 1323 of the motor starter 1285. The current will flow from the coil 1323 to the return conductor 1294 to return to its source represented by the transformer 1285. With the coil 1323 energized, contacts 1324, 1325 and 1326 of the motor starter 1284 will be closed so that current will flow through the closed contacts 1324, 1325 and 1326 to the motor 1121 to energize the motor. With the motor 1121 energized, the fluid pressure will be available to the various fluid actuators of the machine tool for effecting their operation as desired.

The lines L1, L2 and L3 are also connected to supply current to an electronic control panel 1327 which is connected to control the operation of the table and ram motor 125. The electronic control panel serves to effect a regulation of the motor 125 so that the speed of the motor may be adjusted as desired by the selective setting of the potentiometer 330, shown in FIG. 24 and FIG. 31. The motor 130 for driving the spindel head 81 in its vertical movement is also electrically connected to the electronic control panel 1327 and is energized from the lines S2 and S3 which are directed into the control panel 1327 through contacts 1329 and 1330 of a relay 1328, the coil of which appears between lines 114 and 115 in FIG. 31A. Speed control of the motor 130 is effected through the potentiometer 548, shown in FIGS. 24 and 31A, which is operatively connected to the electronic control panel and the adjustment of which will regulate the rate of rotation of the motor 130.

Power is supplied to the electronic control panel 1327 for regulated energization of the motors 125 and 130 upon the closing of contacts 1329 and 1330, in lines 4 and 5, respectively. To effect the closing of these contacts, a head power switch 1116, shown in FIG. 24 and FIG. 31A, one line 115, will be actuated clockwise from its "off" position to an "on" position, thereby closing a contact 1331 thereof. With the head power switch 1116 in the "on" position, current from the energized conductor 1306 will flow through a conductor 1332 and the now closed bridging contact 1331, in line 115, of the switch 1116 to a coil 1333 of the relay 1328 and return to the transformer 1285 via the return conductor 1313. Energization of the coil 1333 will effect operation of the relay 1328 for closing the contacts 1329 and 1330 to complete a circuit for supplying current from the lines L2 and L3 through the lines S2 and S3 to the control panel 1327.

With the control panel 1327 receiving current from the three phase source L1, L2 and L3 and with the master relay 1302 energized, a circuit is established to energize the adjustable speed D.C. table and ram motor 125. Such circuit is completed from the electronic control panel 1327, through a conductor 1580, on line 123 of FIG. 31B, and through a now closed contact 1581, shown in line 125, of the energized master relay 1302 and a conductor 1582 back to the motor starting circuit (not shown) in the control panel 1327. Simultaneously, a motor feed circuit (not shown) within the control panel 1327 is also completed from the energized conductor 1580 via a conductor 1583 and a normally closed contact 1584, shown in line 126, of a deenergizing rapid traverse relay 1514, the coil 1515 thereof being shown between lines 168 and 169 of FIG. 31B. From the closed contact 1584, the current is supplied to the motor feed circuit (not shown) of the control panel 1327 via a conductor 1585. Thus, the table and ram motor 125 is energized for effecting a variable feed power input to the distribution transmission 126, previously described, under the control of the potentiometer 330.

A circuit to the adjustable speed D.C. motor 130 is also established through a motor feed circuit (not shown) contained within the control panel 1327, that is connected to the single phase source as represented by the conductors S1 and S3, when the master relay 1302 and the relay 1328 are energized. Such circuit includes a conductor 1588, shown on line 171 of FIG. 31B, that leads from the control panel 1327 to one side of a normally closed contact 1589 of the deenergized manual rapid traverse relay 1514, the opposite side of which is connected to a conductor 1590 that leads back to the control panel 1327. This circuit partially completes the feed circuit for the motor 130 (not shown) in the control panel 1327 with the full circuit for effecting operation of the motor 130 being dependent upon either a head-up or a head-down directional circuit.

The head-up directional circuit comprises a conductor 1591, shown on line 173, that leads from the control panel 1327 and which is connected to a terminal of the head clamp limit switch 34LS, the contact 1592 thereof being shown on line 170, and which is open when the head clamps 151 to 154, inclusive, are in a clamped condition. Therefore, when the head clamps 151 to 154, inclusive, are actuated into a relased condition, the switch 34LS will be actuated to close its contact 1592 and connect the conductor 1591 with a conductor 1593 that is connected to one terminal of a normally open contact 1594 of a head-up directional relay 1472, the coil 1473 of which is shown between lines 128 and 129. The circuit includes ta conductor 1595 that is connected to the other terminal of the contact 1594 and which is connected to the circuit (not shown) within the control panel 1327. Thus, the motor 130 will be energized to effect upward movement of the head 81 at a feed rate established by the potentiometer 548 whenever the head-up relay 1472 is energized.

For effecting downward movement of the head 81, the circuit for energizing the motor 130 includes the previously described feed circuit from the control panel 1327 and a motor directional circuit comprising a conductor 1596, shown on line 169, that is connected to the conductor 1593. The conductor 1596 is connected to one terminal of a normally open contact 1597 of a deenergized head-down directional relay 1475, the coil 1476 of which is shown between lines 135 and 136. The circuit includes a conductor 1598 that is connected to the other terminal of the contact 1597 and which leads back to the control panel 1327. Thus, when the directional head-down relay 1475 is energized, the motor 130 will be energized for effecting downward movement of the head 81 at a feed rate established by the potentiometer 548.

With the control circuit and the master relay 1302 energized, as previously described, the head 81, ram 60 and table 41 may be selectively operated in their particular paths of movement. However, the head, ram and table cannot be actuated in their respective paths of travel unless the spindle 88 is rotated and the clamps associated with the members are released.

The spindle 88 is rotated by the motor 110 at a speed determined by the setting of the switch 121. When the knob 1044 of the switch 121 is drawn outwardly for setting the switch to establish a new speed, the selector switches 1LS, 4LS, 5LS, 8LS and 9LS, shown diagrammatically in lines 83 and 85 of FIG. 31A will be released and the several contacts of these selector switches will return to their normal conditions. Thus, contact 1341A of selector switch 1LS closes and its contact 1341B opens. In like manner, the contact 1342A of selector switch 4LS closes and its contact 1342B opens. Likewise, the contact 1343A of the selector switch 5LS closes and its contact 1343B opens, and in a similar manner the contact 1344A of the selector switch 8LS closes and its contact 1344B opens, while the contact 1345A of the selector switch 9LS closes and its contact 1345A opens. With this condition obtained, a circuit from the energized line 1306 to a coil 1346, shown between lines 80 and 81 of FIG. 31A, of a relay 1347 is interrupted to deenergize the coil and operate the relay so that the contacts associated with the relay return to a normal condition.

As the relay 1347 is deenergized, a contact 1402 thereof shown in line 72, is released to an open condition thereby interrupting a circuit to a coil 1403 of a relay 1354. When the coil 1403 is thus deenergized, the relay 1354 returns to a normal condition wherein a contact 1414, shown in line 48, is opened, a contact 1353, in line 57, is returned to a closed condition, while a pair of contacts 1393 and 1396, in lines 187 and 189, respectively, are opened. This insures that the rotary valve motor 693 is deenergized, the solenoid 1191 of the valve 1192 is deenergized to terminate the flow of pressure to the rotary valve, and the spindle drive clutch 580 is deenergized while the spindle brake is engaged to stop spindle rotation.

With this condition obtained, the operator will rotate the spindle dial knob 1044 of the switch 121 to select a desired speed, as for example, the No. 5 speed setting which corresponds to a spindle speed of 33 r.p.m. in the low range. After the knob 1044 has been adjusted to the desired position, it will be released so that the pegs of the switch actuator plate 1063, as shown in FIG. 23, will actuate the selector switch 5LS while the selector switches 1LS, 4LS, 8LS and 9LS will remain deactuated. The contact 1343A of the selector switch 5LS is therefore opened and its contact 1343B is closed. With the dial switch 121 set to select the desired spindle speed, the operator will actuate the spindle start switch 1236 to close a contact 1348, shown in line 48, as well as to close a mechanically linked contact 1349 thereof, shown in line 56, while a contact 1350, shown in line 48, of the switch remains closed. A circuit will therefore be completed from the energized conductor 1306 through a conductor 1340, shown on line 56, the closed contact 1349 of the spindle start switch 1236, and thence through a closed contact 1351, shown in line 57, of a deenergized relay 1352, the coil 1429 thereof being shown between lines 78 and 79. The current will continue through a normally closed contact 1353 of the presently deenergized relay 1347 and thence will flow to a coil 1355 of an unlatching relay 1356, shown between lines 57 and 58, with the current returning to the transformer via the return conductor 1313. As the coil 1355 of the relay 1356 is energized, the relay is operated to actuate the mechanical latch 1357, shown in line 59, to an unlatching condition, thereby allowing the contacts of a latching relay 1358 to return to their normal condition, a coil 1498 thereof being shown between lines 81 and 82 in FIG. 31A, the relay having been previously deenergized. When the contacts of the latching relay 1358 are returned to their normal condition, a contact 1361 thereof, shown in line 70, returns to a closed condition so that the current which is being supplied to the unlatching relay 1356 will flow through a connected conductor 1359, and thence to a conductor 1360, in line 70 of FIG. 31A. The current flow continues through the now closed contact 1361 to a coil 1398 of a timer relay 1399, shown between lines 69 and 70, with the current returning to the transformer via the return conductor 1313. With the coil 1398 of the relay 1399 energized, the relay will be operated so that a contact 1401, shown in line 73, will be actuated to a closed condition after a time delay. This time delay occurs while other devices are operating.

During the delay in the operation of the relay 1399, the current flowing through the now closed contact 1361, in line 70, will flow through another closed contact 1362, shown in line 68, and thence to a coil 1363 of a relay 1364, shown between lines 71 and 72. The current flowing through the coil 1363 will return to the transformer 1285 via the conductor 1313. Energization of the relay 1364 functions to close a contact 1371 thereof to establish a holding circuit for the relays 1364 and 1399 via a conductor 1369, that is connected to the energized conductor 1340, shown in line 56 of FIG. 31, and the now closed contact 1371 to the conductor 1360 and thence to the coil 1398 of the relay 1399, as well as to the coil 1363 of the relay 1364, as previously described.

With the relay 1364 energized, a normally closed contact 1428 thereof, shown in line 77, is opened to insure that the brake relay 1352 will remain deenergized so that the spindle brake clutch 935 will not be engaged. In addition, a circuit to the solenoid 1246 of the synchromesh clutch valve 1247 is established through a now closed contact 1365, shown in line 180 of the energized relay 1364. Thus, current from the energized conductor 1306 will flow through the now closed contact 1365 and thence to the solenoid 1246 of the valve 1247 with the current returning to the transformer 1285 via a conductor 1367 to the return conductor 1313. With the solenoid 1246 of the valve 1247 energized, the valve will be conditioned to supply fluid pressure to the synchromesh clutch 663 for effecting its engagement to connect the spindle motor 110 to the transmission 113 for effecting slow rotation of the transmission gears for facilitating a gear shifting operation.

Simultaneously with the energization of the solenoid 1246 of the valve 1247, a circuit to the rotary valve motor 693 is established via the now closed contact 1365, in line 180, and a conductor 1371, on line 180, through a closed contact 1372 of the deenergized relay 1347, with the current flowing to the motor 693 and returning to the transformer via the conductor 1313. Upon being energized, the motor 693 will operate to rotate the valve spool 790 as well as its associated cams 1086 to 1090. The cams 1086 to 1090, inclusive, activate the coincidence switches in various combinations depending upon the rotary position of the valve spool 790. The cam 1098 rotates with the cams 1086 to 1090 to control the actuation of the limit switch 11LS for establishing either the low or high range of operation, depending upon which speed has been selected. The speed of 33 r.p.m. is in the low range requiring that the limit switch 11LS be actuated when coincidence is achieved between the selector switches and the coincidence switches.

When the cams 1086 to 1090, inclusive, have actuated the coincidence switches 2LS, 3LS, 6LS, 7LS and 10LS in the same combination that the selector switches 1LS, 4LS, 5LS, 8LS and 9LS on the pendant have been actuated by the operator in selecting the desired spindle speed, the rotary valve motor 693 will be deenergized to terminate the rotation of the valve spool 790 at the desired setting. From the chart of FIG. 29, it will be seen that for position 5 to establish a 33 r.p.m. speed for the spindle 88, the selector switch 5LS must be actuated while the selector switches 1LS, 4LS, 8LS and 9LS are deactuated. Therefore, in order to obtain coincidence with the selector switches, the coincidence switch 6LS must be actuated and the other coincidence switches must remain deactuated. When such condition has been obtained, the circuit to the relay 1347 is completed to effect its energization. Such a circuit is established from the energized conductor 1306, as shown in FIG. 31A, through the closed contact 1341A of the deactuated selector switch 1LS, to the contact 1376 of the deactuated coincidence switch 2LS, through a contact 1377 of the deactuated coincidence switch 3LS, through the closed contact 1342A of the deactuated selector switch 4LS to a branch conductor 1378. Current will continue to flow through the conductor 1378 and through the now closed contact 1343B of the actuated selector switch 5LS, which was actuated by the peg of the actuator plate 1063 associated with the dial knob 1044 of the switch 121. The current flowing through the closed contact 1343B of the selector switch 5LS will continue through the contact 1379 of the actuated coincidence switch 6LS which was actuated to coincide with the actuation of the selector switch 5LS. The current will continue to flow through the contact 1380 of the deactuated coincidence switch 7LS, through the closed contact 1344A of the deactuated selector switch 8LS, the closed contact 1345A of the deactuated selector switch 9LS, through the contact 1081 of the deactuated coincidence switch 10LS and thence through the coil 1346 of the relay 1347 to energize the relay. It is apparent that this circuit will be interrupted when the operator pulls the actuating dial knob 1044 of the switch 121 outwardly and thereby releases the limit switch 5LS which will return to its normal position so that its contact 1343B is open while its contact 1343A closes. Therefore, the path of the current that is flowing through the conductor 1378 is interrupted by the opening of the contact 1343B to break the circuit to the relay 1347.

As the relay 1347 is energized, the rotary valve motor 693 will be deenergized to stop rotation of the valve spool 790 at a particular setting for establishing the desired spindle speed of 33 r.p.m. This is accomplished by the opening of the normally closed contact 1372, in line 180, of the energized relay 1347, thereby interrupting the circuit to the motor 693. Simultaneously, with the deenergization of the rotary valve motor 693, the energized relay 1347 operates to effect a closing of the normally open contact 1402, shown in line 73, which serves to reestablish the circuit to the coil 1403 of the relay 1354. It will be recalled that the limit switch 11LS had been actuated by the cam 1098 by reason of the fact that the selected speed is in the low range, and the limit switch, when so actuated, will operate to effect an opening of the contact 1382 thereof, shown in line 86 and a closing of its contact 1381 shown in line 74. Thereupon, the circuit to the coil 1403 of the relay 1354 is established from the energized conductor 1306 via the now closed contact 1381 of the limit switch 11LS and thence through the now closed contact 1491 of the time delay relay 1399 and thence through the now closed contact 1402 of the energized relay 1347 and thence to the coil 1403 of the relay 1354, with the current returning to its source via the return conductor 1313. The delay in closing of the contact 1401 of the time delay relay 1399 insures that the synchromesh transmission has been engaged to facilitate a gear shifting operation of the transmission 113. With the circuit reestablished to the coil 1403 of the relay 1354, a circuit to the coil 1405 of a gear shift time delay relay 1406, shown between lines 76 and 77, is also established so that current will flow from the now closed contact 1402, in line 73, to the closed contact 1404, shown in line 76, of the deenergizing latching relay 1358 and thence to the coil 1405 of the relay 1406 with the current returning to the transformer via the return conductor 1313. With the relay 1406 energized, a contact 1407, shown in line 80, will be closed after a time delay, which time delay allows for the operation of the shifter shafts and of the range change mechanism 120.

As previously stated, when the limit switch 11LS is actuated, it effects an opening of the contact 1382, appearing in line 86, so that current to the coil 1383 of the relay 1384 which is shown between line 87 and 88 is interrupted to effect deenergization of the coil. Deenergization of the relay 1384 operates to effect an opening of a contact 1386, shown in line 164, that interrupts the circuit to the coil 1387 of an auxiliary relay 1388 which operates to effect the closing of the normally closed contact 1391 thereof, appearing in line 188, and opening its normally open contact 1389 shown in line 190. Thus, the circuit to the solenoid 1265 of the range change valve 1256 is interrupted while a circuit to the solenoid 1255 of the valve 1256 is established to condition the valve for supplying fluid pressure to the bore 1006, shown in FIG. 12, of the range change actuator to effect a leftward positioning of the piston 1005 for effecting a low range connection. Thus, current from the energized conductor 1306 will flow through the now closed contact 1393, shown in line 187, of the energized relay 1354 and thence through the closed contact 1391, shown in line 188, to the solenoid 1255 of the valve 1256 with the current returning to the transformer via the now closed contact 1396, in line 189, and thence to the return conductor 1313.

Simultaneously, with the energization of the solenoid 1255 of the valve 1256, current will also be supplied to the solenoid 1191 of the valve 1192 from the energized conductor 1306 via the now closed contact 1393, with the current flowing through the solenoid and returning to the transformer via the now closed contact 1396 and the return conductor 1313. With the solenoid 1191 energized the valve 1192 will admit fluid pressure to the conduit 810 connected to the port 809 of the rotary valve housing so that fluid pressure will be distributed through the valve spool 790 to the shifter shafts 730, 745, 757 and 770, according to the position of the valve spool as established by the setting of the speed selection switch 121.

As previously stated, the time delay relay 1406 which has been previously energized, will close the contact 1407, shown in line 80, after a time delay which permits the functioning of the shifter shafts and of the range change mechanism 120. When the time delay has expired, the contact 1407 of the relay 1406 will close whereupon current from the energized conductor 1306 will flow through the now closed contact 1407, in line 80, and thence to the coil 1408 of the latching relay 1358 with the current returning to the transformer via the conductor 1313. The energized relay 1358 operates to open the contacts 1361 and 1362 thereof, shown in lines 70 and 68, respectively, thereby interrupting the circuit to the coil 1398 of the time delay relay 1399 and also, interrupting the circuit to the coil 1363 of the relay 1364. At the same time a contact 1430, shown in line 74, is closed to establish a holding circuit to the relay 1354 through the energized conductor 1306 the closed contact 1381 of the limit switch 11LS and the now closed contact 1430 of the relay 1358, and thence through the now closed contact 1402 in line 73, of the relay 1347. In addition, a contact 1404, shown in line 76, of the energized relay 1358 is opened to interrupt the circuit to the coil 1405 of the relay 1406 which, when deenergized, will allow the contact 1407, shown in line 80, to open for interrupting the circuit to the coil 1408 of the energized relay 1358. However, the contacts associated with the relay 1358 do not respond to its deenergization by reason of the latch 1357, shown in line 58 of FIG. 31, operating to maintain the contacts of the relay 1358 in the position as established by the relay when its coil was energized. These contacts will not return to their normal condition until the cooperating unlatching relay 1356 is energized.

With the relay 1364 deenergized, a contact 1365 thereof, shown in line 180 of FIG. 31B, is opened to interrupt the circuit to the solenoid 1246 of the synchromesh clutch valve 1247 to condition the valve for blocking the flow of fluid pressure to the clutch 663 to release the clutch, disconnecting the spindle motor 110 from the slow speed or synchromesh drive transmission.

With these conditions obtained, the actuating button 1236A of the spindle start switch 1236 may be revolved leftwardly, as viewed in FIG. 24, and to close the contact 1348 thereof, shown in line 48 of FIG. 31, so that current from the energized conductor 1306 may flow through a now closed contact 1411, appearing in line 42, of the latching relay 1358. The circuit continues through a closed contact 1412, shown in line 44, of the energized directional starter 1280 to a closed contact 1413, shown in line 46, of the high speed starter 1282, and through a closed contact 1414, shown in line 48, of the energized relay 1354. From the contact 1414 the flow of current continues through the closed contact 1350 of the spindle start switch 1236, the now closed contact 1348 of the switch, to a coil 1415 of a relay 1416 and returns to the transformer via the return line 1313. With current flowing through the coil 1415 of the relay 1416, the relay will be operated so that a contact 1417, appearing in line 50, will be closed for establishing a shunt circuit around the contact 1348 of the spindle start switch so that the coil 1415 of the relay 1416 may be maintained energized when the start switch button 1236A is released. The energized relay 1416 also operates to effect a closing of a contact 1418, shown in line 89 of FIG. 31A, for establishing a circuit to time delay relays 1425 and 1423 the latter of which operates to engage the spindle drive clutch 530.

The circuit for energizing the coil 1426, shown between lines 90 and 91, of the relay 1425 and the coil 1422, shown between lines 95 and 94, of the relay 1423 originates with the energized supply conductor 1306 and continues through a conductor 1420, on line 89, the now closed contact 1418 of the energized relay 1416 with the circuit being completed from the coil 1426 of the relay 1425 and, also, the coil 1422 of the relay 1423 to the transformer 1285 via the return conductor 1313.

With the time delay relay 1425 energized a contact 1427 thereof in line 79, is closed thereby completing a circuit to the coil 1429, shown between lines 78 and 79, of the spindle brake relay 1352. Such circuit originates with the energized conductor 1306, the now closed contact 1427, a closed contact 1428, shown in line 77, of the deenergized relay 1364 to the coil 1429 of the spindle brake relay 1352, with the current being returned to the transformer via the return conductor 1313. As the coil of the brake relay 1532 is energized, a contact 1432, shown in line 176, is closed which would normally complete the circuit to the solenoid 1219 of the valve 1220. However, the time delay relay 1423 is also energized, as previously described, so that a normally closed contact 1431 thereof, shown in line 175, is opened, thus preventing a completion of the circuit to the solenoid 1219 of the valve 1220 so that the valve continues to supply fluid pressure to release the brake 935.

With the coil of the relay 1423 energized, its contact 1434, shown in line 192, is closed thereby completing the circuit to the solenoid 1201 of the spindle clutch valve 1202 for engaging the clutch to establish a drive connection from the motor 110 to the spindle 88. The circuit now established carries current from the energized conductor 1306 through the now closed contact 1434, to the solenoid 1201 of the valve 1202, with the current returning to the transformer 1285 via the return conductor 1313. With the solenoid 1201 of the valve 1202 energized, the valve will be conditioned to distribute fluid pressure to the chamber 612 of the clutch actuator 601 so that the spindle clutch 580 is engaged for connecting the motor 110 to drive the spindle 88 at the selected established rate of 33 r.p.m. in the low range.

If the master stop button 1298 is actuated while the spindle clutch 580 is engaged, it would normally effect deenergization of the motor starter 1284 causing the motor 1121 to stop operating and terminate the flow of fluid pressure to the hydraulic circuit. This would cause the spindle clutch 580 to be reengaged. To prevent this from occurring the spindle brake relay 1352, line 79, is maintained energized for a short period of time to allow the spindle clutch 580 to be released. To this end a holding circuit for maintaining the pump motor 1121 energized is provided so that current from the energized conductor 1306 will flow through a conductor 1640, shown in line 16, to a presently closed contact 1641, also in line 16, of the previously energized brake relay 1352, to the coil 1323 of the motor starter 1284 to maintain the relay in operation. The brake relay 1352 will remain energized, after the master stop button 1298 has been depressed, until such time as the contact 1427, shown in line 79, of the now deenergized time delay relay 1425 opens. This time interval allows the spindle clutch 580 to be disengaged and allows time for the spindle brake 935 to be engaged so that the spindle 88 will not be rotated upon reenergization of the control circuit. When the contact 1427, line 79 opens, the circuit to the coil 1429 of the brake relay 1352 will be interrupted and the brake relay will return to its normal condition thereby causing the contact 1641, line 16, thereof to be opened. When the holding circuit contact 1427 opens, the circuit to the motor 1121 will be interrupted and the motor will stop to terminate the flow of pressure in the hydraulic system.

With the spindle 88 being connected for rotation by the motor 110, the table 41, the ram 60 and the head 81 may be power actuated. To effect power movement of the head 81 either upwardly or downwardly, as desired, the head clamps 151 to 154, inclusive, must be released. Therefore, the head clamp switch 551, which is shown in FIG. 24, must be positioned into an unclamped condition by revolving the button 551A thereof in a counterclockwise direction, as viewed in FIG. 24 and FIG. 31B to open a contact 1334 thereof, shown in line 123 of FIG. 31B, and thereby interrupt the circuit to a coil 1438, shown between lines 123 and 124, of a clamp relay 1439. Deenergization of the relay 1439 causes its contact 1441, shown in line 193, to open, thereby interrupting the circuit to the solenoid 1117 of the clamp valve 1118. With the solenoid 1117 of the valve 1118 deenergized, the valve will be conditioned to supply fluid pressure to the actuators of the clamps 151 to 154, inclusive, to release the clamps.

With the head clamps released, the head 81 may be moved by power. The actuating knob 1442 of a selector switch 1443 may be set into a manual position, the switch 1443 being shown in FIG. 24 on the pendant 122 and in FIG. 31A on line 101 thereof. The feed rate for the head 81 is established by setting the potentiometer 548 to a selected feed rate setting, and adjusting the actuating button 1147A of the feed range switch 1147 into either the low or high range position, it being shown in the low range position in FIGS. 24 and 31A.

The potentiometer 548, FIG. 31A, is energized from the electronic control panel 1327 via a conductor 1630, shown on line 60 in FIG. 31, with the current flowing through a normally closed contact 1631 of a deenergized relay 1507. The current continues through a normally closed contact 1632, shown in line 63 of FIG. 31A, of a deenergized relay 1510 to the potentiometer 548. The current returns to the control panel 1327 via another normally closed contact 1633, shown in line 65, of the deenergized relay 1510, and a normally closed contact 1634 of the deenergized relay 1507 via a conductor 1636. A motor speed signal, which is proportional to the voltage across the potentiometer, is fed back to the motor speed control circuit (not shown) in the control panel 1327 via a connected conductor 1637, shown on line 64 of FIG. 31A.

With the potentiometer selector knob 549 set at a desired feed rate and with the selector switch 1443, line 101, in the manual position, current from the energized conductor 1306 will flow through the switch and through a closed contact 1444, shown on line 104, of the energized relay 1416, which is energized upon the actuation of the spindle start switch 1236, as previously described. The current will now flow through the now closed contact 1444 to a coil 1445 of a maintaining relay 1446 and returns to the transformer via the connected return conductor 1313. With the feed range selector switch 1147 positioned to establish the low range of feed rates, current from the energized conductor 1306 will flow through the closed contact 1458 of a head hand wheel limit switch 13LS, shown in line 117 of FIG. 31A, and through a closed contact 1459 of the range selector switch 1147 to a normally closed contact 1461, shown in line 118, of a deenergized high range head relay 1462. The circuit is completed through a coil 1463 of a head low range relay 1464 to the transformer 1285 via the return conductor 1313. With the coil 1463 of the relay 1464 energized, the relay will be operated so that a normally open contact 1465, shown in line 203 of FIG. 31C, is closed, to establish a circuit to the coil of the low range head clutch 532.

The circuits to the coils of the several clutches are energized by a D.C. circuit which receives power from the energized A.C. supply conductor 1306 which is connected to a rectifier 1467, shown in line 200 of FIG. 31C and which is connected to the return conductor 1313 to complete the circuit. The rectifier 1467 operates to supply D.C. voltage to a conductor 1468 so that current from the energized conductor 1468 will flow through the now closed contact 1465, in line 203, to the coil of the low range clutch 532 with the current returning to the rectifier 1467 via a return conductor 1469. At the same time current is also supplied to the head high range clutch 510 via a connected conductor 1470 and a normally closed contact 1471, shown in line 209, of a presently deenergized headup directional relay 1472, the coil 1473 thereof, appearing between lines 128 and 129 in FIG. 31B. The current will flow through the closed contact 1471 and through a normally closed contact 1474 of a deenergized head down directional relay 1475, the coil 1476 thereof, appearing between lines 135 and 136 of FIG. 31B. From the closed contact 1474, current will be supplied to the coil of the high range clutch 510 and will be returned to the rectifier via the connected return conductor 1469. In this manner both the head low range clutch 532 and the head high range clutch 510 are energized simultaneously so they act as a brake for the head 81. With both the high range clutch 510 and the low range clutch 532 energized, movement of the head may be initiated by moving the actuating lever 547A of the head directional switch 547 either upwardly or downwardly, as viewed in FIG. 24, to effect a selective desired movement of the head. Assuming that it is desired to effect upward movement of the head, the actuating lever 547A of the switch 547 will be shifted upwardly from its central neutral position, as viewed in FIG. 24.

The switch 547, being thus conditioned, will effect a closing of a contact 1477 thereof, shown in line 130, while a contact 1478 thereof will remain closed. Therefore, the current that is being supplied to the head range switch 1147, line 117, will flow through a conductor 1479 and through a now closed contact 1480, shown in line 128, of a previously energized relay 1456 which was energized at the time the master start button 1115A was depressed.

The current will then flow through the closed contact 1335, shown in line 124, of the head clamp switch 551 and through the now closed contact 1481 of the actuated head power switch 1116.

The relay 1456 is energized by current obtained from the energized supply conductor 1305 which flows through a closed contact 1448 of a ram hand wheel limit switch 19LS, shown in line 137, and a closed contact 1449 of a table hand wheel limit switch 20LS, into a conductor 1450 and a conductor 1460. The current in the conductor 1460 will flow through a closed contact 1457, shown in line 107, of the released master start button 1115A. The current will continue on and flow through a closed contact 1452 of a traverse stop button switch 1555, and thence through a conductor 1453, shown on line 106, to a contact (not shown) provided in the control panel 1327 for starting the table and ram motor 125. From the control panel 1327 the current will flow into a conductor 1454 to a coil 1455 of the relay 1456 and will return to the transformer via the connected return conductor 1373. With the coil 1455 of the relay 1456 energized, a contact 1451, shown in line 107, will close to provide a holding circuit for the coil 1455 of the relay line 1456.

To return to the description of the circuit for effecting head-up movement, the current flowing through the now closed contacts 1335 and 1481, shown in line 124, will continue through the now closed contact 1477 of the directional switch 547, shown in line 130, and through the closed contact 1478 thereof and through a normally closed contact 1482 of a head-up stop limit switch 14LS and continue on through the coil 1473 of the head-up directional relay 1472 to return to the transformer 1285 via the return conductor 1313. With the current flowing through the coil 1473, the relay 1472 will be operated so that the contact 1471 thereof, shown in line 209 of FIG. 31C, will be opened to interrupt the circuit to disengage the high range clutch 510 and connect the motor 130 to the head 81 through the low range clutch 532. As the relay 1472 is operated, the contact 1594 thereof, shown in line 174, is closed, thereby conditioning the feed circuit (not shown) within the control panel 1327 for effecting operation of the head motor 130 in a direction to effect upward movement of the head 81, as previously described. Thus, the head 81 will be power actuated upwardly at a feed rate established by the potentiometer 548 and the range selector switch 1147.

A holding circuit for the directional head-up relay 1472 is established through the closed contact 1447, shown in line 132, of the previously energized relay 1446 so that current will flow through the contact to the electronic control panel 1327 through a control circuit therein (not shown). The current is returned to its source via a conductor 1483, on line 136, through the normally closed contact 1478 in line 130 of the switch 547 and thence through the normally closed contact 1482 and the coil 1473 to the return conductor 1313 so that the circuit will be maintained to the coil 1473 of the relay 1472 when the switch lever 547A is released.

If it is desired to operate the head at a feed rate in the high range, the potentiometer 548 would have been set at the desired feed rate while the range selector switch 1147 would have been positioned into its high range position wherein the contact 1459, shown in line 117, of the switch would be opened to effect deenergization of the low range relay 1464, while a contact 1486 of the switch would be closed so that a circuit would be established to the normally closed contact 1487, shown in line 119, of the deenergized relay 1464 and thence through a coil 1488 of the high range relay 1462, the coil being shown between lines 120 and 121, with the current returning to the transformer via the return conductor 1313. With the coil 1488 energized, the relay 1462 will be operated so that its contact 1489, shown in line 212 of FIG. 31C, is closed so that a circuit for energizing both the high-range clutch and the low-range clutch will be established from the energized conductor 1463 through a conductor 1490, on line 212, through the now closed contact 1439, to the coil of the high-range clutch 510 with the current returning therefrom to the rectifier via the return conductor 1469. As current is supplied to the coil of the high-range clutch 510, the current will also flow through the closed contact 1474 of the head-down directional relay 1475, which appears in line 208, and will flow through the closed contact 1471 of the head-up directional relay 1472, the contact appearing in line 209, and will flow to the coil of the low-range clutch 532 and will return therefrom to the rectifier via the return conductor 1469. In this manner both the high-range clutch 510 and the low-range clutch 532 are again energized simultaneously. Therefore, when the directional switch 547 is actuated into its up position the circuit to the low-range clutch 1472 would be interrupted by reason of the directional relay 1472 being energized so that the contact 1471 thereof, in line 209, is opened to interrupt the circuit to the low-range clutch 532, while the circuit to the high-range clutch 510 is maintained through the closed contact 1489, in line 212, of the energized high-range relay 1462.

On the other hand, if it is desired to operate the head downwardly, either in the high or low range, the directional switch 547 is actuated by pivoting the actuating lever 547A thereof downwardly from its central neutral position, as viewed in FIG. 24. Such actuation of the lever 547A operates to open the normally closed contact 1478, line 130, of the switch. However, contact 1491 of the switch 547, shown in line 134, will be closed while a contact 1492 will remain closed. The current will therefore flow through the now closed contact 1491, the contact 1492 and through the normally closed contact 1493 of a down limit switch 17LS, line 134, and will continue to the coil 1476, shown between lines 135 to 136, of a head down relay 1475, and will return from the coil to the transformer 1285 via the conductor 1313. As current flows through the coil 1476 of the relay 1475 the relay will be operated so that the normally closed contact 1474, shown in line 208, of FIG. 31C, will open to interrupt the circuit to one or the other of the clutches 510 or 532 depending upon the position of the range selector switch 1147 which functions, in this case, in the same manner as previously described.

Movement of the head 81 either upwardly or downwardly, once initiated, will continue in the selected direction until one or the other of the limit switches 14LS, in line 130, or 17LS, in line 134, is opened, depending upon the direction of movement of the head. When either one of these limit switches is opened, the corresponding circuit to the associated relay will be interrupted thereby deenergizing the motor 130 and, also, effecting energization of the deenergized clutch so that a braking action is obtained through the simultaneous energization of both the low range and the high range clutches. Movement of the head may also be stopped by actuating the traverse stop button 1555, shown in line 107 of FIG. 31A and in FIG. 24. When the traverse stop button 1555 is actuated, the contact 1452 thereof will open to interrupt the circuit to the coil 1455 of the relay 1456, thereby deenergizing the coil which allows the relay to return to its normal condition, and as a result, its contact 1480, shown in line 128, is opened. The open contact 1480 interrupts the circuit to the head directional selector switch 547 and thereby causes both of the head directional relays 1472 and 1475 to be deenergized to reestablish the circuits to the head low and high range clutches 532 and 510, respectively, to cause a stopping of head movement.

Power movement of the ram 60 may be effected after the ram clamps 67 to 70, inclusive, are released. This is accomplished by revolving the button 1501 of the ram unclamp switch 1164, shown in FIG. 24 and schematically in FIG. 31B, in a counterclockwise direction. Such actuation of the switch 1164 interrupts the circuit to a coil 1503 of a clamp relay 1502, which is shown between line 143 and 144, whereupon the relay operates to open a contact 1504 thereof, shown in line 196 of FIG. 31C, to effect deenergization of the solenoid 1166 of the clamp valve 1167. The valve 1167 is therefore conditioned to direct a supply of fluid pressure to the clamps 67 to 70, inclusive, for releasing these clamps in the manner previously described. With the ram clamps released, the ram is capable of being moved by power in either an advancing direction or in a retracting direction as desired and at a selected feed rate in either a high or low range, as desired. To establish a desired feed rate for the movement of the ram 60, the operator will set the actuating lever 331 of the potentiometer 330, shown in FIG. 24 and schematically in FIG. 31, to the desired setting. The potentiometer 330, as viewed in FIG. 31, is energized from the electronic control panel 1327 via a conductor 1506, on line 52 of FIG. 31, with the current flowing through a normally closed contact 1505 of the deenergized relay 1507, the coil 1508 of which is shown between lines 98 and 99 in FIG. 31A. The current continues to flow through a normally closed contact 1509 of a deenergized relay 1510, the coil 1511 of which is shown between lines 97 and 98 in FIG. 31A, through the potentiometer 330. The current returns to the control panel via another normally closed contact 1512 of the deenergized relay 1510 and thence through a normally closed contact 1513 of a deenergized relay 1514, the coil 1515 of which is shown between lines 168 and 169 in FIG. 31B, to the control panel 1327. A motor speed signal, which is proportional to the voltage across the potentiometer 330 is fed back to a motor speed control circuit (not shown) in the control panel 1327 via a conductor 1516 which appears on line 51 of FIG. 31.

With the potentiometer set to a desired speed, the table range selector switch 338 will be actuated by means of a lever 338A into either the low or high range, depending upon the feed rate at which it is desired that the ram be moved. Assuming that the feed rate selected will be in the low range, the actuating lever 338A of the range selector switch 338 will be positioned to the left in the position in which it is shown in FIG. 24 and in FIG. 31B. With the range selector switch 338 conditioned as described, a contact 1517, in line 138, will be opened to interrupt the electrical circuit to the coil 1518 of a high range relay 1519, the coil of which appears between lines 140 and 141 of FIG. 31B. Simultaneously therewith, a contact 1521 of the range selector switch 338 will be closed. Thus, a circuit is established from the energized conductor 1306 through the normally closed contact 1448 of the ram hand wheel limit switch 19LS and through the normally closed contact 1449 of the table hand wheel limit switch 20LS, both shown, in line 137, with the current continuing through the now closed contact 1521 of the selector switch 338 and a normally closed contact 1522 of the deenergized high range relay 1519 to a coil 1524 of a low range relay 1523, the coil of which appears between lines 138 and 139. The current from the coil 1524 will return to the transformer 1285 via the return conductor 1313. With the coil 1524 of the relay 1523 energized, the relay will operate to close a contact 1526 thereof, shown in line 226 of FIG. 31C. A circuit will therefore be established from the energized D.C. supply conductor 1468 through the now closed contact 1526 to the coil of the ram low range clutch 275 with the current returning to the rectifier 1467 via the return conductor 1469. This circuit operates to engage the low range clutch 275 and at the same time a circuit will be established to engage the high range clutch 320. Such a circuit is established from the energized conductor 1468 through the now closed contact 1526, in line 226, with the current flowing through a closed contact 1527, line 224, of a deenergized ram advance relay 1528, the coil 1529 of which is shown, between lines 148 and 149 of FIG. 31B. The current will flow from the closed contact 1527 through a closed contact 1530, in line 225, of a deenergized ram retract relay 1531, the coil 1532 thereof being shown between lines 151 and 152 in FIG. 31B. The current will then flow through the coil of the high range clutch 320, returning to the rectifier 1467 via the return conductor 1469. Thus, both the ram low range clutch 275 and the ram high range clutch 320 are energized simultaneously and act as a brake and the ram drive saddle is now conditioned so that ram movement may be effected upon the selection of a direction of movement.

A circuit for energizing the ram low range and high range clutches 275 and 320 has been described in detail with the low range selector switch 338 positioned for low range operation. If it is desired to operate the ram 60 at a selected speed in the high range, the potentiometer 330 will be set at a desired feed rate setting while the lever 338A of the range selector switch 338 will be actuated in a clockwise direction for establishing a high range drive connection. In this case the low range and high range clutches 275 and 320, respectively, will also be simultaneously energized and the contact 1521 in line 137 of the selector switch 338 will be opened, while the contact 1517, in line 138, will be closed. Thus, the coil 1524 of the low range relay 1523 will be deenergized while the coil of the high range relay 1519 will be energized. With this condition existing, the contact 1526, in line 226, of the deenergized low range relay 1524 will be opened thereby interrupting the circuit to the low and high range clutches 275 and 320, respectively. On the other hand, energization of the high range relay 1519 will cause a contact 1534 thereof, shown in line 230, to close to complete a circuit for simultaneously energizing both the low and high range clutches. Thus, the circuit for energizing both clutches simultaneously is established from the energized conductor 1468 via a conductor 1533, on line 230, and will continue through the now closed contact 1534, in line 230, of the energized high range relay 1519 to the coil of the high range clutch 320, returning to the rectifier via the return conductor 1469. At this time, the current flowing through the closed contact 1534, in line 230, will also flow through the normally closed contact 1530, in line 225, of the deenergized ram retract relay 1531 and thence through the normally closed contact 1527, in line 224, of the deenergized ram advance relay 1528, and will flow through the coil of the low range clutch 275 and return to the rectifier 1468 via the return conductor 1469. It is apparent, therefore, that the low range and high range clutches 275 and 320 of the ram 60 are energized simultaneously as they were when the ram range selector switch 338 was actuated for low range operation. However, in this case, the energization of the low and high range clutches is through the circuit associated with the high range clutch 320.

Movement of the ram may be effected in either an advancing direction or in a retracting direction at a selected rate in the high range by actuating the lever 33A of the directional selector switch 333, shown in FIG. 24 and FIG. 31B, from its central neutral position. Assuming that it is desired to advance the ram 60, the directional lever 33A will be moved downwardly from the neutral position in which it is shown in FIG. 24. Such actuation of the switch 333 serves to close its contact 1536, shown in line 146, while its contact 1537 will remain closed so that a circuit will be established to the coil 1529 of the ram advance relay 1528, shown between lines 148 and 149. Current will now flow from the energized conductor 1306 through a now closed contact 1538, shown in line 139, of the previously energized relay 1456, through the closed contact 1539, in line 144, of the ram clamp switch 1164. The current will continue to flow through the now closed contact 1536 of the ram directional selector switch 333 and through the contact 1537 to a normally closed contact 1541 of a ram advance limit switch 22LS. From the switch 22LS, the circuit continues through a closed contact 1542, in line 149, of the deenergized ram retract relay 1531 and through the coil 1529 of the relay 1528, with the current returning to the transformer 1285 via the return line 1313. With current being supplied to the coil 1529 of the relay 1528, the relay will close its contact 1543, shown in line 234 of FIG. 31C, so that a circuit to the ram advance clutch 225 is established for engaging the clutch to produce an advancing movement of the ram. The completed circuit will permit current to flow from the energized conductor 1468 through the now closed contact 1546, shown in line 234, of the unclamped limit switch 33LS. The limit switch 33LS is closed when the ram clamps have been released. The current will continue to flow through the now closed contact 1543 of the ram advance relay 1528 to the coil of the ram advance clutch 225 and returns to the rectifier 1467 via the return conductor 1469. Just prior to the energization of the ram advance clutch 225, the ram low range clutch 275 will be deenergized by reason of the contact 1527, shown in line 224, being opened when the directional relay 1528 was energized. Thus, a directional input from the distribution transmission 126 to the ram drive saddle 61 is effected to advance the ram by reason of the directional advancing clutch 225 being energized so that the ram will be moved in an advancing movement and at a feed rate established by the potentiometer 330 and in a high range by reason of the high range clutch 320 being maintained energized.

On the other hand, had it been desired to effect the retraction of the ram at the established feed rate in the high range, the lever 333A of the directional switch 333 would have been pivoted upwardly from its central neutral position, as viewed in FIG. 24. With the directional switch 333 thus actuated, its associated contacts 1536 and 1537, in line 146 of FIG. 31B, will both be open. Simultaneously therewith, its contact 1547, in line 147, will be closed while its contact 1548 will be maintained closed so that the circuit to the coil 1529 of the ram advance relay 1528 is interrupted to prevent energization of the relay. With the actuating lever of the ram directional switch 333 pivoted to the retracted position, a circuit is established through the ram unclamp switch 1164 through the contact 1539 thereof, in line 144. The current will flow through the now closed contacts 1547 and 1548 of the ram directional selection switch 333 and will continue through the closed contact 1549 of the normally closed ram retract limit switch 23LS, in line 147, with the current flowing therefrom through a normally closed contact 1551, in line 150, of the deenergized directional relay 1528. The current flowing through the contact 1551 will continue through the coil 1532, shown between lines 151 and 152, of the ram retract relay 1531, with the current returning to the transformer 1285 via the return conductor 1313. The current flowing through the coil 1532 of the ram retract directional relay 1531 will operate the relay to close its contact 1552, in line 239 of FIG. 31C, so that a circuit is established to the ram retract clutch 215. Current for energizing the clutch 215 will flow from the energized conductor 1468, the closed contact 1546 of the ram unclamp limit switch 33LS and thence to the now closed contact 1552 of the energized retract relay 1531. The current will flow from the contact 1552 to the coil of the ram retract clutch 215 and will return to the rectifier 1467 via the return conductor 1469. At this time, the contact 1530, in line 225, associated with the relay 1531 will be open to interrupt the circuit to the ram low range clutch 275 so that a directional input to the ram saddle 61 is imparted from the distribution transmission 126 by reason of the directional clutch 215 being energized and the low range clutch 275 being deenergized so that the ram will be operated in a retracting movement at a feed rate established by the potentiometer and in high range by reason of the fact that the high range clutch 320 is maintained energized.

A shunt circuit is provided for maintaining the directional relays 1528 and 1531 energized selectively, upon the release of the lever 333A of the ram directional selector switch 333. Such circuit enables current that is flowing through the closed contact 1539, in line 144, of the ram unclamp switch 1164, to flow through a closed contact 1601, shown on line 145, of the previously energized relay 1446 and thence either to a terminal of a contact 1602, shown in line 141, of the ram advance relay 1528 or to a terminal of a contact 1603, shown in line 135, of the ram retract relay 1531. Thus, depending upon which of the ram directional relays is energized, current will flow into a conductor 1604 and thence to a conductor 1605 which is connected into the relay circuits ahead of the normally closed contacts 1537 and 1548 of the directional selector switch 333.

The ram 60 will advance until such time as the ram advance stop limit switch 22LS is actuated to open its contact 1541, appearing in line 146. Such actuation of the limit switch 22LS serves to interrupt the circuit to the coil 1529 of the ram advance relay 1528 to effect deenergization of the coil so that the contact 1543, in line 234, is opened and the ram advance clutch 225 is deenergized. At the same time the contact 1527 of the relay 1528, appearing in line 224, closes, to once again energize the low range clutch 320. When the low range clutch 275 is energized, it will cooperate with the energized high range clutch to act as a brake for stopping ram movement.

On the other hand, if the ram was being moved in a retracting movement, it would retract until the retract stop limit switch 23LS, appearing in line 147, is actuated to open its contact 1549 which results in interrupting the current to the coil 1532 of the ram retract relay 1531. With the coil 1532 deenergized, the relay 1531 returns to its normal condition so that the contact 1552, in line 239, is opened to effect deenergization of the ram retract directional clutch 215. At the same time the contact 1530 of the relay 1531, on line 225, will close to reestablish the circuit to the ram low range clutch 275 so that it will be engaged to counteract the action of the ram high range clutch 320, with the energized clutches acting as a brake to stop ram movement.

Ram movement may also be stopped manually by actuating a traverse stop button switch 1555, shown in line 107 of FIG. 31A, and in FIG. 24. When the traverse stop button 1555 is actuated, its contact 1452 will be opened to interrupt the circuit to the coil 1455 of the relay 1456, shown between lines 108 and 109 of FIG. 31A, to effect deenergization of the coil and thereby allow the relay 1456 to operate so that its contact 1538, in line 139, is opened. Opening of the contact 1538 interrupts the circuit established through the ram unclamp switch 1164 to the directional switch 333, so that both of the ram directional relays 1528 and 1531 will be deenergized, to reestablish the circuit to the ram low range clutch 275 and the ram high range clutch 320 so that braking action is obtained.

The table feed rate is also established by the potentiometer 330 while the range selector switch 338 determines the range of the selected table speed, but a separate directional selector switch 496 is provided for controlling the direction of table movement. Since the selector switch 338 is shown conditioned for effecting low range operation, this condition will be described in setting forth a table movement. With the range selector switch 338 conditioned for establishing the low range of operation, the coil 152 of the low range relay 1524, line 139, will be energized, as previously described, to close its contact 1525, in line 226, for establishing circuits to the ram low and high range clutches 275 and 320, respectively, as previously described. As this condition is obtained, another contact 1557 of the relay 1524, shown on line 217, is also closed so that a circuit from the energized conductor 1568 is established through the now closed contact 1557, in line 217, to the coil of the table low range clutch 413 with the current flowing through the coil and returning to the rectifier 1467 via the return conductor 1469. As current is supplied to the coil of the table low range clutch 413, current will also be supplied to engage the table high range clutch for energizing the coil thereof with the current flowing through a normally closed contact 1571, in line 214, of a deenergized table left directional relay 1572, the coil 1573 thereof, being shown between lines 154 and 155 of FIG. 31B. The current will flow through the closed contact 1571 and a closed contact 1569 of a deenergized table right directional relay 1566, the coil 1565 thereof, being shown between lines 165 and 166 in FIG. 31B. The current flowing through the contact 1569 will continue through the coil of the table high range clutch 435 and return to the rectifier 1467 via the return conductor 1469. In this manner the table low range clutch 413 and the table high range clutch 435 are simultaneously engaged as the ram low range clutch 275 and the ram high range clutch 320 are likewise simultaneously engaged. Thus, with the table low and high range clutches 413 and 435 engaged, directional movement of the table may be effected selectively by actuating a lever 496A of the table directional switch 496 shown in FIGS. 24 and 31B. Actuation of the lever 496A of the directional switch 496 to the right from the central neutral position shown in FIG. 24 will operate to effect table right movement. To this end, when the switch 496 is conditioned for table right movement, it operates to effect a closing of its contact 1558, shown in line 157, while it maintains a contact 1559 closed, and a pair of contacts 1561 and 1562, in line 153, opened. Thus, the current that is being supplied to the ram directional switch 333 will also flow through the now closed contact 1558, in line 157, and the contact 1559 and through a normally closed contact 1563 of a table right stop limit switch 29LS, shown in line 157. The flow of current continues through a normally closed contact 1564 of a deenergized table left directional relay 1572, the coil 1573 of which is shown between lines 154 and 155 of FIG. 31B. The current flowing through the normally closed contact 1564, in line 158, will continue through the coil 1565, shown between lines 165 and 166, of a table right relay 1566, with the current returning to the transformer 1285 via the return conductor 1313. With the coil 1565 energized, the relay 1566 operates to close a contact 1567, shown in line 247 of FIG. 31C, for establishing a circuit to the coil of the table right clutch 245. Such circuit permits current to flow from the energized conductor 1468 to a conductor 1568 through the now closed contact 1567, in line 247, to the coil of the table right clutch 245, and return to the rectifier 1467 via the connected return conductor 1469. At this time, another contact 1569, shown on line 213, of the energized table right directional relay 1566, will be opened thereby interrupting the circuit to the table high range clutch 435 so that table movement will be effected to the right at a feed rate established by the potentiometer and in a low range as established by the range selector switch 338.

On the other hand, if it is desired to move the table to the left, the actuating lever 496A of the table directional switch 496 will be actuated to the left, as viewed in FIG. 24. With the table directional switch 496 thus actuated, the contact 1558 in line 157 of the switch will be maintained open while the contact 1559 thereof will be opened and the associated contact 1561, in line 153, will be closed while the contact 1562 thereof will remain closed. Current will then flow through the now closed contacts 1561 and 1562 of the switch and through the normally closed contact 1574 of the table left stop limit switch 28LS to a normally closed contact 1576, shown in line 154, of the denergized directional table right relay 1566, with the current continuing through the coil 1573 of the table left relay 1572 and returning to the transformer via the return conductor 1313. The current flowing through the coil 1573 of the directional relay 1572 will operate the relay to close its contact 1577, shown in line 243. Current from the energized conductor 1468 will therefore flow through the conductor 1568 and the now closed contact 1577 to the coil of the table left clutch 240 with the current returning to the rectifier 1467 via the return conductor 1469. As the relay 1572 operates to close the contact 1577 in line 243, it also operates to open a contact 1571 in line 214 to thereby interrupt the circuit to the coil of the table high range clutch 435 so that the clutch is denergized and rendered inoperative.

A shunt circuit is provided for establishing a holding circuit to the coils 1573 or 1565 of the directional relays 1572 and 1566, respectively, for maintaining the coil selectively energized upon the release of the actuating lever 649A of the table directional selector switch 649. Such holding circuit is established from a conductor 1611, which in eregized through the closed contact 1539, in line 144, of the ram unclamp switch 1164, so that current will flow therefrom to a conductor 1612, shown between lines 150 and 151. From the conductor 1612 the current will flow through a closed contact 1613 of the previously energized relay 1446, and thence to a terminal of a contact 1616, shown on line 150, of the directional table left relay 1572. The current flowing through the closed contact 1613 of the energized relay 1446 will also flow to a terminal of a contact 1617, shown between lines 152 and 153, of the directional table right relay 1566. Therefore, depending upon the selected direction of table movement, one or the other of the directional relays 1566 or 1572 will be energized, so that the holding circuit will be established through either the contact 1617, between lines 152 and 153, or the contact 1616, in line 150, respectively. The current flowing through either one of the contacts 1616 or 1617 will flow to a conductor 1618 which is connected into the directional relay circuits ahead of the normally closed contacts 1559 and 1562, respectively, of the table directional selector switch 648. Thus, when the directional lever 649A is released, the current will be sunted around the normally open contacts 1558 and 1561 of the switch 649 and will flow through the relay circuits, as previously described, depending upon which of the directional relays has been energized.

Thus, it is apparent that the ram 60 ond table 41 may be power actuated either individually or together and in selected directions but such movement will be at a common feed rate as established by the potentiometer 330 in conjunction with the common range selector switch 338.

Provisions have been made for effecting movement of the head 81, the ram 60 and the table 41 at a present "jog" feed rate and a preset "creep" feed rate. For these conditions the actuating lever 1442 of the selector switch 1443, shown in FIGS. 24 and 31A, is selectively positionable to one or the other of two positions, as indicated on the pendant 122. When the selector switch 1443 is conditioned for preset "jog" operation the feed circuit (not shown) in the control panel 1327 is conditioned to limit the operation of the motors 125 and 130 to a predetermined fixed speed. On the other hand, when the selector switch 1443 is conditioned for creep operation, the feed circuit (not shown) in the control panel 1327 is conditioned to limit the operation of the motors 125 and 130 at another predetermined fixed speed which is substantially lower than that established for the preset "jog" operation. In either condition of operation the circuits are not maintained and movement of the members in the selected direction depends upon holding the actuating lever of the associated directional switch in either of their two directional positions.

The preset "jog" operating condition is established through the selector switch 1443 and two raleys 1510 and 1645, the coils 1511 and 1646, respectively, of which are shown between lines 97 and 98 and lines 101 and 102, respectively. These relays operate to disconnect the potentiometers 548 and 330 from the control panel 1372 and also to complete a circuit around the table and ram range selector switch 338 and the head selector switch 1147.

The preset "creep" operating condition is also established through the selector switch 1443, as previously stated, and the relay 1507, the coil 1508 thereof being shown between lines 98 and 99. The relay 1507 also operates to disconnect the potentiometers 548 and 330 from the control panel 1327 and also establishes a circuit around the range selector switches 1147 and 338.

Provision has also been made to effect head, ram and table movement at rapid traverse rates which are substantially greater than the feed rates that can be obtained through the potentiometers 330 and 548. The rapid traverse rate of travel is obtained by depressing a rapid traverse button 1643, shown in FIG. 24 and in FIG. 31B, on line 167 thereof, which in conjunction with the directional switches 547, 333 and 496 and the associated directional relays 1472, 1475, 1528, 1531, 1572 and 1566 as well as the rapid traverse relay 1514, the coil 1545 of which is shown, between lines 168 and 169 in FIG. 31B, operate to interrupt the circuits to the potentiometers 330 and 548 so that a higher motor speed signal can be obtained which is considerably higher than that obtainable across the potentiometers.

From the foregoing detailed description of the illustrative embodiments set forth herein to exemplify the present invention, it will be apparent that there has been provided an improved machine tool having an improved multi-speed transmission and speed selector control for operation at any one of a great plurality of speeds which are divided into two range groups of low range speeds and high range speeds. Selective shifting of the transmission is controlled by a single simple dial control which also operates to effect a range change to correspond to the range of the selected speed. In addition, the improved machine tool includes a novel and improved drive transmission for effecting movement of two machine tool members either individually or simultaneously and in either direction in their paths of travel. The drive transmission is composed of unitary components arranged to simplify the removal and replacement of each unit without disturbing other components of the transmission.

Although the exemplary embodiments of the invention have been described in considerable detail for the purpose of disclosing operative apparatus incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing description, we hereby claim as our invention:

1. In a machine tool; a power source; a transmission operably connected to be driven by said power source, said transmission having a plurality of shiftable gears and a plurality of non-shiftable gears, said shiftable gears being arranged to be individually shifted for establishing a plurality of transmission outputs; a plurality of fluid actuated shifting mechanisms each of which is operably connected to individual shiftable gears of said transmission for actuating said shiftable gears into a plurality of combinations of positions with each combination of positions establishing a different transmission output; a fluid distribution valve conditionable to a plurality of conditions for effecting a distribution of fluid pressure to said shifter mechanisms for actuating said shifter mechanisms to selectively position said shiftable gears for establishing a selected transmission output; a source of fluid pressure operably connected to said distribution valve; an electric motor connected to said fluid distribution valve and operable when energized to adjust said valve to any one of a plurality of conditions for directing fluid pressure to said shifter mechanisms for establishing different transmission outputs; a plurality of coincidence switches carried by said distribution valve; a plurality of cams carried by said distribution valve and operably connected to be rotated by said electric motor when said motor operates to condition said distribution valve, said cams being disposed in position so that each of said cams when rotated is operable to actuate and deactuate a selected one of said coincidence switches, said cams being arranged for operating said associated switches in a plurality of coded combinations; a control member; a plurality of selector switches equal in number to said coincidence switches and carried by said control member; a transmission output selector operably connected to said control member and having indicia indicating the plurality of different transmission outputs, said selector being operable when selectively positioned at a particular transmission output setting to actuate one or more of said selector switches in coded combination; an electrical circuit operably connected to said selector switches and said coincidence switches, said circuit also being connected to said electric motor; and means operably connected in said circuit to effect energization of said motor whereupon said motor operates to adjust said distribution valve and to rotate said cams for actuating said coincidence switches and when said coincidence switches are actuated in the same combination that said selector switches have been actuated said electrical circuit operates to deenergize said motor which will then have adjusted said distribution valve so that fluid pressure will be distributed to said fluid actuated shifter mechanisms for establishing a selected transmission output which coincides with the output indicated by said selector.

2. In a machine tool having an element to be selectively driven at any one of a plurality of speeds; a multi-speed transmission connected to drive said element from a power source, said transmission including a plurality of non-shiftable gears and a plurality of shiftable gears arranged to be shifted in permutated patterns of positions for establishing a plurality of transmission outputs; fluid actuated shifter means for each of said shiftable gears for shifting said shiftable gears; a source of fluid pressure; a valve connected to receive fluid pressure from said source and to distribute the fluid pressure for selectively actuating said shifter means; a rotary spool in said valve positionable therein to condition said valve for effecting a distribution of fluid pressure to said fluid actuated shifter means for establishing a plurality of positional patterns of said shiftable gears to thereby establish a plurality of transmission outputs; an electric motor operably connected to rotate said rotary spool; a control circuit for effecting energization of said motor; a plurality of cams operably connected to be simultaneously rotated by said motor as said motor operates to rotate said spool; a plurality of coincidence switches arranged in the rotary path of said cams to be actuated and deactuated thereby in coded combinations, said coincidence switches being interconnected in said circuit; a transmission output selector controller indexable to a plurality of positions corresponding to the number of transmission outputs; a plurality of selector switches carried by said selector controller in a number corresponding to the number of said coincidence switches; means connected to said selector controller to be indexed therewith and operable to actuate said selector switches in various combinations which correspond to the combinations in which said coincidence switches can be actuated by said cams, said selector switches also being interconnected in said circuit; and a starting switch in said circuit and operable when actuated to effect energization of said electrical motor, whereby said selector controller may be indexed to a desired transmission output setting to actuate said selector switches in a particular coded combination, and thereafter actuation of said starting switch will start operation of said motor to rotate said valve spool and said cams until such time as said cams have actuated said coincidence switches in a combination which coincides with the actuated combination of selector switches, said switches when in coincidence operating to deenergize said electric motor to terminate the rotation of said valve spool at the particular position which produces a distribution of fluid pressure to said fluid actuated shifter means for positioning said shiftable gears for establishing the particular transmission output which corresponds to the setting of said selector controller.

3. In a machine tool having a member to be driven at a plurality of speeds; a power source; a multi-speed transmission operably connected to be driven by said power source to drive the machine tool member at a selected speed, said multi-speed transmission having a plurality of shiftable gears arranged to be individually shifted to establish a plurality of transmission outputs; shifter members in said transmission equal in number to the number of shiftable gears with each shifter member being operably connected to a shiftable gear; shifter actuating means operably connected to said shifter members for actuating them into a plurality of shifting combinations, said shifter actuating means being conditionable to a plurality of conditions corresponding to the number of outputs of said transmission; an electric motor; means operably connected to be actuated by said electric motor for effecting the conditioning of said shifter actuating means into any one of its plurality of conditions; a speed selector dial remotely positioned relative to said speed transmission and indexable to a plurality of transmission speed positions; a plurality of selector switches in position to be actuated by said dial in a plurality of coded combinations corresponding in number to the number of transmission output speeds with each dial setting actuating said selector switches in a particular coded combination; a plurality of coincidence switches positioned to be actuated in response to the operation of said electric motor in a plurality of coded combinations which correspond to the plurality of coded comminations of said selector switches; means operably connected to effect energization of said electric motor, whereby said coincidence switches are actuated into different coded combinations in response to the operation of said motor until such time as they are actuated into a coded combination which coincides with the coded combination of said selector switches as established through the setting of said dial, and when such coincidence occurs said switches function to stop the operation of said motor and said shifter actuating means will have been conditioned into a particular condition so that said shifter members will have positioned said shiftable gears to establish a particular transmission output corresponding to the transmission output setting of said dial.

4. In a machine tool having a base which supports a member to be driven at a plurality of rates; a transmission having a plurality of non-shiftable gears and a plurality of shiftable gears adapted to be shifted into a plurality of gear combinations for obtaining a plurality of transmission outputs; fluid actuated shifter shafts in said transmission connected to said shiftable gears for establishing the various gear combinations; a distribution valve having a rotary spool rotatable to a plurality of positions corresponding in number to the number of transmission outputs, said distribution valve being operable to direct fluid pressure to said shifter shafts in various combinations depending upon the rotary position of said spool for shifting said shiftable gears into the gear combinations for selectively establishing the several transmission outputs; an electric motor operably connected to rotate said valve spool; a group of coincidence switches; switch actuating cams connected to be rotated by said motor as said motor operates to rotate said valve spool, said cams being positioned to actuate said coincidence switches into a plurality of coded combinations with each coded combination representing a particular transmission output; a manual transmission output selector dial indexable to a plurality of transmission output indicating positions; a group of selector switches disposed and arranged to be actuated in a plurality of coded combinations corresponding to the coded combinations of said coincidence switches; means connected to said dial to be indexed therewith and operable upon selective positioning of said dial to actuate said selector switches in the coded combinations; and means operable to stop motor operation when the combination of actuated coincidence switches coincides with the combination of actuated selector switches; whereby a particular transmission output may be established by indexing said dial to a desired output setting to actuate said selector switches in a particular coded combination and said motor will operate to rotate said valve spool and actuate said coincidence switches so that when said coincidence switches are actuated in a particular coded combination which corresponds to the actuated coded combination of said selector switches, operation of said motor will be stopped and said valve spool will be positioned to effect a distribution of fluid pressure to said shifter shafts for establishing a particular gear combination to establish a particular transmission output corresponding to the transmission output indicated by the selector dial setting.

5. In an automatic selective shifting mechanism for use with a shiftable gear speed transmission having shifter means for effecting individual ones of a plurality of shift positions; a manual speed selecting dial indexable to a plurality of speed indicating positions; a plurality of selector switches positioned adjacent said dial and arranged to be actuated in a plurality of coded combinations corresponding to the plurality of indicated speeds; means connected to said dial to be indexed therewith and operable upon selective positioning of said dial to actuate a particular coded combination of said associated switches; actuating means having a plurality of different conditions and operable when operated to effect the operation of said shifter means for establishing a particular shift combination; a motor operably connected to operate said actuating means into a particular condition so as to establish a particular shift combination; a plurality of coincidence switches positioned to be actuated in a plurality of coded combinations corresponding to the coded combinations arranged for said selector switches; coincidence switch actuating means connected to be driven by said motor as said motor operates said shifter actuating means and disposed to actuate said coincidence switches; and means energizable through the coincidence of said coincidence switches with said selector switches to effect deenergization of said motor to position said actuating means into a particular condition to establish a particular shift position corresponding to the indicated speed setting of said dial.

6. In an automatic selective shift mechanism for use with shiftable gearing having shifter shafts for shifting said shiftable gears into a plurality of positional combinations; shifter shaft actuating means conditionable to a plurality of shifter shaft actuating positions; an electric motor connected to operate said shifter shaft actuating means into the individual shifter shaft actuating positions; a circuit for said electric motor including a manually actuatable switch for energizing said motor; a group of coincidence switches; individual cams for each coincidence switch disposed to effect actuation and deactuation of said switches in a plurality of coded combinations representing the positional combinations of the shiftable gearing, said cams being operably connected to be rotated by said motor when said motor is energized to operate said shifter shaft actuating means; a dial manually indexable to a plurality of individual positional settings representing the individual positional combination of the shiftable gears; a group of selector switches positioned to be selectively actuated by the selective positional setting of said dial; switch actuating means connected to said dial to be indexed therewith and operable to actuate said selector switches into individual combinations corresponding to the individual coded combinations of said coincidence switches; and means in said circuit operable to interrupt the circuit to said motor to stop its operation when said coincidence switches are actuated in the combination which coincides with the combination of actuated selector switches so that said shifted shaft actuating means will be positioned to condition said shiftable gearing into a particular positional combination corresponding to the indicated dial setting.

7. In an automatic selective shifting mechanism for use with a shiftable gear speed transmission having shifter means for effecting gear positioning to individual ones of a plurality of shift positions; actuating means operable in a particular one of a plurality of conditions to effect operation of the shifter means for establishing a particular gear shift position; a motor connected to said actuating means for operating said actuating means into a particular gear shift actuating position; a circuit for energizing said motor so that said motor operates said shifter actuating means; a group of coincidence switches in said circuit and adapted to be actuated in a plurality of coded combinations with each coded combination representing a particular gear shift position; a plurality of cams operably connected to be rotated by said motor in position to actuate said coincidence switches in different combinations as said motor operates said actuating means, wherein each successive combination adds or subtracts only one actuated coincidence switch to the preceding coded combination of actuated switches; a manual speed selecting dial selectively indexable to a plurality of transmission speed indicating positions; a group of selector switches positioned adjacent said dial and connected in said circuit, said selector switches being arranged to be actuated in different combinations corresponding to the different combinations established for said coincidence switches; means connected to said dial to be indexed therewith and operable upon selective positioning of said dial to actuate said selector switches in the different combination; means in said circuit operable upon actuation in coincidence of a predetermined combination of said selector switches and said coincidence switches to deenergize said motor; and a motor starting switch in said circuit operable when actuated to effect energization of said motor, whereby a desired transmission speed may be selected by indexing said dial to a desired transmission speed indicating position which actuate said selector switches in a particular combination, and thereafter automatic transmission shifting to obtain the desired transmission speed will be effected by energizing said motor which will operate to simultaneously operate said shifter actuating means and to rotate said cams until such time as said coincidence switches are actuated in a combination that coincides with the combination of actuated selector switches thereby effecting de-energization of said motor and a conditioning of said shifter actuating means so that a particular gear shift position will be established for conditioning the transmission to obtain the desired speed which corresponds to the speed indicated by said dial and the accurate conditioning of said shifter actuating means is insured by the fact that successive combinations of actuated switches require the addition or subtraction of only one actuated switch from the preceding combination so that ambiguity in the coincidence of the coded combination of said selector and coincidence switches is eliminated.

8. In an automatic selective shifting mechanism for use with a shiftable gear speed transmission having shifter means for effecting gear positioning to a plurality of gear shift positions; actuating means operable to effect operation of the shifter means for establishing the several gear shift positions; a motor connected to said actuating means for operating said actuating means; a circuit for energizing said motor so that said motor operates said shifter actuating means; a relay having a normally closed contact in said motor energizing circuit, said relay being operable when energized to interrupt said motor energizing circuit to thereby stop operation of said motor so that said shifter actuating means will be conditioned for establishing a particular gear shift position; an electrical circuit connectable to said relay for effecting its energization; a group of coincidence switches in said relay circuit adapted to be actuated in a plurality of coded combinations with each coded combination representing a particular gear shift position; a plurality of cams operably connected to be rotated by said motor in position to selectively actuate said coincidence switches as said motor operates said actuating means; a manual speed selecting dial indexable to a plurality of transmission speed indicating positions; a group of selector switches positioned in proximity to said dial and connected in said relay circuit and arranged to be actuated in a plurality of coded combinations corresponding to the coded combinations established for said coincidence switches; means connected to said dial to be indexed therewith and operable upon selective positioning of said dial to actuate said selector switches in a particular coded combination, said coincidence switches and said selector switches being connected in said circuit so that when they are actuated in the same combination they complete the circuit to said relay to interrupt the circuit to said motor; and a motor starting switch in said motor circuit to effect energization of said motor; whereby a desired transmission speed may be established by indexing said dial to a setting indicating such speed which operates to interrupt the circuit to said relay and also to actuate said selector switches in a particular coded combination and said motor operates said shifter actuating means until such time as said coincidence switches are actuated in the combination which coincides with the combination of actuated selector switches, thereby reestablishing the circuit to said relay to stop motor operation and effecting a particular conditioning of said shifter actuating means to establish a particular gear shift position to provide the transmission speed corresponding to the dial setting.

9. In a machine tool speed changing transmission mechanism having a plurality of shiftable gears; fluid actuated means for shifting said shiftable gears; a control member having a plurality of control positions corresponding to the number of transmission speeds operatively connected to control the operation of said fluid actuated shifter means for establishing a shiftable gear pattern for obtaining a particular transmission speed; a motor operably connected to said control member for conditioning said control member into a particular control condition; an electric circuit for energizing said motor; a first group of switches disposed to be actuated into a plurality of coded combinations corresponding to the number of control positions established for said control member; a plurality of cams driven by said motor and arranged to actuate said first group of switches into a series of coded combinations; a manually adjustable speed selecting dial indexable to a plurality of speed indicating positions; a second group of switches disposed to be actuated in a plurality of coded combinations corresponding to the coded combinations established for said first group of switches; said first group of switches and said second group of switches being operably connected to said motor energizing circuit to interrupt said circuit thereby stopping motor operation when said two groups of switches are actuated in coinciding combinations; switch actuating means connected to said dial to be indexed therewith and operable upon selective positioning of said dial to actuate said switches of said second group of switches in a particular coded combination; and means in said motor circuit to effect energization of said motor when actuated, whereby a desired transmission speed may be selected and said motor energized and thereafter said shiftable gears will be moved in a particular pattern to establish the particular transmission speed.

10. In a machine tool having a multi-speed transmission provided with a plurality of shiftable elements; means for shifting said elements into a plurality of different positional patterns for establishing a plurality of transmission speeds; a positionable control member having a plurality of control positions which correspond to the obtainable transmission speeds; power means for actuating said shifter means in response to a selected position of said control member; a motor operably connected to effect positioning of said control member into a particular one of a plurality of positions; a first group of switches associated with said control member; a plurality of switch actuating elements connected to be rotated by said motor as said motor operates to effect a positioning of said control member, said switch actuating elements being arranged to actuate said first group of switches in a series of coded combinations which correspond in number to the number of positions established for said control member; a second group of switches arranged to be actuated in a plurality of coded combinations corresponding to the coded combinations arranged for said first group of switches; a transmission speed selector dial selectively indexable to a plurality of transmission speed indicating positions, said dial being operable in any selected position to actuate said second group of switches in a particular coded combination; an electrical circuit including means for energizing said motor; a relay in said electrical circuit and operable when energized to interrupt the energizing circuit to said motor; a second circuit in which said first and second groups of switches are connected for supplying current to said relay, said second circuit being completed when both groups of switches are actuated in the same coded combination; whereby said energized motor will operate said control member and will rotate said switch actuating elements until said first group of switches are conditioned into a coded combination which coincides with the coded combination of said second group of switches as established through selective positioning of said dial whereupon said switches operate to energize said relay to interrupt the energizing circuit to said motor and thereby establish selective positioning of said control member to operate said power means for establishing a particular shift pattern for said shiftable transmission elements.

11. In a machine tool having a member to be driven at a plurality of speeds; a multi-speed transmission and a range change connected to drive said member from a power source; a first fluid actuated means for varying the output of said multi-speed transmission; a second fluid actuated means for adjusting said range changer; a first valve disposed to control said second fluid actuated means; a speed selecting controller indexable to a plurality of settings corresponding to the output speeds of said transmission; a plurality of selector switches associated with said speed selecting controller and arranged to be actuated in a plurality of combinations, each of which represents one of the output speeds of said transmission; a second valve operably connected to supply fluid pressure to said first fluid actuated means; a positionable valve spool in said second valve operable to condition said second valve to effect distribution of fluid pressure to said first fluid actuated means for establishing a transmission output speed; an electric motor operably connected to position said valve spool; a plurality of coincidence switches associated with said second valve and arranged to be actuated in a plurality of combinations each of which also represents one of the output speeds of said transmission, said coincidence switches corresponding in number to the number of selector switches; a plurality of cams corresponding in number to the number of said coincidence switches and operably connected to be rotated in unison by said electric motor to actuate said coincidence switches in the various combinations successively as said motor operates to position said valve spool; a range change cam operably connected to be rotated by said motor as it rotates said switch cams; a range change switch operably connected to effect a conditioning of said first valve for operating said second fluid actuated means for adjusting said range changer to establish a particular drive range according to the established selected output speed of said transmission; a source of fluid pressure connected to said first and second valves; and an electric circuit operably connected to said electric motor and to said selector and coincidence switches and to said range change switch; and a starting switch in said circuit for effecting energization of said electric motor, whereby said speed selecting controller may be indexed to a selected transmission output setting to actuate a combination of said selector switches and said starting switch may thereafter be actuated to energize said electric motor to rotate said valve spool, said cams and said range change cam and when said cams have actuated said coincidence switches in the combination which coincides with the combination of actuated selector switches the switches operate to interrupt the circuit to said electric motor and said electric motor will have operated to condition said second valve for directing fluid pressure to said first fluid actuated means for establishing a transmission output which corresponds to the selected output speed, and simultaneously therewith said range cam will have been rotated to operate said range change switch for effecting a conditioning of said first valve for directing fluid pressure to said second fluid actuated means for conditioning said range changer into a drive ratio which corresponds to the established transmission output.

12. In a speed selecting mechanism; a speed transmission having a plurality of non-shiftable gears and a plurality of shiftable gears adapted to be positioned into a plurality of positional combinations for establishing a plurality of transmission speeds that are divided into a high range and a low range drive; fluid actuated shifter shafts in said speed transmission operably connected to move said shiftable gearing into shifted positions; a range changer operably connected in series with said speed transmission and conditionable into a high or low range driving ratio; fluid actuated shifter means connected to adjust said range changer; a dial manually indexable to a plurality of speed indicating positions corresponding to the speeds of said transmission; a group of selector switches positioned in proximity to said dial and adapted to be actuated into a plurality of coded combinations each of which represents one of the speeds of said transmission; means connected to said dial to be indexed therewith and operable to actuate said selector switches into individual coded combinations; a fluid distribution valve operably connected to receive and distribute fluid pressure to said transmission; a rotary spool carried in said valve and positionable to a plurality of positions for effecting selective distribution of fluid pressure to said transmission for actuating said shifter shafts for establishing gear shift positional combinations; an electric motor operably connected to rotate said valve spool for establishing a position therefor; an electrical circuit for energizing said motor; a group of coincidence switches adapted to be actuated into a plurality of coded combinations corresponding to the coded combinations established for said selector switches; a cam for each of said coincidence switches connected to be rotated in unison by said motor and operable to actuate said coincidence switches in coded combinations; a fluid valve connected to receive fluid pressure and conditionable to selectively distribute the fluid pressure to said range change shifter means for establishing a drive range according to the selected speed output of said transmission; valve conditioning means operable when actuated to selectively condition said fluid valve for establishing a high or low range drive ratio; a range change cam operably connected to be rotated by said motor and arranged to selectively condition said valve for distributing fluid pressure to the fluid actuator of said range change shifting means; and a starting switch in said circuit operable when actuated to energize said motor; whereby said dial may be selectively positioned to a desired speed position so that said selector switches will be actuated in a particular coded combination and said starting switch may thereafter be actuated to energize said motor which operates to position said valve spool and to rotate said coincidence switches and said range cam and when said coincidence switches are actuated into a coded combination which coincides with the coded combination established for said selector switches said motor will be deenergized and will have positioned said valve spool to effect distribution of fluid pressure to said shifter shafts for establishing a particular positioned combination for said shiftable gears to thereby establish the selected transmission speed which corresponds to the transmission speed setting of said dial and said range change cam will have been rotated to actuate said valve conditioning means to effect a conditioning of said valve for distributing fluid pressure to said range changer shifting mechanism for establishing the drive range according to the selected transmission speed.

13. In a speed changing transmission and control mechanism for a machine tool having a multi-speed device and a range changer arranged in series relationship; a speed selecting dial indexable to a plurality of speed indicating positions; a group of selector switches in proximity to said dial and arranged to be actuated in a plurality of coded combinations each of which represents one of the output speeds of the transmission; switch actuating means connected to said dial to be indexed therewith and operable upon selective positioning of said dial to actuate said selector switches in a particular coded combination; a speed selecting device operable to adjust said multi-speed transmission and said range changer into a particular speed output condition; a group of coincidence switches positioned and arranged to be actuated in a plurality of coded combinations corresponding to the coded combinations established for said selector switches; a plurality of cams disposed to actuate said coincidence switches in a succession of coded combinations with only one switch of a particular combination being actuated or deactuated to establish the succeeding combination; a motor operably connected to operate said speed selecting device and said cams simultaneously so that when said coincidence switches are conditioned in a particular coded combination which coincides with the coded combination established for said selector switches as effected by a positioning of said dial, operation of said motor will be terminated and said speed selecting device will be actuated for adjusting said multi-speed device and said range changer into selected speed output condition; and electrical means interconnecting said motor and said switches in a manner to energize said motor and when said selector and coincidence switches are in coincidence said motor energizing circuit will be interrupted.

14. In a machine tool variable speed drive; a movable member; a reversible variable speed motor; a source of energy connected to energize said motor; a drive transmission connected to be driven by said motor and coupled to drive said movable member, said transmission including a low range clutch and a high range clutch connected to be energized by said source of energy; a range selector switch selectively positionable into a low range clutch select position or a high range clutch select position, said range selector switch being operable when in either one of its range clutch select positions to effect the energization of both of said range clutches to thereby lock said transmission; and, a directional selector switch selectively positionable to effect the energization of said motor for operation in a first rotational direction or to effect the energization of said motor for operation in a second rotational direction, said directional selector switch being also operable when in either of its directional selecting positions to effect the deenergization of the non-selected range clutch.

15. In a machine tool variable speed drive; a movable member; a reversible variable speed motor; a source of energy connected to energize said motor; a drive transmission connected to be driven by said motor and coupled to drive said movable member; a low range clutch and a high range clutch in said transmission and connected to be energized by said source of energy; a range selector switch selectively positionable to one or the other of a low range or high range select position to establish a non-interruptable circuit to said low range clutch and simultaneously therewith an interruptable circuit to said high range clutch, or when in its high range select position to establish a non-interruptable circuit to said high range clutch and simultaneously therewith an interruptable circuit to said low range clutch; and, a directional selector switch selectively positionable to effect the operation of said motor in opposite rotational directions selectively, said directional selector switch being also operable when in either of its directional selecting positions to effect an interruption of the interruptable circuit established to one or the other of said range clutches through the operation of said range selector switch.

16. In a machine tool variable speed drive; a movable member; a reversible variable speed electric motor; a drive transmission connected to be driven by said motor and operably coupled to impart movement to said movable member, said transmission including a low range clutch and a high range clutch; an energizing circuit including a source of energy connected to said motor and said range clutches; a range selector switch in said circuit and positionable into a low range selecting position or a high range selecting position, said range selector switch being operable in either of its two positions to effect the energization of both of said range clutches so that they operate to lock said transmission; a directional selector switch in said circuit and positionable into a first position in which it operates to effect the energization of said motor for operation in a first rotational direction or positionable into a second position in which it operates to effect the energization of said motor for operation in a second rotational direction, said directional selector switch being also operable in either of its two directional selecting positions to maintain the range clutch corresponding to the range selector switch position energized while effecting deenergization of the other range clutch.

17. In a machine tool variable speed transmission; a multi-speed device and a range change device, cooperably connected to produce a plurality of output speeds; a speed selector dial indexable to a plurality of different speed indicating positions; a plurality of selector switches cooperable with said dial and being actuatable in a plurality of coded combinations corresponding to the number of speed indicating positions to which said dial is indexable; adjusting means operably connected to adjust said multi-speed device and said range changer into a plurality of speed output conditions corresponding in number to the number of indicated speeds; an electric motor connected to actuate said adjusting means; a plurality of coincidence switches adapted to be actuated into a plurality of coded combinations corresponding to the coded combinations for said selector switches; cams operably connected to be driven by said motor as said motor operates to actuate said adjusting means, said cams being disposed so that they are operable to actuate said coincidence switches in coded combinations; a source of energizing current and circuitry connected to said motor, said selector switches and said coincidence switches, in a manner that said motor may be energized to actuate said adjusting means and drive said cams so that said cams will actuate said coincidence switches in various coded combinations until said coincidence switches are actuated in a particular coded combination which corresponds to the coded combination in which said selector switches have been actuated by the selective positioning of said dial to thereby effect the deenergization of said motor and said adjusting means will have been actuated to adjust said multi-speed device and said range changer into a particular condition to produce a particular output speed corresponding to the indicator speed to which said dial has been positioned.

18. In a machine tool variable speed drive; a movable member; a variable speed motor; a source of energy connected to energize said motor; a drive transmission connected to be driven by said motor and coupled to drive said movable member at a selected speed in either a low range or a high range selectively and in a selected direction; a low range clutch and a high range clutch in said transmission and connected to be energized by said source of energy; a range selector switch selectively positionable to one or the other of a low range or high range select position, said range selector switch being operable when in either one of its range select positions to effect the energization of both of said range clutches; a first directional clutch and a second directional clutch in said transmission and connected to be energized by said source of energy, said directional clutches being operable when selectively energized to control the direction in which said transmission will drive said movable member; a directional selector switch selectively positionable to effect the energization of said first directional clutch or to effect the energization of said second directional clutch, said directional selector switch being also operable when in either of its directional selecting positions to effect the deenergization of the non-selected range clutch.

References Cited by the Examiner

UNITED STATES PATENTS

| | | | |
|---|---|---|---|
| 2,748,665 | 6/56 | Senn | 90—21.1 |
| 2,764,067 | 9/56 | Armitage et al. | 90—21.1 |
| 2,826,087 | 3/58 | Diener | 74—365 X |
| 2,876,650 | 3/59 | Sangster | 74—365 |
| 2,883,873 | 4/59 | Diebold | 74—365 |
| 2,919,594 | 1/60 | Patrignani et al. | 74—365 |
| 2,925,018 | 2/60 | Lukey et al. | 90—16 |
| 2,933,986 | 4/60 | Schroeder | 90—16 |
| 2,982,143 | 5/61 | Kohl | 74—365 |
| 2,992,565 | 7/61 | Hansen et al. | 74—365 X |
| 3,009,399 | 11/61 | Waters et al. | 74—365 X |
| 3,016,778 | 1/62 | Fitzner | 74—365 X |

DON A. WAITE, *Primary Examiner.*

WILLIAM W. DYER, *Examiner.*